US007624295B2

(12) United States Patent
Taketoshi et al.

(10) Patent No.: US 7,624,295 B2
(45) Date of Patent: Nov. 24, 2009

(54) PROCESSOR SYSTEM, INSTRUCTION SEQUENCE OPTIMIZATION DEVICE, AND INSTRUCTION SEQUENCE OPTIMIZATION PROGRAM

(75) Inventors: Osamu Taketoshi, Osaka (JP); Isao Tanaka, Osaka (JP); Toru Wada, Osaka (JP)

(73) Assignee: Panasonic Corporation, Osaka (JP)

( * ) Notice: Subject to any disclaimer, the term of this patent is extended or adjusted under 35 U.S.C. 154(b) by 300 days.

(21) Appl. No.: 10/971,122

(22) Filed: Oct. 25, 2004

(65) Prior Publication Data

US 2005/0102560 A1 May 12, 2005

(30) Foreign Application Priority Data

Oct. 27, 2003 (JP) ............................. 2003-366042

(51) Int. Cl.
*G06F 1/00* (2006.01)
(52) U.S. Cl. ..................................... 713/500
(58) Field of Classification Search ................. 713/500
See application file for complete search history.

(56) References Cited

U.S. PATENT DOCUMENTS

| 3,648,253 | A | * | 3/1972 | Mullery et al. .............. 718/100 |
| 5,790,877 | A | | 8/1998 | Nishiyama et al. |
| 5,867,726 | A | | 2/1999 | Ohsuga et al. |
| 5,889,947 | A | * | 3/1999 | Starke ........................ 709/213 |
| 6,430,693 | B2 | | 8/2002 | Lin |
| 6,463,550 | B1 | * | 10/2002 | Cepulis et al. ................ 714/25 |
| 6,611,918 | B1 | * | 8/2003 | Uzelac ........................ 713/320 |
| 6,804,790 | B2 | * | 10/2004 | Rhee et al. ................... 713/320 |
| 6,874,098 | B2 | | 3/2005 | Tamemoto et al. |
| 7,334,142 | B2 | * | 2/2008 | Hack ........................... 713/320 |
| 2002/0073348 | A1 | | 6/2002 | Tani |
| 2002/0184546 | A1 | | 12/2002 | Sherburne, Jr. |
| 2003/0140264 | A1 | * | 7/2003 | Kawano et al. ............. 713/500 |
| 2004/0039954 | A1 | | 2/2004 | White et al. |
| 2004/0073822 | A1 | * | 4/2004 | Greco et al. ................ 713/320 |
| 2004/0190046 | A1 | * | 9/2004 | Ilda ........................... 358/1.15 |
| 2005/0283629 | A1 | * | 12/2005 | Tanaka et al. .............. 713/322 |

FOREIGN PATENT DOCUMENTS

JP 9-34599 A 2/1997

(Continued)

OTHER PUBLICATIONS

Do/loop statement by Powerbasic.com.*

(Continued)

*Primary Examiner*—Thomas Lee
*Assistant Examiner*—Mohammed H Rehman
(74) *Attorney, Agent, or Firm*—McDermott Will & Emery LLP

(57) ABSTRACT

To reduce power consumption of a processor system including a plurality of processors without degradation of the processing ability, a CPU detects mode setting information added to instruction code and outputs a clock control signal and a power supply voltage control signal to a clock controlling section and a power supply voltage controlling section, respectively. When a plurality of processing engines execute an instruction in parallel, clock signals with a frequency lower than a predetermined frequency and power supply voltages lower than a predetermined voltage are supplied. As a result, power consumption is reduced and the processing ability is maintained by the parallel execution.

11 Claims, 42 Drawing Sheets

FOREIGN PATENT DOCUMENTS

| | | |
|---|---|---|
| JP | 9-138716 A | 5/1997 |
| JP | 2000-112756 A | 4/2000 |
| JP | 2002-069790 | 6/2002 |
| JP | 2003-131873 | 5/2003 |
| JP | 2003-263311 | 9/2003 |

OTHER PUBLICATIONS

While/When statement by Powerbasic.com.*

Japanese Notice of Reasons for Rejection, w/ English translation thereof, issued in Japanese Patent Application No. JP 2003-366042 dated Mar. 24, 2009.

* cited by examiner

FIG. 2

| ADDRESS IN STORAGE SECTION | INSTRUCTION | INSTRUCTION CODE |||
|---|---|---|---|---|
| | | CLOCK CONTROL FLAG || |
| | | ASSIGNMENT CONTROL FLG | INSTRUCTION CODE BODY | |
| 0 0 0 0 ⋮ 0 0 0 3 | LOOP 04 LOOPEND ⋮ LOOPEND | - - - | 0 1 | 0 0 0 1 |
| 0 0 0 4 | SAVE HWE (A) ××× × | - - - | 0 1 | 0 0 0 1 |
| 0 0 0 5 ⋮ 0 0 0 8 | | | 0 0 0 0 | 1 0 0 1 1 0 0 1 |
| 0 0 0 9 ⋮ | ADD CPU (A) ×××× ⋮ | - - - | 0 0 | 0 1 0 0 |

FIG. 3

| CLOCK CONTROL FLAG | CLOCK FREQUENCY ||
|---|---|---|
| | CPU | HWE |
| 0 0 - - | 0 (STOP) | - |
| 0 1 - - | f | - |
| 1 0 - - | f / 2 | - |
| 1 1 - - | f / 4 | - |
| - - 0 0 | - | 0 (STOP) |
| - - 0 1 | - | f |
| - - 1 0 | - | f / 2 |
| - - 1 1 | - | f / 4 |

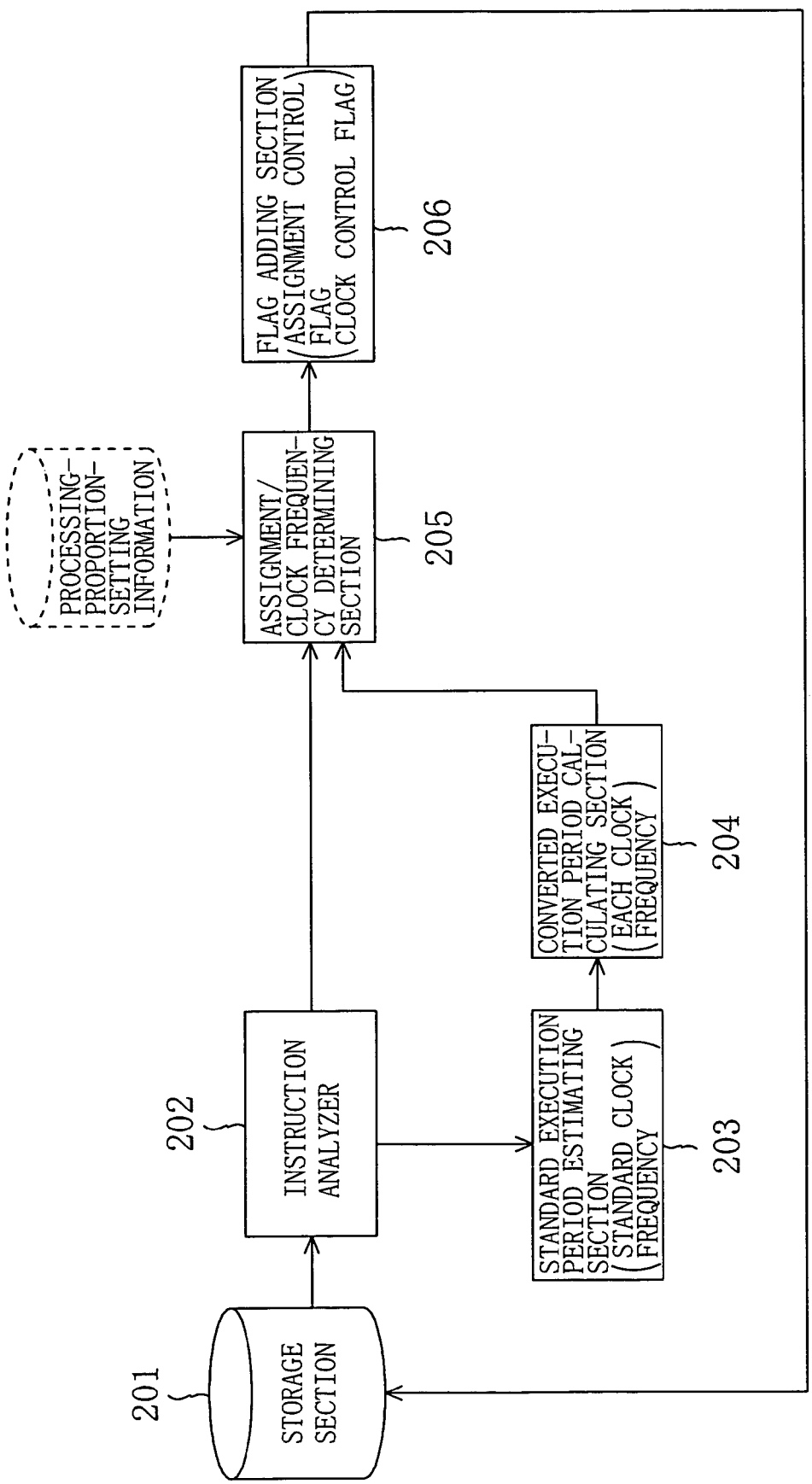

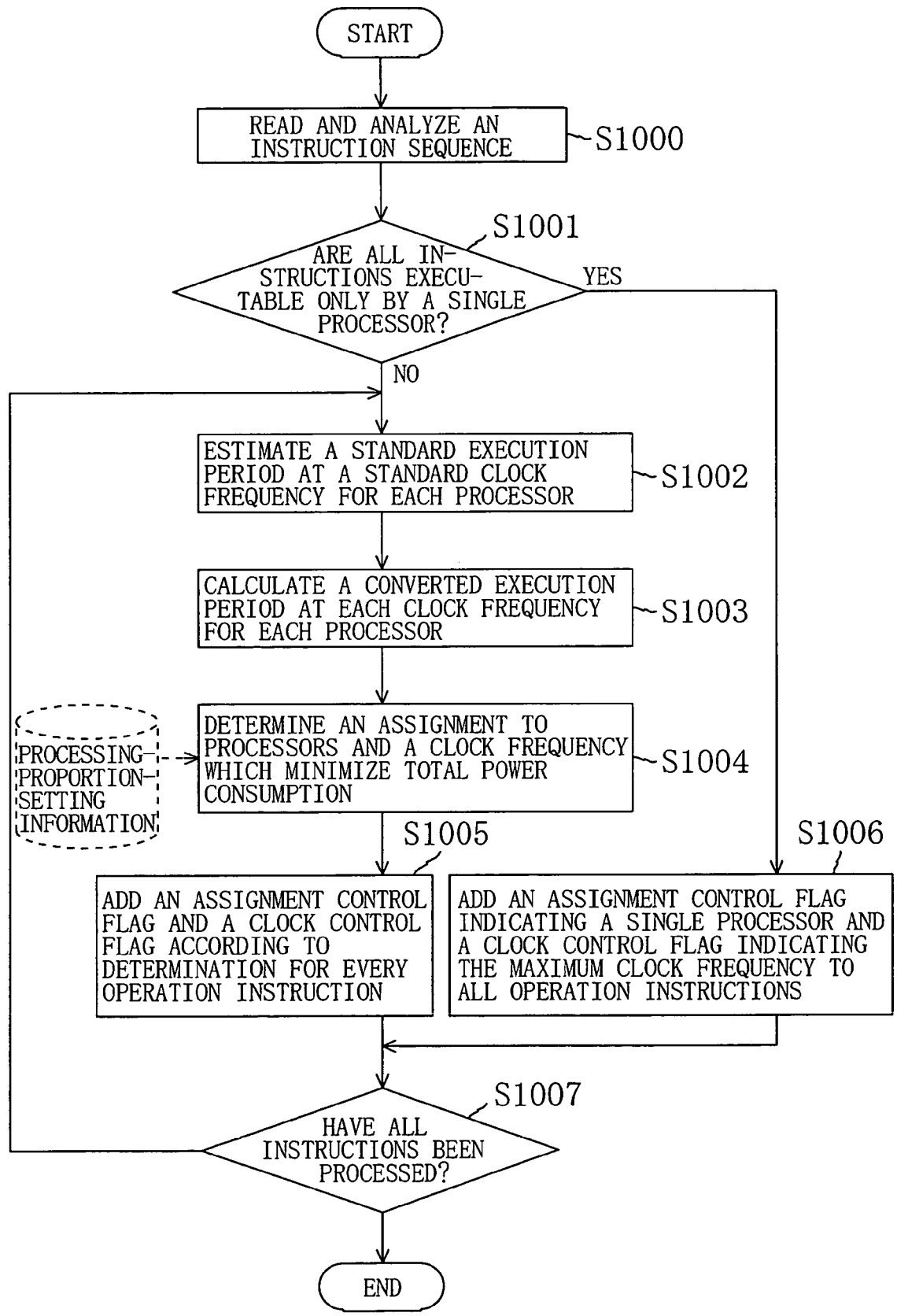

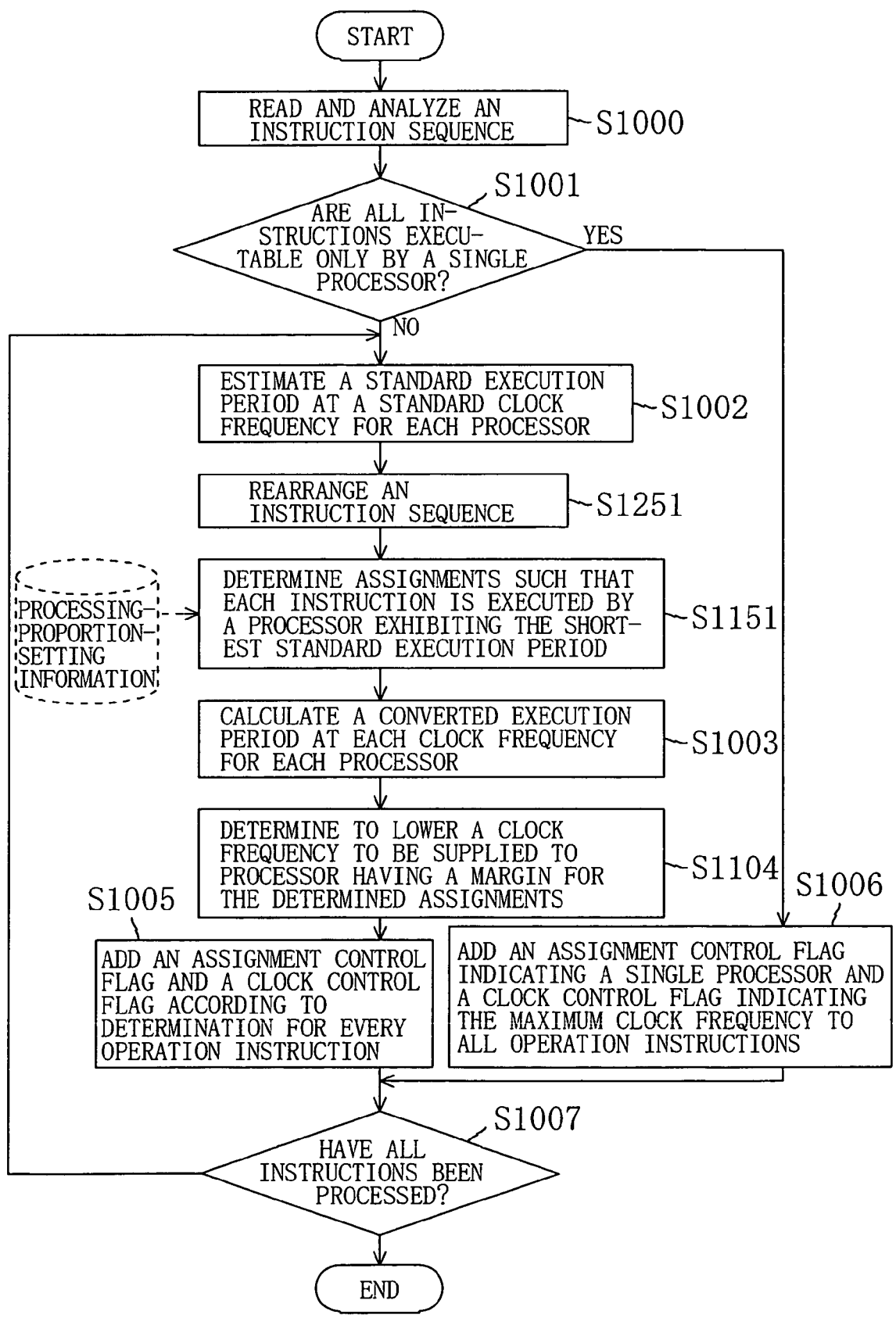

FIG. 13A
INSTRUCTION WRITTEN IN A SOURCE PROGRAM

- INSTRUCTION a
  4 CLOCKS BY PROCESSOR A
- INSTRUCTION b
  12 CLOCKS BY PROCESSOR B
- INSTRUCTION c
  4 CLOCKS BY PROCESSOR A
- INSTRUCTION d

FIG. 13B

EXECUTION BY PROCESSOR A:
- INSTRUCTION a, FREQUENCY f (4 CLOCKS)
- INSTRUCTION c, FREQUENCY f/3 (CORRESPONDING TO 12 CLOCKS AT FREQUENCY f)

EXECUTION BY PROCESSOR B:
- (TRANSFER)
- INSTRUCTION b, FREQUENCY f (12 CLOCKS)

FIG. 13C
REARRANGED INSTRUCTIONS

- INSTRUCTION b
- INSTRUCTION a
- INSTRUCTION c
- INSTRUCTION d

FIG. 13D

EXECUTION BY PROCESSOR A:
- INSTRUCTION a, FREQUENCY f/2 (CORRESPONDING TO 8 CLOCKS AT FREQUENCY f)
- INSTRUCTION c, FREQUENCY f/2 (CORRESPONDING TO 8 CLOCKS AT FREQUENCY f)

EXECUTION BY PROCESSOR B:
- (TRANSFER)
- INSTRUCTION b, FREQUENCY f×3/4 (CORRESPONDING TO 16 CLOCKS AT FREQUENCY f)

FIG. 13E

EXECUTION BY PROCESSOR A:
- INSTRUCTION a, FREQUENCY f×2/3 (CORRESPONDING TO 6 CLOCKS AT FREQUENCY f)
- INSTRUCTION c, FREQUENCY f×2/3 (CORRESPONDING TO 6 CLOCKS AT FREQUENCY f)

EXECUTION BY PROCESSOR B:
- (TRANSFER)
- INSTRUCTION b, FREQUENCY f (CORRESPONDING TO 12 CLOCKS AT FREQUENCY f)

FIG. 30

| OPERATION MODE | PROCESSOR FOR EXECUTION | POWER SUPPLY VOLTAGE | CLOCK FREQUENCY | VALUE HELD IN POWER SUPPLY VOLTAGE CONTROLLING REGISTER 701a | VALUE HELD IN FREQUENCY CONTROLLING REGISTER 106c | TOTAL PROCESSING ABILITY RATIO | POWER CONSUMPTION RATIO |
|---|---|---|---|---|---|---|---|
| NORMAL MODE | PROCESSING ENGINE 911 | Vdd | f | b' 0000 0001 | b'0000 | 1 | 1 |
| LOW-CONSUMPTION MODE | PROCESSING ENGINE 911, 912 | Vdd/2 | f/2 | b' 0001 0011 | b'0001 | 1 | 1/4 |
| HIGH-PERFORMANCE MODE | PROCESSING ENGINE 911~914 | Vdd/2 | f/2 | b' 0001 1111 | b'0001 | 2 | 1/2 |
| ULTRA-LOW-CONSUMPTION MODE | PROCESSING ENGINE 911 | Vdd/2 | f/2 | b' 0001 0001 | b'0001 | 1/2 | 1/8 |

(b' INDICATES THAT THE SUBSEQUENT VALUE IS REPRESENTED IN THE BINARY SYSTEM)

FIG. 40

| OPERATION MODE | PROCESSOR FOR EXECUTION | POWER SUPPLY VOLTAGE | CLOCK FREQUENCY | VALUE HELD IN POWER SUPPLY VOLTAGE CONTROLLING REGISTER 701a | VALUE HELD IN FREQUENCY CONTROLLING REGISTER 106c | TOTAL PROCESSING ABILITY RATIO | POWER CONSUMPTION RATIO |
|---|---|---|---|---|---|---|---|
| NORMAL MODE | PROCESSING ENGINE 911 | Vdd | f | b'0000 0001 | b'0000 | 1 | 1 |
| LOW-LEAKAGE MODE | PROCESSING ENGINE 923, 924 | Vdd | f/2 | b'0000 1100 | b'0001 | 1 | 1 − LEAKAGE DECREASE × 2 |
| HIGH-PERFORMANCE MODE | PROCESSING ENGINE 911, 912 .......... PROCESSING ENGINE 923, 924 | Vdd/2 .......... Vdd | f/2 | b'0011 1111 | b'0001 | 2 | 1.25 − LEAKAGE DECREASE × 2 |

(b' INDICATES THAT THE SUBSEQUENT VALUE IS REPRESENTED IN THE BINARY SYSTEM)

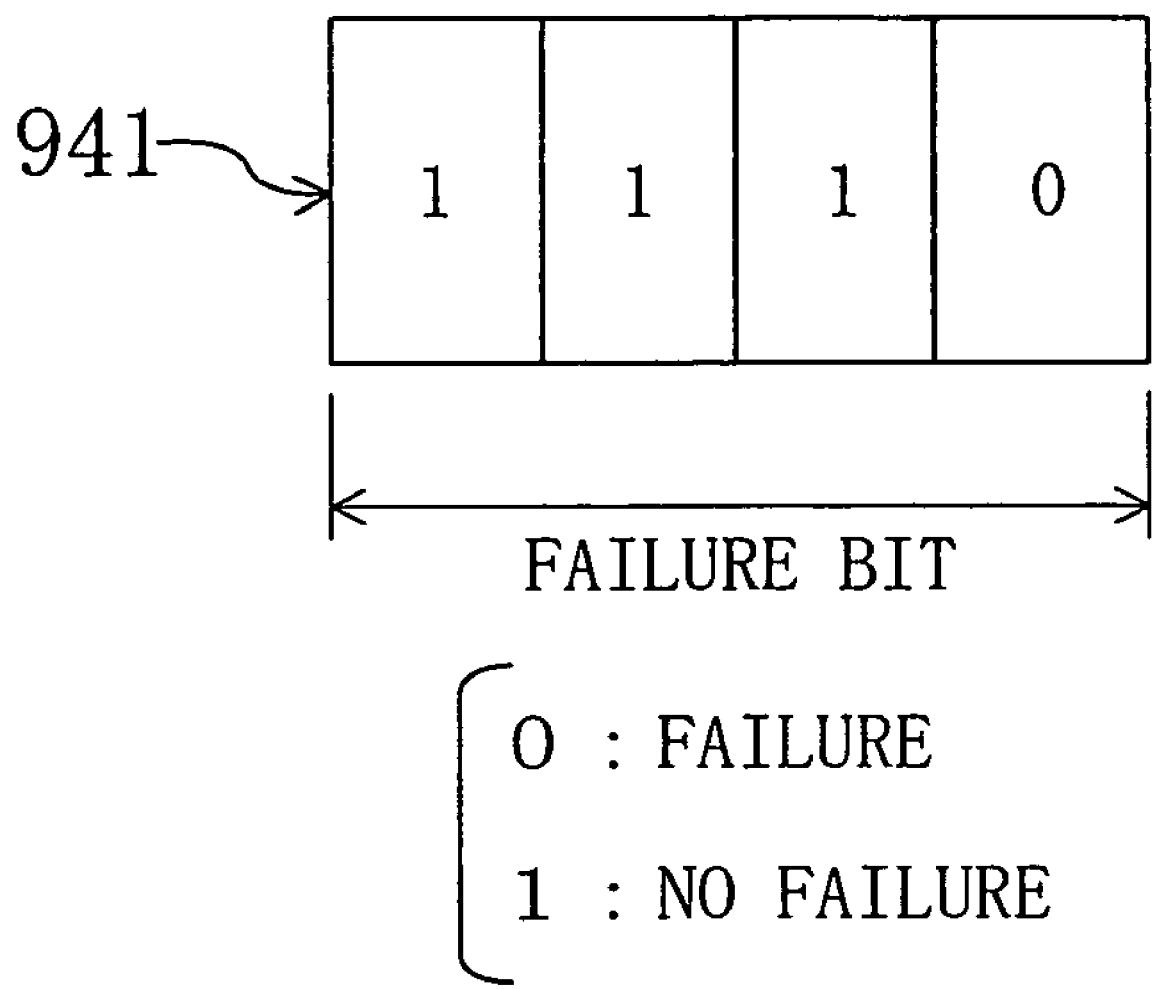

PROCESSOR SYSTEM, INSTRUCTION SEQUENCE OPTIMIZATION DEVICE, AND INSTRUCTION SEQUENCE OPTIMIZATION PROGRAM

CROSS-REFERENCE TO RELATED APPLICATION

This application is related to Japanese Patent Application No. 2003-366042 filed on Oct. 27, 2003, Japanese Patent Application No. 2002-363609 filed on Dec. 16, 2002 and U.S. patent application Ser. No. 10/868,357 filed on Jun. 16, 2004, whose priorities are claimed under 35 USC §119, the disclosures of which are incorporated by reference in their entirety.

BACKGROUND OF THE INVENTION

The present invention relates to a technique for reducing power consumption of a processor system which includes a plurality of processors of the same type or different types such as processing units called a central processing unit (CPU), a hardware engine (HWE), a coprocessor or a digital signal processor (DSP) and is capable of performing parallel processing.

There has been a known technique for reducing power consumption of a CPU by lowering the frequency of a clock signal when the load in processing of the CPU is light (e.g., Japanese Unexamined Patent Publication No. 9-34599.) Also known is a technique for reducing power consumption and heat release of/from an entire system by turning off a power source of an associated unit when a decoded instruction is "no-operation" in a processor system including a plurality of units such as a CPU and a coprocessor (e.g., Japanese Unexamined Patent Publication No. 2000-112756.)

Also known is a technique for enhancing the processing ability or reducing power consumption by controlling the number of CPUs operating at the same time in accordance with the processing load or the setting of an operation environment (e.g., Japanese Unexamined Patent Publication No. 9-138716.)

The above-mentioned technique of merely reducing the frequency of a clock signal is applicable when the processing load is light, but is not applicable when a high processing ability is required. Therefore, large reduction of power consumption of an entire system is not always achieved.

In addition, with the technique of turning off a power source for a unit which does not perform processing, power consumption in processing itself is not reduced, and thus large reduction of power consumption is not achieved as well.

Moreover, the technique of controlling the number of CPUs operating at the same time cannot reduce power consumption when a high processing ability is required, so that enhancement of the processing ability and reduction of power consumption are not achieved at the same time.

SUMMARY OF THE INVENTION

It is therefore an object of the present invention to greatly reduce power consumption particularly of a processor system including a plurality of processors, while enabling both maintenance of the processing ability and reduction of the power consumption.

In order to achieve this object, a first processor system is a processor system including a plurality of processors. The processor system includes: assignment controlling means for reading instructions to be executed by the respective processors and for controlling assignments of the instructions to the processors; clock controlling means for controlling the frequencies of clock signals to be supplied to the respective processors, in accordance with the instructions to be executed by the processors according to the assignments; and voltage controlling means for controlling, in accordance with the control of the frequencies of the clock signals by the clock controlling means, at least either power supply voltages to be supplied to the respective processors or substrate voltages to be supplied to substrate nodes of transistors constituting the respective processors. When the assignment controlling means makes a plurality of processors execute instructions in parallel, the clock controlling means and the voltage controlling means respectively supply clock signals each having a frequency lower than a predetermined frequency and either power supply voltages lower than a predetermined voltage or substrate voltages for providing threshold voltages higher than a predetermined threshold voltage.

In this system, clock signals with frequencies lower than a predetermined frequency are supplied, so that a margin for a delay in a circuit is increased. Accordingly, power supply voltages lower than a predetermined voltage or substrate voltages for providing threshold voltages higher than a predetermined threshold voltage are supplied for operation. As a result, power consumption is reduced. In addition, instructions are executed by a plurality of processors in parallel, thus ensuring the maintenance of the processing ability.

A second processor system is the first processor system wherein the assignment controlling means, the clock controlling means and the voltage controlling means control the assignments to the processors, the frequencies of the clock signals, and either the power supply voltages or the substrate voltages, respectively, based on control information included in the instructions.

A third processor system is the second processor system wherein the control information indicates one of a plurality of combinations of assignments to the processors, frequencies of clock signals, and either power supply voltages or substrate voltages.

In these systems, assignments to processors and others are controlled based on the control information included in the instructions and it is unnecessary to provide an instruction analyzing circuit for the assignments, for example. As a result, power consumption is reduced with a small circuit scale.

A fourth processor system is the first processor system and further includes: instruction analyzing means for analyzing whether the instructions are executable by a plurality of processors in parallel or not, wherein the assignment controlling means, the clock controlling means and the voltage controlling means control the assignments to the processors, the frequencies of the clock signals, and either the power supply voltages or the substrate voltages, respectively, based on a result of the analysis by the instruction analyzing means.

A fifth processor system is the fourth processor system, wherein the instruction analyzing means analyzes whether a process performed in accordance with the instructions is a process with a heavy load or not.

A sixth processor system is the fifth processor system, wherein the process with a heavy load includes a loop process performed a predetermined number of times or more.

In these systems, assignments to processors and others are determined based on an analysis of instructions. Accordingly, even in a case where instructions of such instruction code that does not include information indicating assignments to processors and others in particular, assignments and others are controlled such that power consumption is reduced and a large number of loop processes are performed at high speed.

In order to reduce power consumption or increase the processing speed with ease, a person such as a program developer only needs to specify power consumption or the processing ability, for example, without consideration of frequencies of clock signals, for example.

As the number of instructions which are referred to for the analysis increases, even somewhat complicated repetitive processes can be processed in parallel, thus further ensuring reduction of power consumption with ease. However, increase in the number of instructions leads to increase in the scale of a circuit for analysis. Therefore, the number of instructions to be analyzed needs to determined in accordance with the processing ability required of a processor system and power consumption, for example. The number of instructions assigned to one processor is not limited to one. If a sequence of instructions for a process is executable by one or more processors with high efficiency, such a sequence of instructions may be assigned as a unit.

A seventh processor system is the second processor system, wherein the plurality of processors contain a processor including a transistor having a first threshold voltage with respect to a substrate voltage and a processor including a transistor having a second threshold voltage with respect to the substrate voltage, the second threshold voltage being higher than the first threshold voltage, and the assignment controlling means, the clock controlling means and the voltage controlling means control the assignments to the processors, the frequencies of the clock signals, and either the power supply voltages or the substrate voltages, respectively, based on control information included in the instructions and the threshold voltages of the transistors included in the processors.

An eighth processor system is the fourth processor system, wherein the plurality of processors contain a processor including a transistor having a first threshold voltage with respect to a substrate voltage and a processor including a transistor having a second threshold voltage with respect to the substrate voltage, the second threshold voltage being higher than the first threshold voltage, and the assignment controlling means, the clock controlling means and the voltage controlling means control the assignments to the processors, the frequencies of the clock signals, and either the power supply voltages or the substrate voltages, respectively, based on a result of the analysis by the instruction analyzing means and the threshold voltages of the transistors included in the processors.

In these systems, operation of a processor including a transistor having a low threshold voltage ensures the maintenance of the processing ability. In addition, operation of a processor including a transistor having a high threshold voltage reduces active leakage current and thereby further reduces power consumption easily.

A ninth processor system is the first processor system, wherein the voltage control means stops the supply of a power supply voltage to a processor to which the assignment controlling means does not assign execution of an instruction.

In this system, no leakage current occurs in a processor which is not in operation, thus further reducing power consumption.

A tenth processor system is the first processor system and further includes failure-information holding means for holding information indicating whether each of the processors operates normally or not, wherein the assignment controlling means assigns execution of an instruction only to a processor which operates normally.

An eleventh processor system is the tenth processor system and further includes failure detecting means for making each of the processors perform test operation to determine whether the processor operates normally or not.

A twelfth processor system is the eleventh processor system, wherein the failure detecting means makes each of the processors execute a test program to determine whether each of the processors operates normally or not, based on a result of the execution.

In these systems, clock frequencies and power supply voltages to processors without a failure are controlled, thus ensuring the maintenance of the processing ability and reducing power consumption.

A first instruction sequence optimization device is an instruction sequence optimization device for optimizing an instruction sequence to be executed by a processor system including a plurality of processors. The device includes: instruction analyzing means for analyzing whether instructions included in the instruction sequence are executable by the respective processors or not; and control information adding means for adding control information to the instruction sequence based on a result of the analysis by the instruction analyzing means and information indicating power consumption and a processing ability, the control information indicating assignments to the processors, the frequencies of clock signals, and either power supply voltages or substrate voltages.

A first instruction sequence optimization program is an instruction sequence optimization program for optimizing an instruction sequence to be executed by a processor system including a plurality of processors. The program makes a computer execute: an instruction analyzing step of analyzing whether instructions included in the instruction sequence are executable by a plurality of processors or not; and a control information adding step of adding control information to the instruction sequence based on a result of the analysis obtained in the instruction analyzing step and information indicating power consumption and a processing ability, the control information indicating assignments to the processors, the frequencies of clock signals, and either power supply voltages or substrate voltages.

Then, as described for the second processor system, assignments to processors are controlled with a small circuit scale. In addition, an instruction sequence executable by a processor system whose power consumption can be reduced is easily generated.

A second instruction sequence optimization device is the first instruction sequence optimization device, wherein the control information adding means replaces an instruction to be executed by a processor with an instruction to be executed by a plurality of processors in parallel.

A second instruction sequence optimization program is the first instruction sequence optimization program, wherein in the control information adding step, an instruction to be executed by a processor is replaced with an instruction to be executed by a plurality of processors in parallel.

Then, processing is performed by a plurality of processors in parallel with ease.

BRIEF DESCRIPTION OF THE DRAWINGS

FIG. 2 shows an example of instruction code.

FIG. 3 shows an example of clock control flags added to instruction code.

FIG. 7 is a block diagram showing a configuration of an instruction sequence optimization device according to embodiment 2.

FIG. 9 is a flowchart showing operation of the instruction sequence optimization device of embodiment 2.

FIG. 12 is a flowchart showing operation of an instruction sequence optimization device of another modified example of embodiment 2.

FIGS. 13A through 13E show examples of a relationship of the order of executing instructions with respect to clock frequencies and execution periods.

FIG. 30 is a table showing combinations of operation modes, assignments to processors, power supply voltages and clock frequencies in embodiment 10.

FIG. 40 is a table showing combinations of operation modes, assignments to processors, power supply voltages and clock frequencies in embodiment 13.

FIG. 45 shows a configuration of a failure register 941 according to embodiment 15.

DESCRIPTION OF THE PREFERRED EMBODIMENTS

Figure 1:
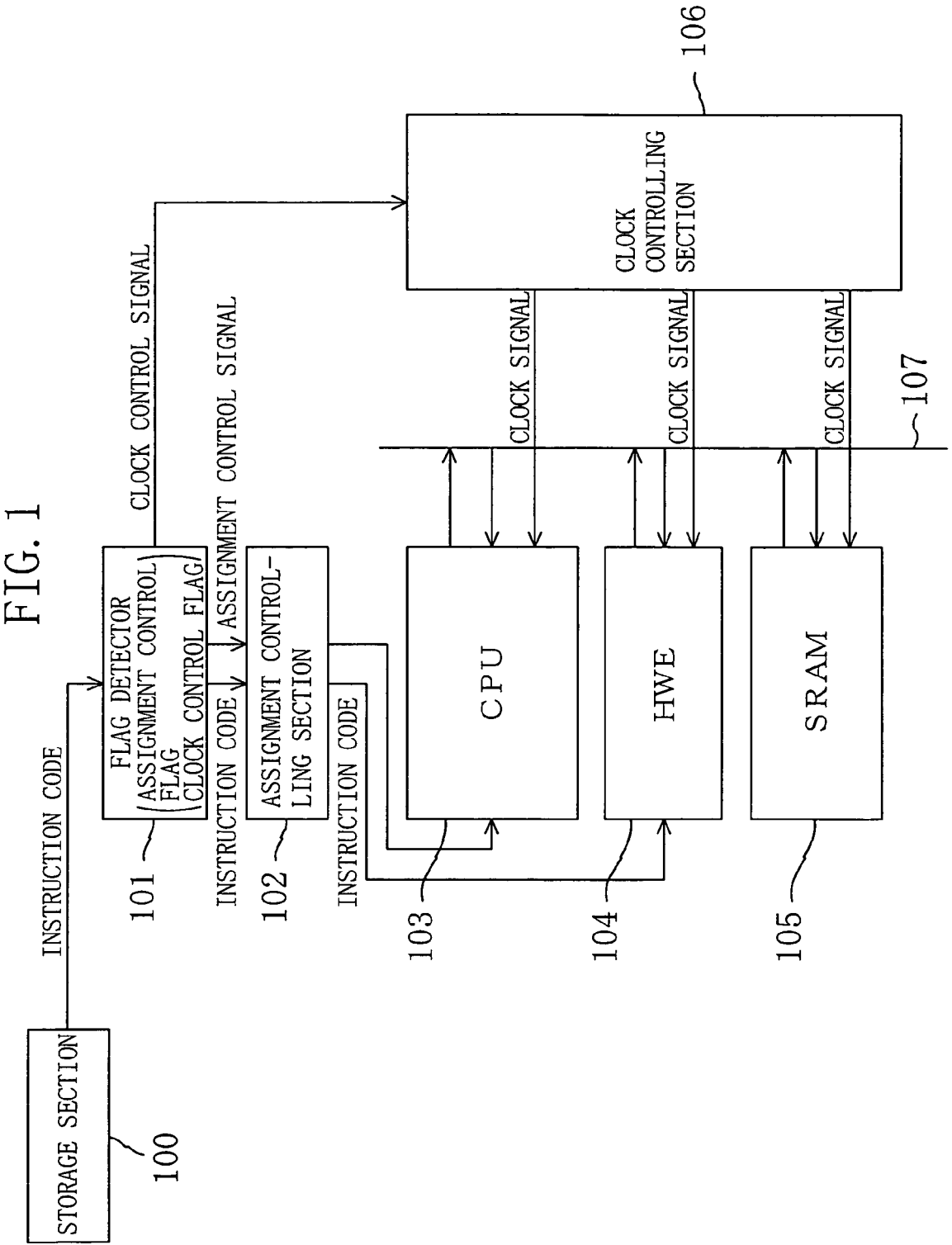
FIG. 1 is a block diagram showing a configuration of a main portion of a processor system according to embodiment 1.

Hereinafter, embodiments of the present invention will be described with reference to the drawings.

(Outlines of the Present Invention and Relationship Between Power Consumption and Clock Frequency, for Example)

First, a relationship among power consumption, a clock frequency and others related to a mechanism for reducing power consumption according to the present invention will be described.

(Relationship of Power Consumption to Clock Frequency and Power Supply Voltage)

Power consumption of a CMOS transistor circuit generally has the following relationship with respect to a clock frequency and a power supply voltage if leakage current is disregarded (1)    $P \propto K \times C \times Vdd^2 \times f$ where
P: power consumption
K: switching probability of a transistor
C: load capacity to be driven
Vdd: power supply voltage
f: clock frequency (operating frequency of a transistor)

As shown by the above expression, if the power supply voltage or the clock frequency is lowered, power consumption is reduced. Specifically, during a given period, if the number of execution cycles at a clock frequency is larger than the number of execution cycles necessary for a process (a process determined by a combination of details of the process and data), unnecessary toggling (ON/OFF switching) of transistors is performed because the number of execution cycles necessary for the given process is constant. In view of this, if the clock frequency is lowered to reduce the number of execution cycles within the given period, the number of unnecessary toggling operations is reduced and thereby power consumption is reduced.

In addition, reduction of the clock frequency increases a margin for a circuit delay, so that the power supply voltage is allowed to be reduced as described below. Accordingly, power consumption (which is proportional to the square of the power supply voltage as described above) is further reduced. If the clock frequency is reduced to ½ when a process is distributed between two processors and these distributed processes are performed in parallel, the power supply voltage is also reduced through the processing ability is the same. As a result, power consumption is reduced.

(Relationship of Delay Time of Circuit to Power Supply Voltage and Threshold Voltage of Transistor and Relationship Between Leakage Current and Threshold Voltage)

Delay time (gate delay time) of a circuit has the following relationship with respect to a power supply voltage and a threshold voltage of a transistor $$td \propto Vdd \times C/(Vdd-Vt)^2 \quad (2)$$

where
td: delay time of a circuit
C: load capacity to be driven
Vdd: power supply voltage
Vt: threshold voltage of a transistor Suppose the load capacity to be driven is constant, the delay time is determined by the power supply voltage and the threshold voltage. Specifically, for example, in a case where the threshold voltage is 0.4 V, suppose the delay time with a power supply voltage of 2.5 V is td1, and the delay time with a power supply voltage of 1.75 V is td2, the relationship of td2/td1≈1.69 is established. If the power supply voltage decreases from 2.5V to 1.75V, the delay time increases about 1.69 times. A circuit which normally operates with a power supply voltage of 2.5V at a clock frequency of f is operable even with a reduced power supply voltage of 1.75V as long as the clock frequency is about f/1.69≈0.59×f or lower. If the circuit operates at a clock frequency of about 0.59×f, the power supply voltage is allowed to be reduced to as low as 1.75V. Accordingly, as shown by Expression (1), if the clock frequency is reduced, power consumption is reduced by not only the reduction of the clock frequency itself but also reduction of the power supply voltage.

If a margin for a circuit delay increases by the reduction of the clock frequency, the power supply voltage is reduced as described above. Likewise, if the threshold voltage is increased, the leakage current is reduced. That is, the leakage current and the threshold value have the following relationship:

$$Ileak \propto \exp\{-Vt/(S \times \ln 10)\} \quad (3)$$

where Ileak: leakage current
S: S factor

Specifically, if the threshold voltage is increased from 0.3V to 0.6V with a power supply voltage of 2.5V, the delay time increases by 1.34 times (the circuit is operable if the clock frequency is 0.75×f or lower) according to Equation (2). However, the leakage current decreases to about 27% if the S factor is 100 mV. Accordingly, the reduction of the clock frequency also achieves reduction of power consumption due to the reduction of the leakage current.

Specifically, with recent miniaturization of circuits in semiconductor processes, a threshold voltage has decreased (scaling) and the circuit scale has increased by incorporating a large-capacity memory in a semiconductor chip, for example, resulting in that the increase of leakage current tends to be more and more conspicuous. On the other hand, if a clock frequency is reduced to permit an increased delay time, power consumption is reduced by, for example, controlling the substrate voltage so as to increase the threshold voltage.

Such a threshold voltage as described above may be statically set by, for example, setting an impurity concentration. On the other hand, the threshold voltage may also be dynamically set by, for example, controlling the voltage at a semiconductor substrate, i.e., by applying a reverse bias voltage to a substrate node (a well, if provided) and a source node of a transistor.

According to the present invention, the above-described relationship of power consumption to a clock frequency, a power supply voltage and a threshold voltage is utilized in order to assign instructions to a plurality of processors which execute the respective instructions and to control the clock frequency, for example, to be supplied to each of the processors in accordance with processing (processing time for executing an instruction) by the processor. This enables a great reduction of power consumption without deterioration of the total processing ability.

Hereinafter, specific embodiments of the present invention will be described.

Embodiment 1

As Embodiment 1, an example in which assignments of instructions to respective modules (functional blocks), e.g., a CPU and a hardware engine (HWE), and control of clock frequencies are performed based on flags added to the instructions in a processor system constituted by a semiconductor integrated circuit will be descried.

FIG. 1 is a block diagram showing a configuration of a main portion of a processor system. The processor system includes: a storage section 100; a flag detector 101; an instruction assignment controlling section 102; a CPU 103; an HWE 104; an SRAM 105; a clock controlling section 106; and a bus 107. (The flag detector 101 and the instruction assignment controlling section 102 constitute an assignment controlling means, and the flag detector 101 and the clock controlling section 106 constitute a clock controlling means.)

The storage section 100 stores instruction code of instructions to be executed and is constituted by, for example, a ROM in which the instruction code is stored beforehand or a RAM into which the instruction code stored on a hard disk is loaded. The instruction code contains information indicating operation modes related to clock frequencies of the CPU 103 and the HWE 104. Specifically, as shown in FIG. 2, for example, the instruction code is structured such that assignment control flags indicating which one of the CPU 103 and the HWE 104 executes instructions and a clock control flags indicating the frequencies of clock signals for operating the CPU 103 and the HWE 104 are added to the body of the instruction code showing details of the instructions. More specifically, as shown in FIG. 3, for example, in a clock control flag, two most significant bits indicate the frequency of a clock signal to be supplied to the CPU 103 and the two least significant bits indicate the frequency of a clock signal to be supplied to the HWE 104. Such flags can be not only added by, for example, a program designer but also automatically added by using an instruction sequence optimization device which will be described later. Each clock frequency of the CPU 103 is not necessarily specified independently of that of the HWE 104 and vice versa. Alternatively, a combination of clock frequencies may be specified. If clock frequencies are not particularly specified, the highest clock frequency may be selected.

The flag detector 101 outputs the instruction code read out from the storage section 100 and an assignment control signal based on a control flag contained in the instruction code to the instruction assignment controlling section 102 and also outputs a clock control signal based on the clock control flag to the clock controlling section 106.

The instruction assignment controlling section 102 transfers the instruction code to the CPU 103 or the HWE 104 in accordance with the assignment control signal output from the flag detector 101. The flag detector 101 and the instruction assignment controlling section 102 may be constituted by hardware or may be constituted by processors at higher levels than the CPU 103, for example. The instruction code is not necessarily transferred directly to the CPU 103 or the HWE 104 but may be transferred thereto via the bus 107.

The CPU 103 is a general-purpose processor which executes various types of general instructions using a computing resource included therein or the SRAM 105, for example. (The CPU 103 may have a function of controlling various operations of the entire semiconductor integrated circuit.)

On the other hand, the HWE 104 is a processor with which specific operation (routine processing) such as MPEG-4 operation, Viterbi decoding or multiply-accumulate operation is performed by one or a sequence of instructions at high speed (with small number of processing cycles) and independently of (i.e., separately from) processing by the CPU 103, for example. (In this case, for simplicity, description is given based on the assumption that a loop process from address 0000 through address 0003 shown in FIG. 2, for example, is performed at high speed.)

The SRAM 105 is connected to the CPU 103 and the HWE 104 via the bus 107 and serves as a shared memory in which temporary data for processing by the CPU 103 or the HWE 104 or the like is stored. As such a memory, an SRAM (Static RAM) which is capable of operating at high speed is generally used, but the present invention is not limited to this.

Figure 4:
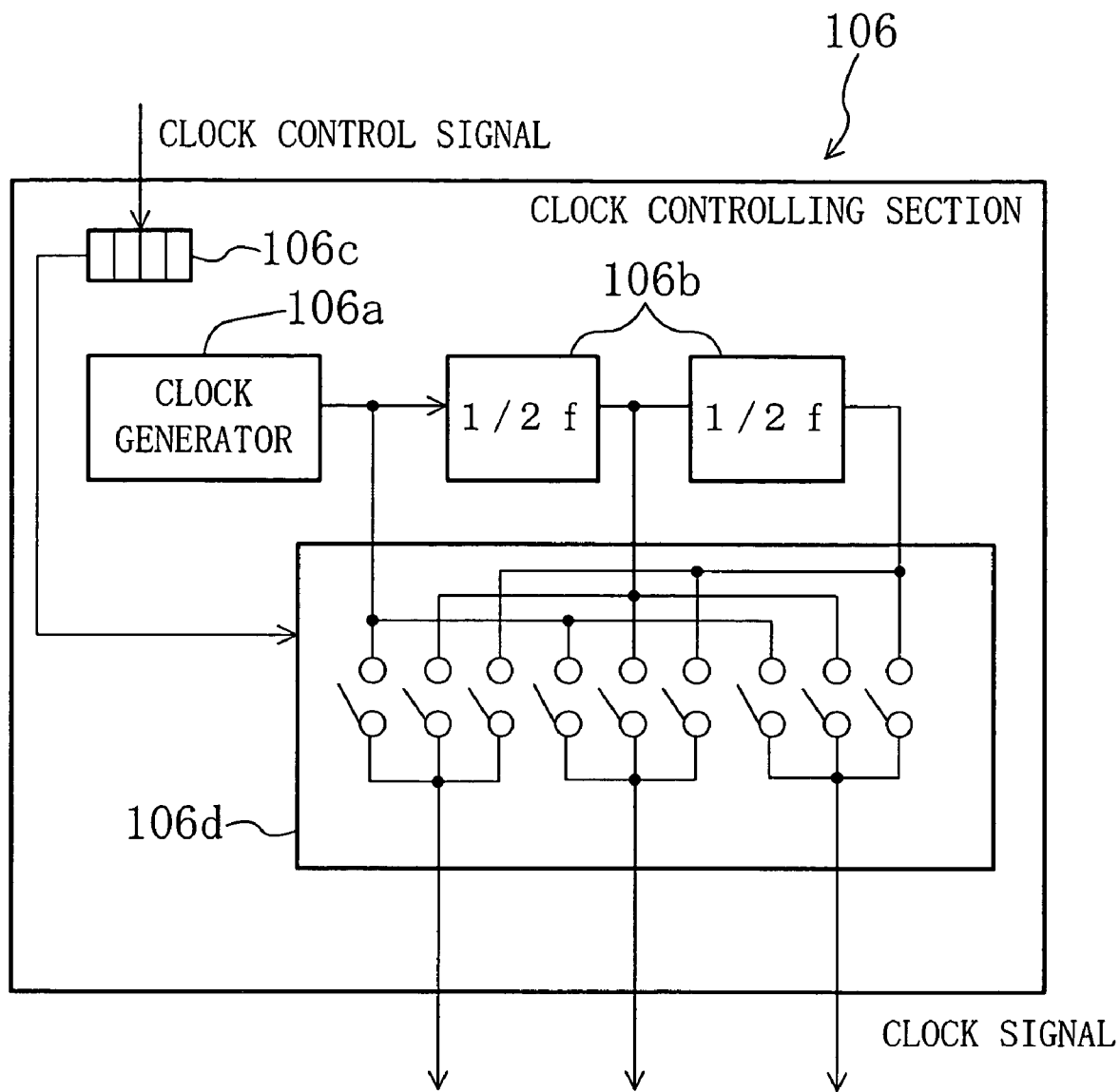
FIG. 4 is a block diagram showing a specific configuration of a clock controlling section 106 according to embodiment 1.

The clock controlling section 106 supplies, to the CPU 103, the HWE 104 and the SRAM 105, clock signals having frequencies according to the clock control signal output from the flag detector 101. Specifically, as shown in FIG. 4, the clock controlling section 106 includes: a clock generator 106a for generating a clock signal with a given frequency; frequency dividers 106b for dividing the frequency of the clock signal at a given ratio; a frequency controlling register 106c for holding a clock control signal output from the flag detector 101; and a selector 106d for selectively outputting a clock signal with a frequency according to information held in the frequency controlling register 106c to the CPU 103, the HWE 104 and the SRAM 105.

Figure 5:
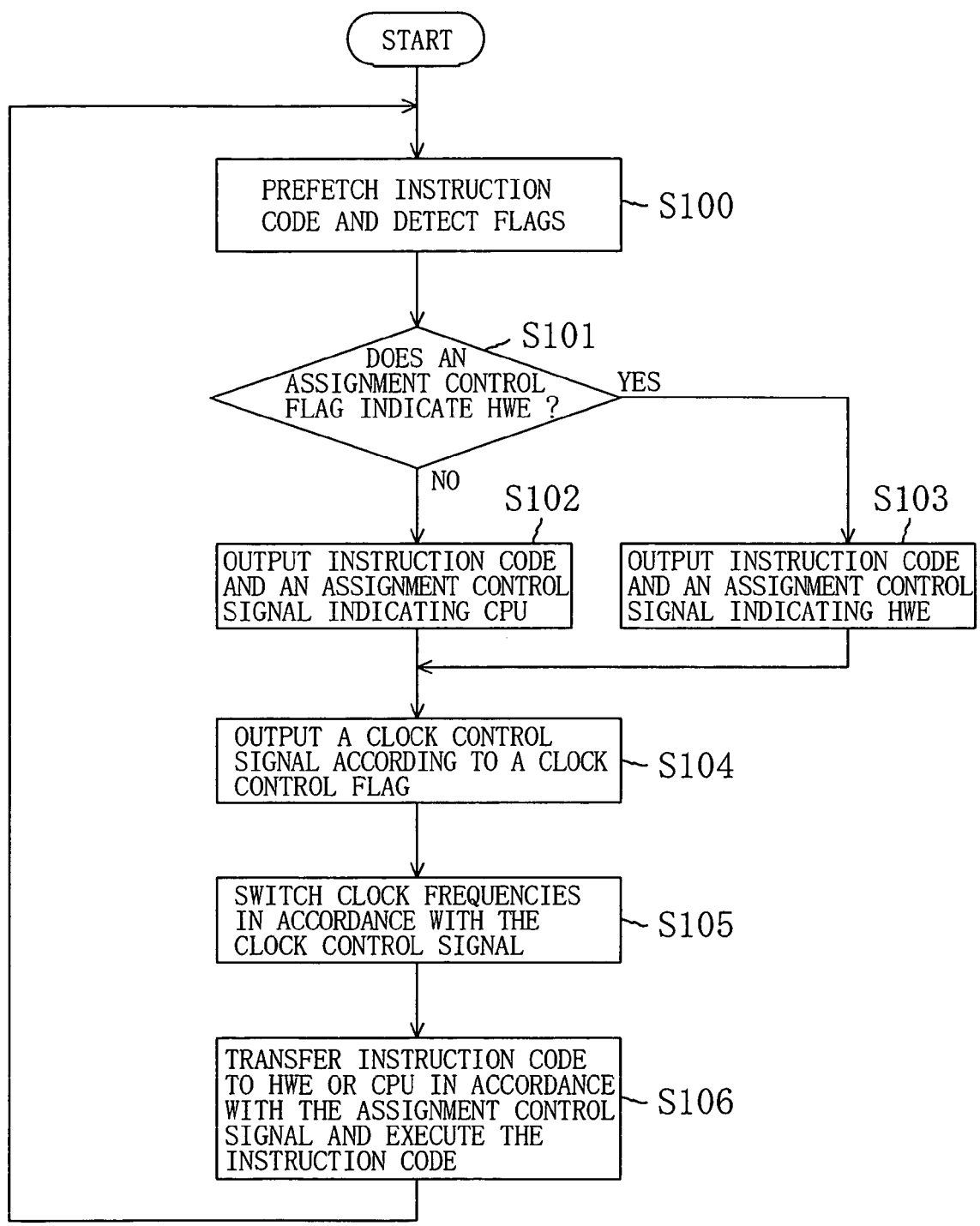
FIG. 5 is a flowchart showing operation of the processor system of embodiment 1.

Now, it will be described how the processor system thus configured operates. FIG. 5 is a flowchart showing control operation performed when an instruction stored in the storage section 100 is executed. The control operation of the processor system is schematically shown in the drawing. However, respective steps are not performed in the order shown in the drawing in practice, and operations of respective sections are generally performed in parallel.

(S100) The flag detector 101 prefetches instruction code (or instruction code sets) stored in the storage section 100 and detects an assignment control flag and a clock control flag contained in the instruction code.

(S101) to (S103) Next, the flag detector 101 then outputs an assignment control signal indicating the CPU 103 or the HWE 104 based on a detection result of the assignment control flag and the instruction code, to the instruction assignment controlling section 102. At this time, the flags may remain in the instruction code or may be removed therefrom.

(S104) Thereafter, the flag detector 101 outputs a clock control signal to the clock controlling section 106 based on a detection result of the clock control flag.

(S105) The clock controlling section 106 switches the frequencies of clock signals to be output to the CPU 103 and the HWE 104, respectively, in accordance with the clock control signal. Specifically, in the example of a program shown in FIG. 2, a clock signal with a frequency of f is supplied to the HWE 104 when instruction code for addresses 0000 through 0004 is executed. On the other hand, a clock signal with a frequency of f/2 is supplied to the CPU 103 when instruction code for addresses 0005 through 0008 is executed whereas a clock signal with a frequency of f is supplied thereto when instruction code for address 0009 is executed. Out of the clock signals supplied to the CPU 103 and the HWE 104, a clock signal with a higher frequency is supplied to the SRAM 105.

(S106) The instruction assignment controlling section 102 transfers the instruction code to the CPU 103 or the HWE 104 in accordance with the assignment control signal output from the flag detector 101. In the example of a program shown in FIG. 2, the instruction code for addresses 0000 through 0004 is transferred to the HWE 104 to be executed. The instruction code for addresses 0005 through 0009 is transferred to the CPU 103 to be executed.

Now, the contents of the program shown in FIG. 2 will be described briefly. Instruction code for addresses 0000 through 0003 indicates that loop operation in which instruction code for addresses 0001 through 0002 is repeated four times is performed. Instruction code for address 0004 indicates that the loop operation causes data to be held in a register (A) in the HWE 104 and then stored in an area represented by address xxxx in the SRAM 105. Instruction code for address 0009 indicates that data stored in the SRAM 105 by the HWE 104 is added to the data which has been held in the register (A) in the CPU 103 after processing for addresses 0005 through 0008 by the CPU 103.

Figure 6:
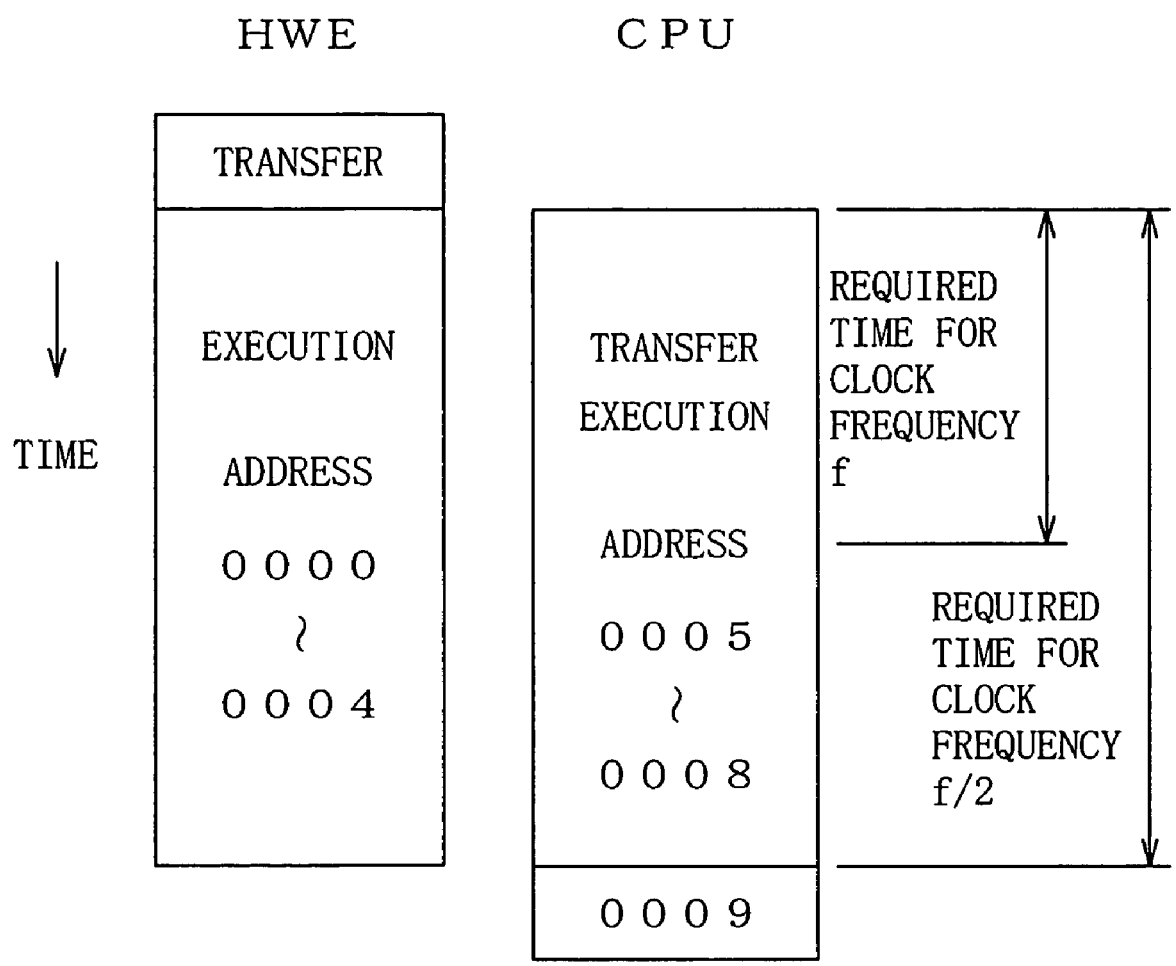
FIG. 6 shows an operation state of the processor system of embodiment 1.

In the execution of such a program, as shown in FIG. 6, instruction code for addresses 0000 through 0004 is transferred to the HWE 104 to be executed. On the other hand, instruction code for addresses 0005 through 0008 is transferred sequentially to be executed, concurrently with the execution by the HWE 104.

Suppose execution of instruction code for addresses 0000 through 0003 by the HWE 104 is performed with two clocks in a loop and is two times as efficient as that by the CPU 103 and execution of instruction code for address 0004 is performed with one clock, for example, then nine clocks (two clocks×four loops+one clock) are required in total. On the other hand, suppose execution of instruction code for addresses 0005 through 0008 by the CPU 103 is performed with four clocks, then the number of required clocks is about ½ of the number of clocks necessary for the loop operation by the HWE 104.

Accordingly, if clock signals with the same frequency of f are supplied to the CPU 103 and the HWE 104, the CPU 103 completes execution of instruction code up to address 0008 in a period which is about ½ of that by the HWE 104. In this case, instruction code for next address 0009 refers to a result of the loop operation by the HWE 104, and thus is not executed until this loop operation terminates. During this period, the CPU 103 wastes electric power. Specifically, in a case where processings by the CPU 103 and the HWE 104 need to be integrated, even if processing by one of the CPU 103 and the HWE 104 is completed earlier (because of a high processing ability due to relatively excessive operating performance), the completed processing needs to wait for a result of the other processing with its internal state maintained. During this waiting period, the idle state continues so that power is continuously consumed because of unnecessary toggling.

As described above, in the processor system of this embodiment, a clock signal with a frequency of f/2 is supplied to the CPU 103 based on the clock control flag when the CPU 103 executes instruction code for address 0005 through 0009. Accordingly, power consumed by the CPU 103 is reduced to about ½ and processing by the CPU 103 terminates almost concurrently with termination of processing by the HWE 104 to which a clock signal with a frequency of f is supplied (i.e., these processings are performed within the same period of time). This avoids degradation of the processing ability of the entire processor system. That is, various processes are performed in an operation mode in which a combination of clock frequencies is optimized to achieve both high processing ability and low power consumption. In addition, assignments to processors and control of clock frequencies are performed based on flags added to instruction code as described above, so that it is unnecessary to provide a complicated decoding circuit or the like. As a result, the circuit scale is reduced.

Depending on the number of necessary clocks for each instruction and the frequency capable of being supplied, the waiting time might not be eliminated. Even such a case, if the waiting time is shortened by using a frequency lower than the maximum, power consumption is reduced without degradation of the processing ability.

If one of the CPU 103 and the HWE 104 does not operate, i.e., no instructions to be executed are assigned thereto, or the timings of terminating executions of instructions by processors do not exactly coincide with each other to cause a waiting time, for example, supply of clock signals may be stopped (or clock signals to be input may be disabled.)

Embodiment 2

Now, an example of an instruction sequence optimization device for generating instruction code to which flags for controlling assignments to processors and clock frequencies are added as described above will be described.

The instruction sequence optimization device is constituted by a computer for executing programs such as a compiler and an optimizer. A functional configuration thereof is shown in FIG. 7.

In the drawing, a storage section 201 stores a source program and an object program before and after addition of flags. Examples of the source program include an executable machine language program made of an instruction code sequence, an assembler and a more abstract C-language program. In the case of the assembler program or the C-language program, for example, flags may be added concurrently with translation into a machine language program, or a machine language program to which flags are added may be generated after an intervening program containing information indicating addition of flags has been generated.

An instruction analyzer 202 (instruction analyzing means) analyzes a source program to determine which processor is capable of executing an instruction (including a set of instructions formed by an instruction sequence) contained in the source program and whether the instruction is capable of being executed in parallel. The instruction analyzer 202 also determines a relationship among the instructions (dependency relationship between processes), i.e., constraints on execution timings that if a result of execution of an instruction I1 is referred to for execution of another instruction I2, the instruction I2 is not executed until the instruction I1 is completed.

A standard execution period estimating section 203 (execution period estimating means) estimates a standard execution period during which an instruction is executed by a processor at a standard clock frequency (e.g., the maximum frequency: hereinafter, referred to as a "standard clock frequency".) Specifically, the standard execution period is obtained by referring to a table in which the number of clocks necessary for execution of various instructions by each processor is registered and by multiplying this clock number by the inverse (1/f) of the standard clock frequency. As for the number of necessary clocks, the number of clocks necessary for execution by a given reference processor is obtained in the manner described above and the obtained number of necessary clocks is multiplied by efficiency (the processing ability ratio with respect to the given reference processor) in execution by another processor, thereby easily estimating the number of clocks necessary for the execution by another processor. In a case where loop operation or conditional branches are included in a program, for example, the number of necessary clocks is not always obtained accurately. In such a case, if the number of loop operations or conditional branches, for example, is set by simulation using, for example, sample data, specification by a program designer or the like, an appropriately-estimated value or the worst value is obtained as the number of necessary clocks.

A converted executing time calculating section 204 calculates converted execution periods necessary for a case where instructions are executed by respective processors at various clock frequencies. Specifically, each converted execution period is obtained by standard execution period×(standard clock frequency/each clock frequency). Alternatively, the converted execution periods may be obtained by referring to a table in which converted execution periods corresponding to respective combinations of the standard execution periods and various clock frequencies are registered beforehand.

As a standard execution period and a converted execution period, a value in units of time may be used literally, or the number of clocks may be used instead. Specifically, the number of necessary clocks may be used as a standard execution period, and the number of necessary clocks×(standard clock frequency/each clock frequency) may be used as a converted execution period according to each clock frequency, for example.

Figure 8A:
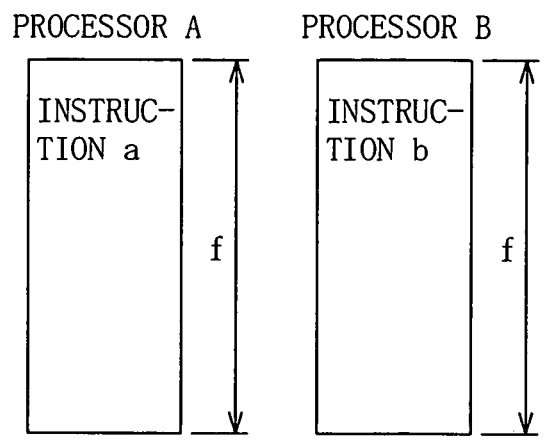
FIGS. 8A and 8B show examples of a relationship of assignments of instructions to processors with respect to clock frequencies and execution periods in the instruction sequence optimization device of embodiment 2.
Figure 8B:
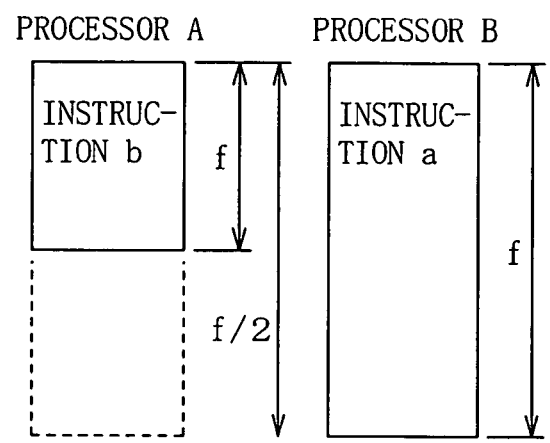

An assignment/clock frequency determining section 205 (assignment determining means and clock frequency determining means) determines assignments of instructions to processors and the frequencies of clock signals to be supplied in executions of the respective instructions so as to minimize power consumption, based on information indicating both constraints on processors capable of executing instructions and the execution timings determined by the instruction analyzer 202 and also based on the converted execution periods for the respective instructions calculated by the converted executing time calculating section 204. Specifically, as shown in FIGS. 8A and 8B, in a case where instructions a and b are executed by processors A and B, for example, suppose the clock frequency is f, both the processors A and B need the same execution period for the instruction a, the period of execution of the instruction b by the processor A is ½ of that by the processor B, and a next instruction is not executed until executions of the instructions a and b are both completed. Then, if the instruction b is executed by the processor A, processing of the processor A has a margin. Accordingly, if the clock frequency of the processor A is adjusted to f/2, power consumption is reduced without an influence on the total processing time.

A flag adding section 206 (assignment control information adding means and clock control information adding means) adds assignment control flags and clock control flags to instruction code including respective instructions as shown in FIG. 2, based on the assignments and frequencies determined by the assignment/clock frequency determining section 205. Instead of or together with the addition of assignment control flags, one or a sequence of instruction code sets capable of being executed in parallel by the CPU 103 and the HWE 104 may be replaced with a parallel processing instruction.

Now, it will be described how the instruction sequence optimization device operates with reference to FIG. 9.

(S1000) First, a source program is analyzed and processors capable of executing respective instructions are determined. If a plurality of instructions are executed in parallel, constraints on instruction execution timings, e.g., the constraint that execution of a next instruction is prohibited unless executions of all the current instructions are completed, are detected.

(S1001) Next, it is determined whether or not all the instructions included in the source program are executable only by a given processor. If the determination result is Yes, the process proceeds to (S1006), which will be described later, because all the instructions only need to be executed by the given processor at, for example, the maximum clock frequency.

(S1002) If the determination result at (S1001) is No, the standard execution periods during which the instructions are executed by respective processors at their standard frequencies are estimated.

(S1003) Thereafter, the converted execution periods necessary for executions of the instructions by the processors at various clock frequencies are calculated.

(S1004) Assignments of the instructions to the processors and the frequencies of clock signals to be supplied for executions of the instructions are determined so as to minimize power consumption, based on the converted execution periods thus calculated and a relationship among the instructions (constraints on the timings of executing the instructions) detected at (S1000).

Specifically, first, as described with reference to FIG. 8, among all the combinations of assignments of instructions to processors capable of executing the instructions, a processor which has a margin in its processing when all the processors operate at, for example, standard clock frequencies, i.e., a processor which waits for termination of processing by the other processors, is detected. Then, the minimum clock frequency that does not affect the total processing time of the processor having the margin, i.e., the minimum frequency that allows an operation whose result is referred to by a subsequent instruction to terminate before an operation by the other processors (or a ratio between such a frequency and a standard clock frequency, for example), is obtained. (It should be noted that in practice, each standard execution period and the associated converted execution period are compared so that the frequency corresponding to the longest converted execution period out of the converted execution periods equal to or shorter than the standard execution period may be obtained.)

In this manner, in each combination of assignments, executions of instructions by processors are associated with clock frequencies for the respective executions, so that power consumption (which may be the total number of clocks necessary for executions of instructions, for example, in practice) for each combination of assignments is obtained.

Accordingly, if a combination of assignments which achieves the lowest power consumption is obtained, instruction assignments and clock frequencies for reducing power consumption without degradation of the processing ability are determined.

(S1005) Assignment control flags and clock control flags based on the determined instruction assignments and clock frequencies are added to instruction code of instructions included in the source program, and the resultant instruction code is stored in the storage section 201 as an object program.

(S1006) On the other hand, if all the instructions included in the source program are determined to be executable only by a given processor at (S1001), these instructions only need to be executed by the given processor at, for example, the maximum clock frequency as described above. Accordingly, an assignment flag indicating an assignment to the given processor and a clock control flag indicating the maximum clock frequency are added to instruction code of instructions included in the source program.

(S1007) The processes from (S1002) through (S1005) are repeated until the processing on all the instructions included in the source program is completed.

Accordingly, instruction code in which the assignment control flag and the clock control flag are added in the manner described above is generated, thus obtaining a program allowing a processor system including a plurality of processors as described in embodiment 1 to operate with greatly-reduced power consumption and without degradation of the processing ability.

In (S1004), in cases where the number of combinations of all the assignments is large, for example, consideration of combinations in which an extremely large number of instructions are assigned to a small number of processors may be omitted so that the processing load of the optimization device can be reduced. Specifically, for example, in determining assignments to processors, the proportion of the amount of processing (e.g., processing time or the total number of necessary clocks) by each processor may be limited to a given range based on, for example, predetermined processing-proportion-setting information indicated by the broken lines in FIGS. 7 and 9 (by a processing proportion setting means) so that a combination which achieves the lowest power consumption is selected out of combinations of assignments within the given range. Then, addition of flags as described above is performed at high speed. In such a case, the parallelism (the number of processors operating at the same time) in executing instructions by the processors is increased, resulting in higher speed in executing all instructions. In particular, if it is possible to set processing proportions individually, power consumption of the processor system, the speed in executing instructions in the processor system and the load in the addition of flags by the optimization device are adjusted depending on purposes of the processor system. In addition, such processes as described above are not necessarily performed at a time for all the instructions included in the source program and may be performed for every given instruction sequence. Even in such a case, if the length of the instruction sequence is appropriately set to reduce local power consumption, the total power consumption is greatly reduced and the number of combinations of assignments is also reduced, thus also reducing the load in processing of the optimization device.

In calculating power consumption, multiplication by a given coefficient may be performed, for example, in consideration of the difference in power consumption among processors so as to ensure reduction of the power consumption.

In the foregoing example, the converted execution periods are used to determine a processor having a margin in its processing and the minimum clock frequency that does not affect the total processing time. However, the present invention is not limited to this example, and standard execution periods may be used. Specifically, the presence of a margin may be determined based on the difference between standard execution periods, for example, or the minimum clock frequency, for example, may be obtained based on the ratio between standard execution periods, for example.

Modified Example of Embodiment 2

Another instruction sequence optimization device in which a flag is added to instruction code in the same manner as for the instruction sequence optimization device of embodiment 2 will be described. Hereinafter, components having similar functions to those described in embodiments 1 and 2, for example, are indicated by the same reference numerals, and thus description thereof will be omitted.

Figure 10:
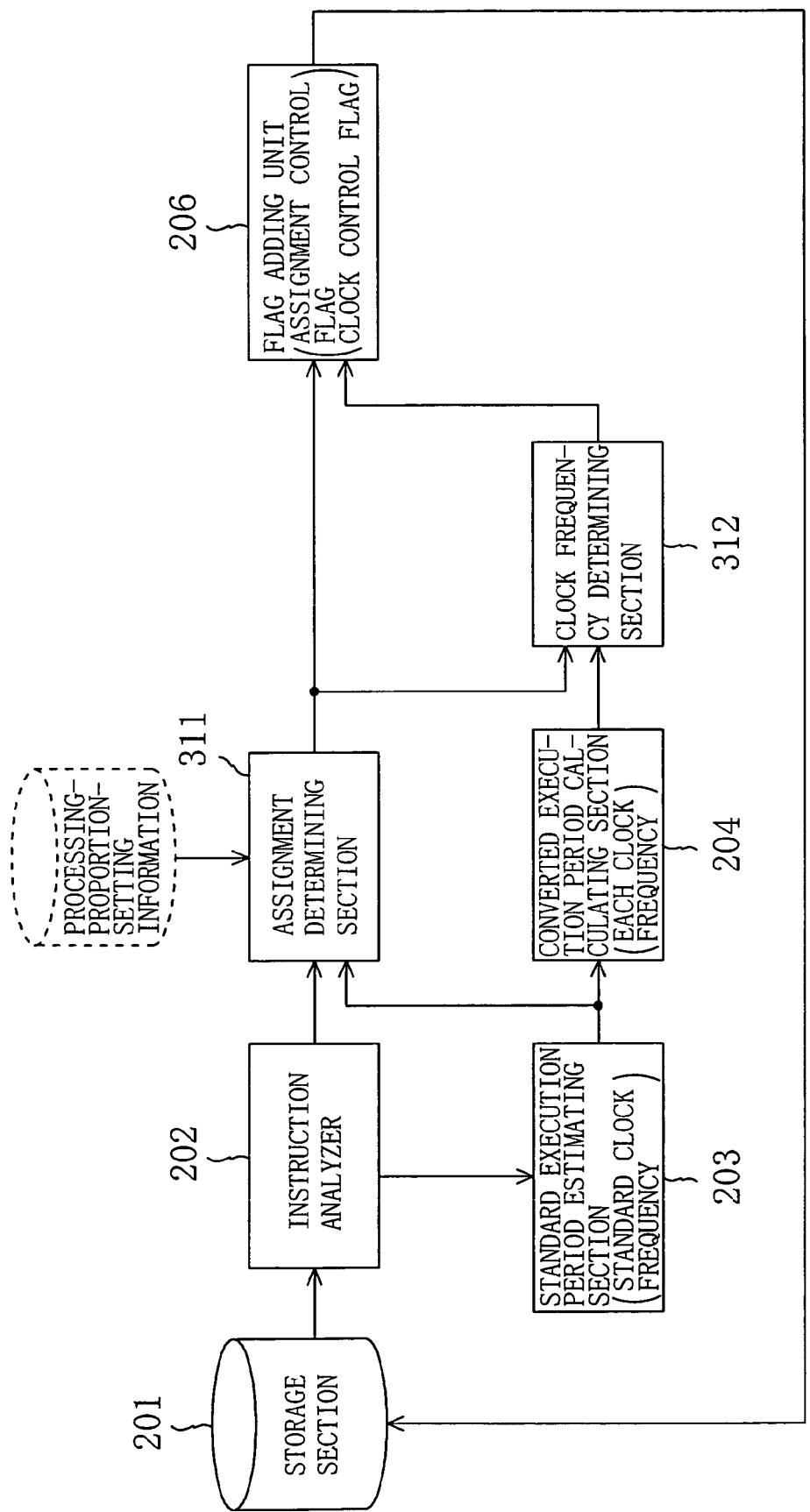
FIG. 10 is a block diagram showing a configuration of an instruction sequence optimization device according to a modified example of embodiment 2.

In this instruction sequence optimization device, assignments of instructions to processors are determined such that an instruction executable by a plurality of processors is executed by a processor exhibiting the shortest standard execution period, and the clock frequency is determined so as to reduce power consumption based on the assignments. Specifically, as shown in FIG. 10, for example, this device is different from that of embodiment 2 (shown in FIG. 7) in that an assignment determining section 311 and a clock frequency determining section 312 are provided instead of the assignment/clock frequency determining section 205.

The assignment determining section 311 determines assignments such that an instruction executable by a plurality of processors is executed by a processor exhibiting the shortest standard execution period (i.e., with the smallest number of necessary clocks) calculated by a standard execution period estimating section 203.

The clock frequency determining section 312 determines clock frequencies so as to make a processor having a margin in its processing when all the processors operate at the standard clock frequencies operates at the minimum clock frequency that does not affect the total processing time (i.e., so as to minimize the waiting time), with respect to the assignments determined as described above.

Figure 11:
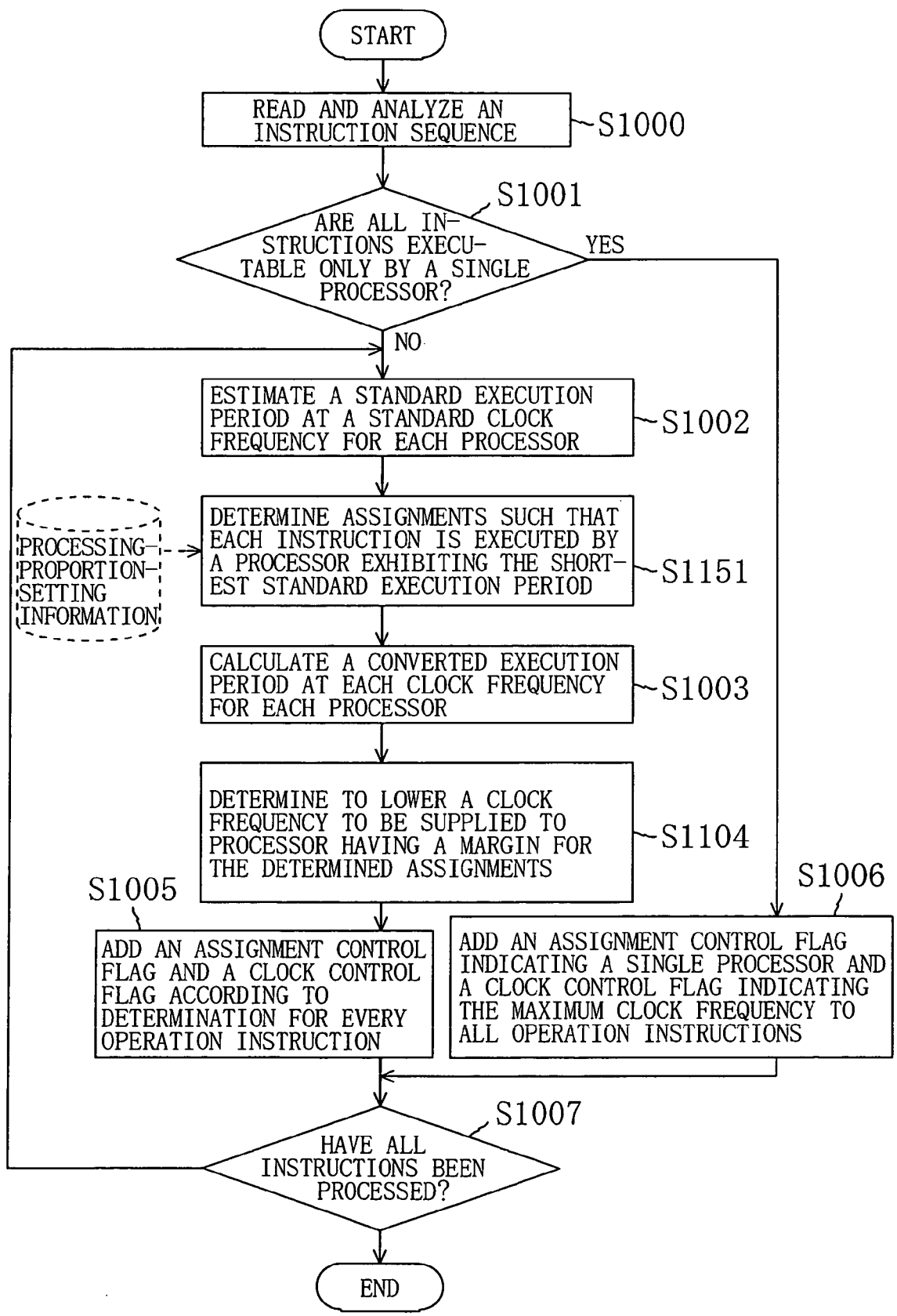
FIG. 11 is a flowchart showing operation of the instruction sequence optimization device of the modified example of embodiment 2.

As shown in FIG. 11, operation of the instruction sequence optimization device thus configured is different from that in embodiment 2 (shown in FIG. 9) in the following processes.

(S1151) After standard execution periods have been calculated (S1002), assignments to processors are determined such that an instruction executable by a plurality of processors is executed by a processor exhibiting the shortest standard execution period.

(S1104) Unlike (S1004) in FIG. 9, only clock frequencies are determined. Specifically, this determination is performed such that when each instruction is executed by the processor assigned at (S1151) at the standard clock frequency, a processor in which a waiting time arises (i.e., which has a margin) for termination of other processors is supplied with a clock signal with the minimum frequency that reduces the waiting time and does not affect the total processing time. Accordingly, power consumption is reduced without degradation of the processing ability of the processor system within a range of assignments to processors as described above.

After the assignments to processors and the clock frequencies have been thus determined, assignment control flags and clock control flags according to this determination are added to instruction code at (S1005) in the same manner as in embodiment 2.

As described above, each instruction is executed by a processor exhibiting the shortest standard execution period, efficiency in executing instruction code is enhanced so that the total number of necessary clocks is reduced. In addition, reduction of the frequency of a clock signal supplied to a processor having a margin in its execution period allows reduction of unnecessary toggling of transistors, thus greatly reducing power consumption. Furthermore, determination of the clock frequencies is performed only on a combination of assignments to a set of processors, so that the load in processing by the optimization device is reduced and addition of flags is performed at high speed.

As described above, in a case where assignments are performed such that each instruction is executed by a processor exhibiting the shortest standard execution period, a program including a large number of instructions of the same type might be assigned to one or a small number of processors. In this case, although power consumption is reduced, the parallelism in processing by processors is reduced so that the time required for execution in the entire program becomes longer. Therefore, to shorten the execution period of the entire program even permitting the increase of power consumption to some extent, the proportion of the amount of processing by each processor is limited to a given range based on, for example, proportion setting information as shown by the broken lines in FIGS. 10 and 11, as in embodiment 2.

Instead of being assigned to a processor exhibiting the shortest standard execution period, each instruction may be assigned to a processor such that the execution period for the entire program (or whole of a given instruction sequence) is the shortest when all the processors operate at their standard clock frequencies, for example. Specifically, each instruction executable by a plurality of processors is not necessarily assigned to a processor exhibiting the shortest execution period. If such an instruction is assigned to another processor capable of executing the instruction concurrently with that processor to enhance the parallelism in executing instructions by processors, the execution period of, for example, the entire program is shortened. Even in this case, reduction of the frequency of a clock signal supplied to a processor with a margin in its execution period suppresses unnecessary toggling of transistors, thereby reducing power consumption. In this case, also, if the proportion of the amount of processing by each processor is limited to a given range as described above, for example, so that assignments are determined so as to shorten the execution period within this range, the load in processing by the optimization device is reduced.

Moreover, executions of instructions may be rearranged in a different order when the assignment determining section 311 (rearrangement means) determines assignments to processors, for example. More specifically, as shown in FIG. 12, for example, instructions may be rearranged at (S1251) in addition to the steps shown in FIG. 11.

Specifically, in a case where instructions a through d as shown in FIG. 13A, for example, are written in a source program, suppose each of the instructions a and c is sequentially executable with four clocks by a processor A, the instruction b is executable with 12 clocks independently of operation of the processor A after being transferred to a processor B, and the instruction d is executable after executions of the instructions a through c have terminated. Then, if processing is performed in the order as described in the source program, the instructions are executed in the manner shown in FIG. 13B as follows:

(1) The instruction a is executed on conditions that the clock frequency is f and the number of necessary clocks is four, while being sequentially transferred to the processor A.

(2) After termination of the instruction a, the entire instruction b is transferred to the processor B at a time, and then is executed on conditions that the clock frequency is f and the number of necessary clocks is 12.

(3) In parallel with the execution of the instruction b, the instruction c is executed on conditions that the clock frequency is f/3 and the number of necessary clocks is four (the converted execution period when the clock frequency is f corresponds to 12 clocks), while being sequentially transferred.

In a case where executions of instructions are rearranged in a different order as shown in FIG. 13C, the instructions are executed in the manner shown in FIG. 13D as follows:

(1) The whole instruction b is transferred to the processor B at a time, and then is executed on conditions that the clock frequency is f×¾ and the number of necessary clocks is 12 (the converted execution period corresponds to 16 clocks).

(2) In parallel with the execution of the instruction b, the instruction a is executed on conditions that the clock frequency is f/2 and the number of necessary clocks is four (the converted execution period corresponds to eight clocks), while being sequentially transferred to the processor A.

(3) Subsequently, the instruction c is also executed on conditions that the clock frequency is f/2 and the number of necessary clocks is four (the converted execution period corresponds to eight clocks).

That is, executions of the instructions are rearranged in a different order, so that the parallelism in processing by processors is enhanced, thereby increasing a margin in the execution period. Accordingly, each of the instructions a through c can be executed at a low clock frequency, thus greatly reducing power consumption. If the clock frequencies are reduced, power consumption can be further reduced due to, for example, reduction of power supply voltages which will be described later. However, reduction of power consumption by reducing the clock frequency to f/2 with respect to the instructions a and c as that after the rearrangement is greater than that by reducing the clock frequency to f/3 with respect to only the instruction c in the original sequence of executions. The above-described rearrangement of executions of the instructions may be performed such that the instruction b is executed at a clock frequency of f and the instructions a and b are executed at a frequency of f×⅔ as shown in FIG. 13E. In such a case, the total processing speed is enhanced and the power consumption is reduced as compared to that before the rearrangement of executions of the instructions.

Embodiment 3

Now, an example of a processor system capable of reducing power consumption even by using usual instruction code containing no flags, to the same extent as that by controlling clock frequencies and others based on flags added to the instruction code as described in embodiment 1 will be described. Instead of detecting flags added to the instruction code, this processor system has a function of determining assignments of instructions and clock frequencies as the instruction sequence optimization device of embodiment 2 so as to control assignments of instructions and clock frequencies based on the determination.

Figure 14:
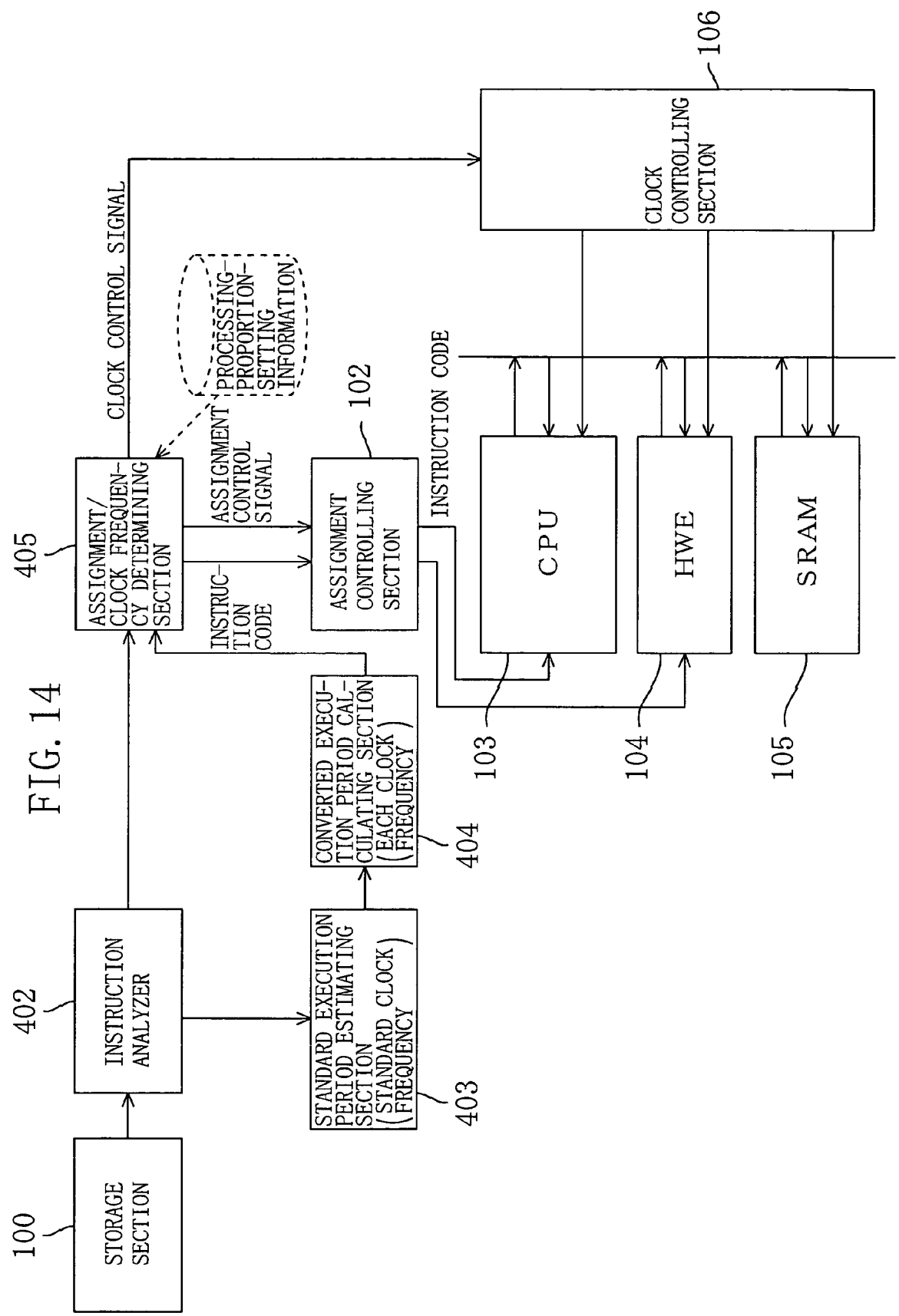
FIG. 14 is a block diagram showing a configuration of a main portion of a processor system according to embodiment 3.

Specifically, as shown in FIG. 14, for example, an instruction analyzer 402 (instruction analyzing means); a standard execution period estimating section 403 (execution period estimating means); a converted execution period calculating section 404; an assignment/clock frequency determining section 405 (assignment determining means and clock frequency determining means) are provided, instead of the flag detector 101 of embodiment 1 (shown in FIG. 1). These components have similar functions to those of the instruction analyzer 202, standard execution period estimating section 203, converted execution period calculating section 204 and assignment/clock frequency determining section 205, respectively, of embodiment 2 (shown in FIG. 7). It should be noted that an instruction sequence optimization device as described in embodiment 2 is provided with the foregoing functions by software and a computer whereas the processor system of this embodiment is configured by hardware for control at timings according to the speed in executing instructions by the CPU 103 and the HWE 104, in general. (However, the present invention is not limited to this, and the control may be achieved by a processor or other processor at a higher level than the CPU 103, for example.)

Figure 15:
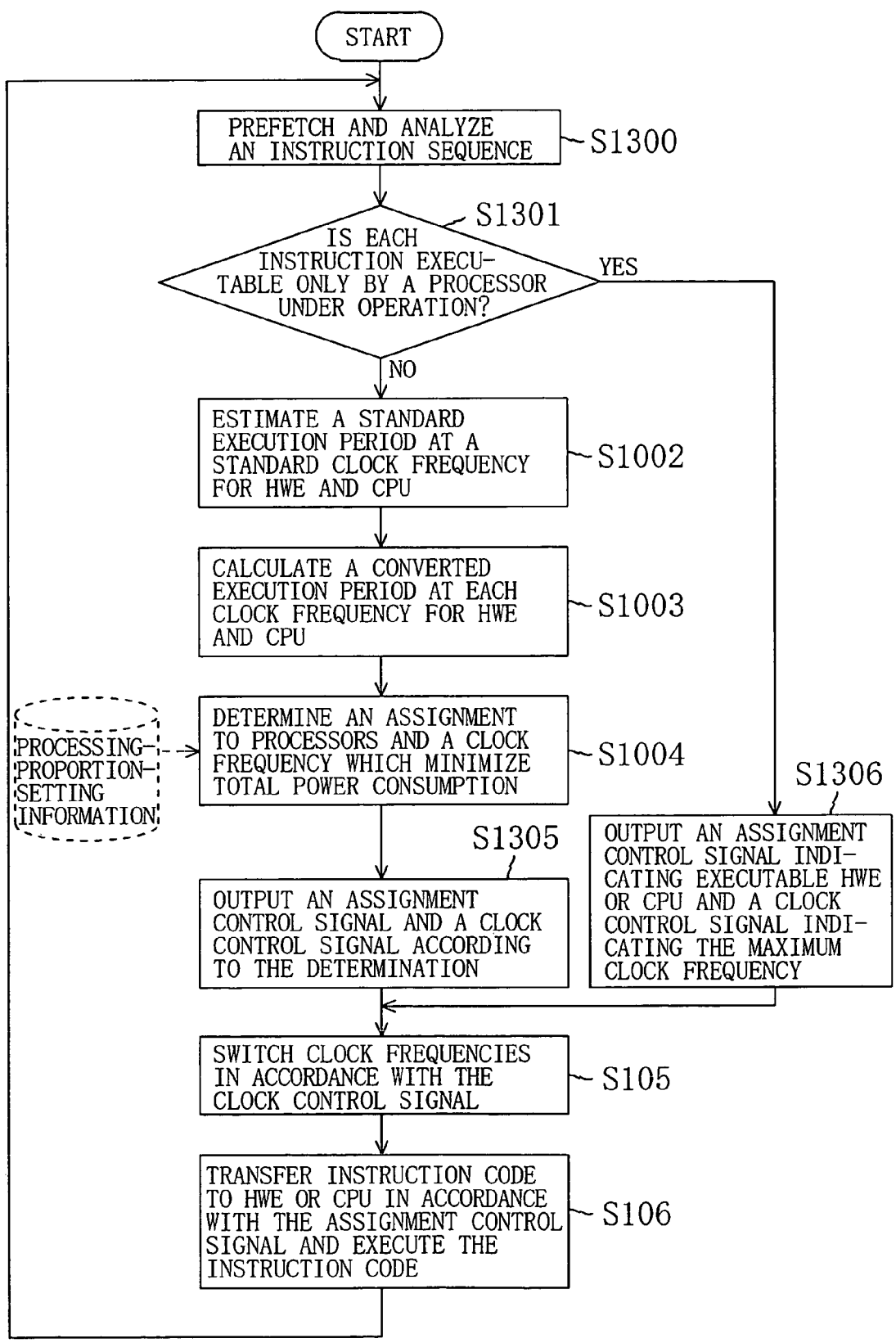
FIG. 15 is a flowchart showing operation of the processor system of embodiment 3.

Operation of this processor system is similar to that of a combination of operations described in embodiments 1 and 2 (shown in FIGS. 5 and 9) as shown in FIG. 15 in general.

(S1300) First, the instruction analyzer 402 prefetches a given amount of an instruction code sequence stored in a storage section 100. The instruction code is analyzed basically in a similar manner to that at (S1000) in embodiment 2. However, if the instruction analyzer 402 is constituted by hardware, the entire instruction code is not necessarily analyzed at a time and every instruction code sequence in the given amount according to the scale of the hardware may be analyzed.

(S1301) Next, if an instruction included in the prefetched instruction code sequence is executable by only one of the CPU 103 and the HWE 104, and this one of the CPU 103 and the HWE 104 which can execute the instruction is under operation (i.e., in a state in which executions of the other instructions are not completed), the process proceeds to (S1306), which will be described later, and then an assignment signal indicating one of the CPU 103 and the HWE 104 which is capable of executing the instruction and a clock control signal indicating, for example, the maximum clock frequency are output. That is, in such a case, the CPU 103 and the HWE 104 do not operate in parallel, so that the whole of the foregoing processing ability depends on execution periods for the respective instructions. Accordingly, the assignments and the clock frequencies need to be set as described above.

(S1002) through (S1004) On the other hand, if instructions included in the instruction code sequence are respectively executable in different ones of the CPU 103 and the HWE 104, or are executable in one of the CPU 103 and the HWE

104 which is not executing another instruction, parallel processing can be performed. Accordingly, standard execution periods are estimated and converted execution periods are calculated in the same manner as described in embodiment 2 (FIG. 9). Then, assignments to processors and clock frequencies are determined so as to minimize power consumption during execution of the prefetched instruction code sequence.

(S1305) An assignment control signal and a clock control signal based on the determinations of the instruction assignments and the clock frequencies are output to the instruction assignment controlling section 102 and the clock controlling section 106, respectively.

(S1306) As described in (S1301), if each instruction included in the prefetched instruction code sequence is executable by only one of the CPU 103 and the HWE 104 and this one of the CPU 103 and the HWE 104 which is capable of executing the instruction is determined to be in a state in which execution of another instructions is not completed, an assignment signal indicating one of the CPU 103 and the HWE 104 which is capable of executing the instruction and a clock control signal indicating the maximum clock frequency are output.

(S105) through (S106) The clock controlling section 106 switches the frequencies of clock signals to be output to the CPU 103, HWE 104 and SRAM 105 in accordance with the clock control signal. The instruction assignment controlling section 102 transfers instruction code to the CPU 103 or the HWE 104 in accordance with the assignment control signal to have instructions executed.

As described above, assignments to processors and the clock frequencies are determined by analyzing instruction code during execution, so that power consumption is reduced even in the case of using usual instruction code in which no flags are added.

In the processor system of this embodiment, as indicated by the broken lines in FIGS. 14 and 15, the proportion of the amount of processing by each processor is limited to a given range (by processing proportion setting means) to select a combination which achieves the lowest power consumption out of combinations of assignments within this range, based on processing-proportion-setting information, for example. Accordingly, the scale of hardware for obtaining the combination of assignments for minimizing power consumption is reduced, and the parallelism in processing by the CPU 103 and the HWE 104 is increased, thereby enhancing the speed in executing the entire instruction sequence.

Modified Example of Embodiment 3

Another processor system capable of reducing power consumption even by using usual instruction code containing no flag as the processor system of embodiment 3 will be described.

This processor system has a similar function to that described in the modified example (shown in FIG. 10) of embodiment 2 to control assignments of instructions and clock frequencies, whereas the processor system (shown in FIG. 14) of embodiment 3 has the function of determining assignments of instructions and clock frequencies as the instruction sequence optimization device (shown in FIG. 7) of embodiment 2. Specifically, assignments of instructions are determined such that an instruction executable by any one of the CPU 103 and the HWE 104 is executed by one of these processors which exhibits a shorter standard execution period and the clock frequencies are determined according to the assignments in such a manner as to reduce power consumption, thereby controlling the assignments and the frequencies.

Figure 16:
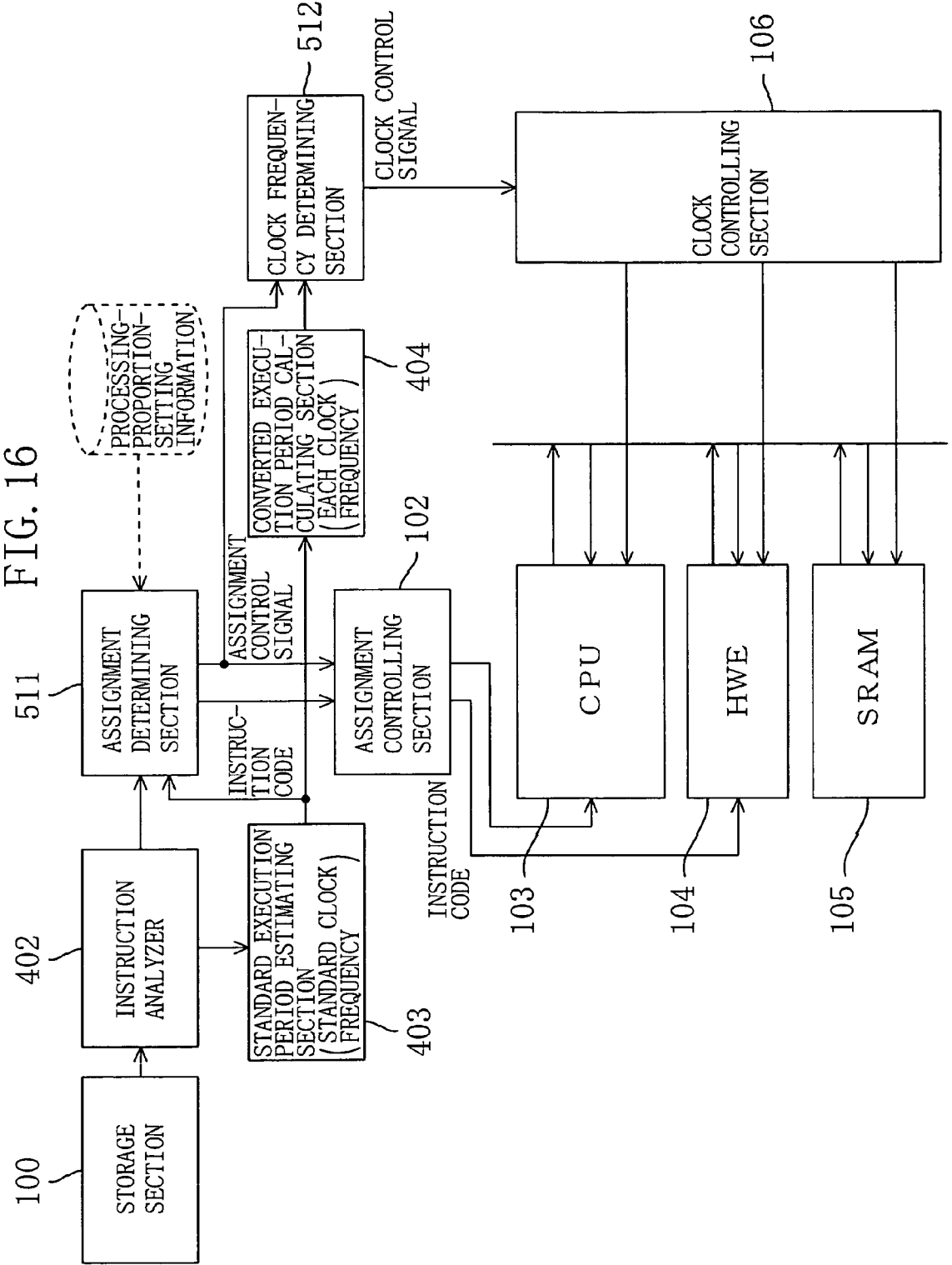
FIG. 16 is a block diagram showing a configuration of a main portion of a processor system according to a modified example of embodiment 3.

More specifically, as shown in FIG. 16, for example, this modified example is different from embodiment 3 (shown in FIG. 14) in that an assignment determining section 511 and a clock frequency determining section 512 are provided instead of the assignment/clock frequency determining section 405.

The assignment determining section 511 and the clock frequency determining section 512 have respective functions similar to those of the assignment determining section 311 and the clock frequency determining section 312 of the modified example (shown in FIG. 10) of embodiment 2. Specifically, the assignment determining section 511 determines assignments such that each instruction executable by both the processors is executed by one of the processors which exhibits a shorter standard execution period (i.e., with a smaller number of necessary clocks) based on standard execution periods calculated by the standard execution period estimating section 403.

With the assignments thus determined, the clock frequency determining section 512 determines clock frequencies such that one of the processors which has a larger margin in its processing when both the processors operate at, for example, the standard clock frequencies operates at the minimum clock frequency that does not affect the total processing time.

Figure 17:
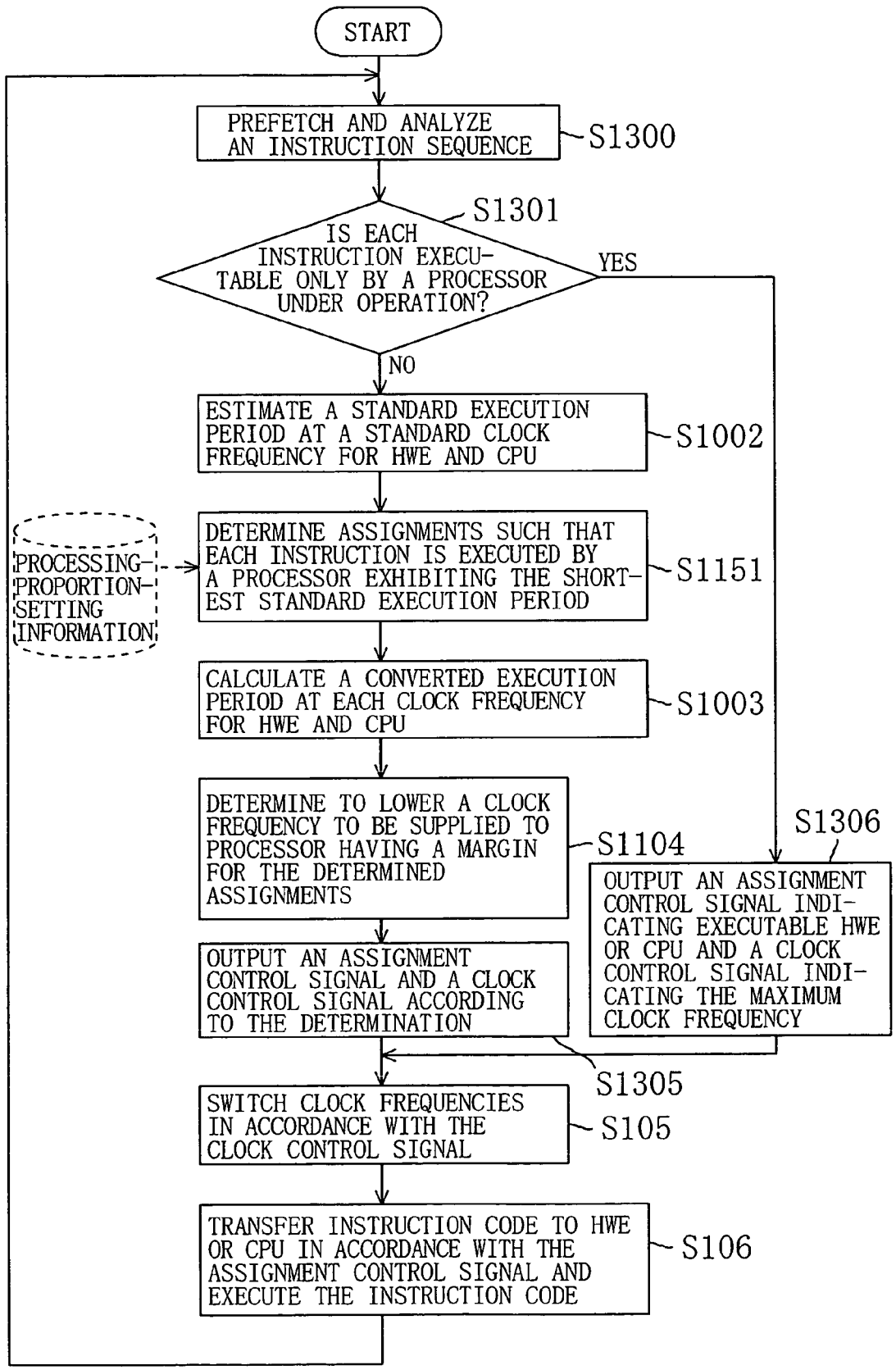
FIG. 17 is a flowchart showing operation of a processor system according to a modified example of embodiment 3.

Operation of the processor system thus configured is different from that in embodiment 3 (shown in FIG. 15) as shown in FIG. 17. (This difference is similar to the difference between operation (shown in FIG. 9) of the instruction sequence optimization device of embodiment 2 and operation (shown in FIG. 11) of the device of the modified example thereof.)

(S1151) After standard execution periods have been calculated (S1002), assignments are determined such that an instruction executable by both the processors is executed by one of the processors which exhibits a shorter standard execution period based on the standard execution periods.

(S1104) Unlike (S1004) in FIG. 15, only clock frequencies are determined. Specifically, when instructions are executed at standard clock frequencies by respective processors assigned at (S1151), the clock frequencies are determined such that a processor in which a waiting time arises (i.e., which has a margin) before termination of the other processors is supplied with a clock signal with the minimum frequency that reduces this waiting time and does not affect the total processing time. Accordingly, power consumption is reduced without degradation of the processing ability of the processor system within the range of assignments to processors as described above.

After the assignments to processors and the clock frequencies have been determined as described above, an assignment control signal and a clock control signal according to the determination is output to the instruction assignment controlling section 102 and the clock controlling section 106 at (S1305) as in embodiment 3. In (S105) through (S106), the clock controlling section 106 switches the frequencies of clock signals to be output to the CPU 103, the HWE 104 and the SRAM 105 and the instruction assignment controlling section 102 transfers instruction code to the CPU 103 or the HWE 104 to have the instructions executed.

As described above, each instruction is executed by a processor exhibiting a shorter standard execution period, so that efficiency in executing instruction code is enhanced and thereby the total number of necessary clocks is reduced. In addition, the frequency of a clock signal supplied to a processor having a margin in its execution period is reduced, so that unnecessary toggling of transistors is suppressed, thus greatly reducing power consumption. Moreover, the process for determining a processor having a shorter standard execution period is easier than the process of obtaining a combination for achieving the lowest power consumption out of various combinations of assignments as in embodiment 3. In addition, clock frequencies are determined only for a combination of assignments to a set of processors, so that the circuit scales of the assignment determining section 511 and the clock frequency determining section 512 are reduced.

In the modified example of embodiment 3, to reduce the scale of hardware for determining a processor exhibiting a shorter standard execution period and to shorten the execution period for the entire instruction code sequence by increasing the parallelism in processing by processors, while permitting increase of power consumption to some extent, the proportion of the amount of processing by each processor is limited to a given range based on processing-proportion-setting information, for example, as indicated by the broken lines in FIGS. 16 and 17.

Instead of assignments for having each instruction executed by a processor exhibiting the shortest standard execution period, assignments to processors may be determined such that the total execution period is the shortest when all the processors operate at the standard clock frequencies, for example. In addition, the scale of hardware for determining assignments to processors may be reduced by limiting the proportion in the amount of processing by each processor to a given range and by determining assignments to reduce the execution period within the given range.

Embodiment 4

In embodiment 1, assignments to processors and control of clock frequencies are both based on flags added to instruction code. In embodiment 3, the assignments and the control are based on an analysis of instruction code by a processor system. Alternatively, only assignments to processors may be based on flags and the control of clock frequencies may based on the analysis.

Figure 18:
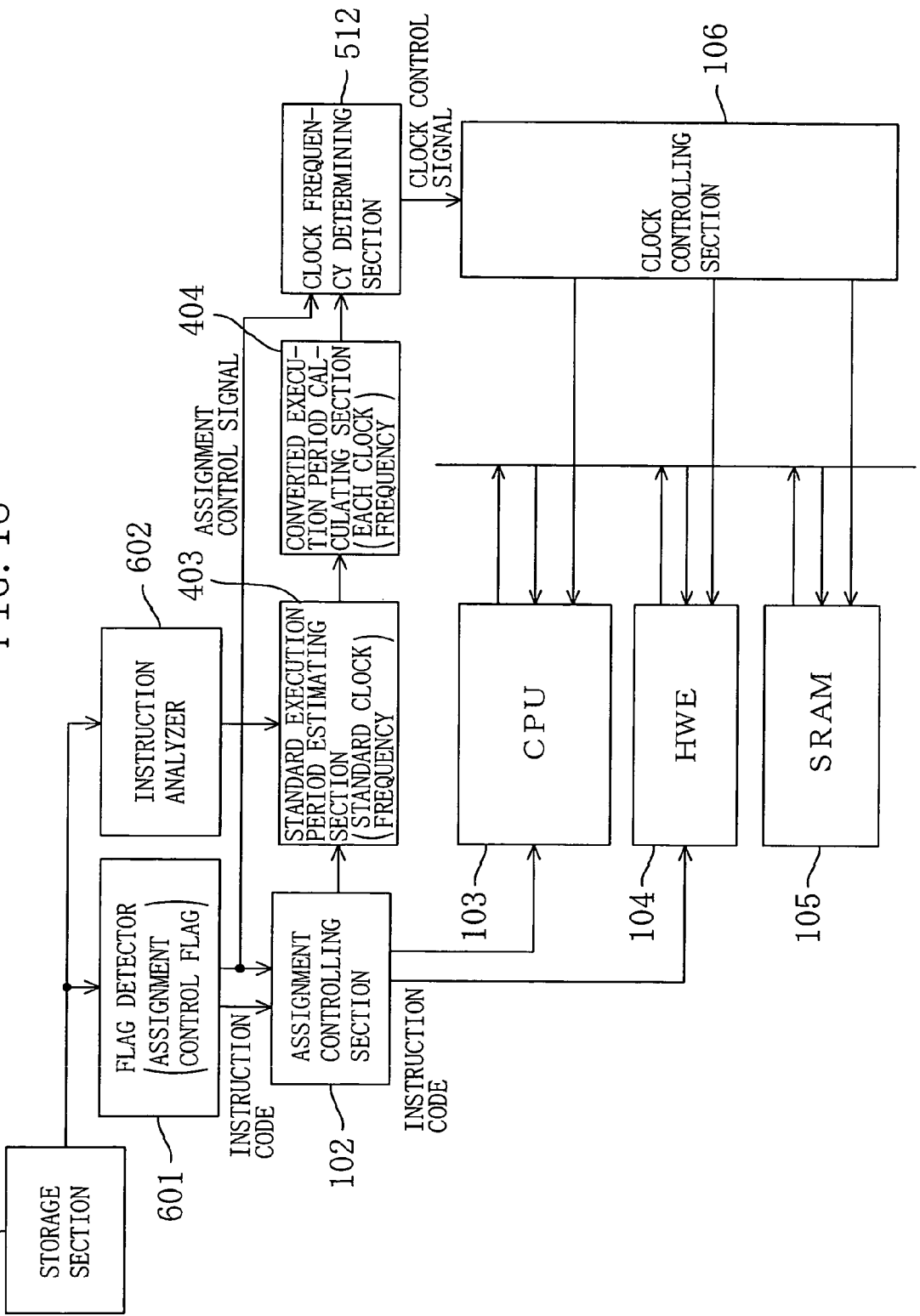
FIG. 18 is a block diagram showing a configuration of a main portion of a processor system according to embodiment 4.

As shown in FIG. 18, for example, a processor system according to this embodiment is different from that of embodiment 3 (shown in FIG. 14) in including: a flag detector 601; an instruction analyzer 602; and a clock frequency determining section 512 instead of the instruction analyzer 402 and the assignment/clock frequency determining section 405 of embodiment 3.

The flag detector 601 is different from the flag detector 101 of embodiment 1 (shown in FIG. 1) in detecting only an assignment control flag included in the instruction code, and outputs the instruction code read out from a storage section 100 to an instruction assignment controlling section 102 as well as detects an assignment control flag to output an assignment control signal according to this flag to the instruction assignment controlling section 102 and the clock frequency determining section 512.

The instruction analyzer 602 has a function of analyzing information necessary for determining clock frequencies, i.e., the relationship among instructions (dependence relationship among processes) or constraints on execution timings, out of the functions of the instruction analyzer 202 of the modified example (shown in FIG. 10) of embodiment 2.

The clock frequency determining section 512 is the same as that of the modified example (shown in FIG. 15) of embodiment 3, and determines clock frequencies based on an assignment control signal output from the flag detector 601 such that when a CPU 103 and an HWE 104 operate at, for example, their standard clock frequencies, one of these processors which has a larger margin in its processing operates at the minimum clock frequency that does not affect the total processing time.

Figure 19:
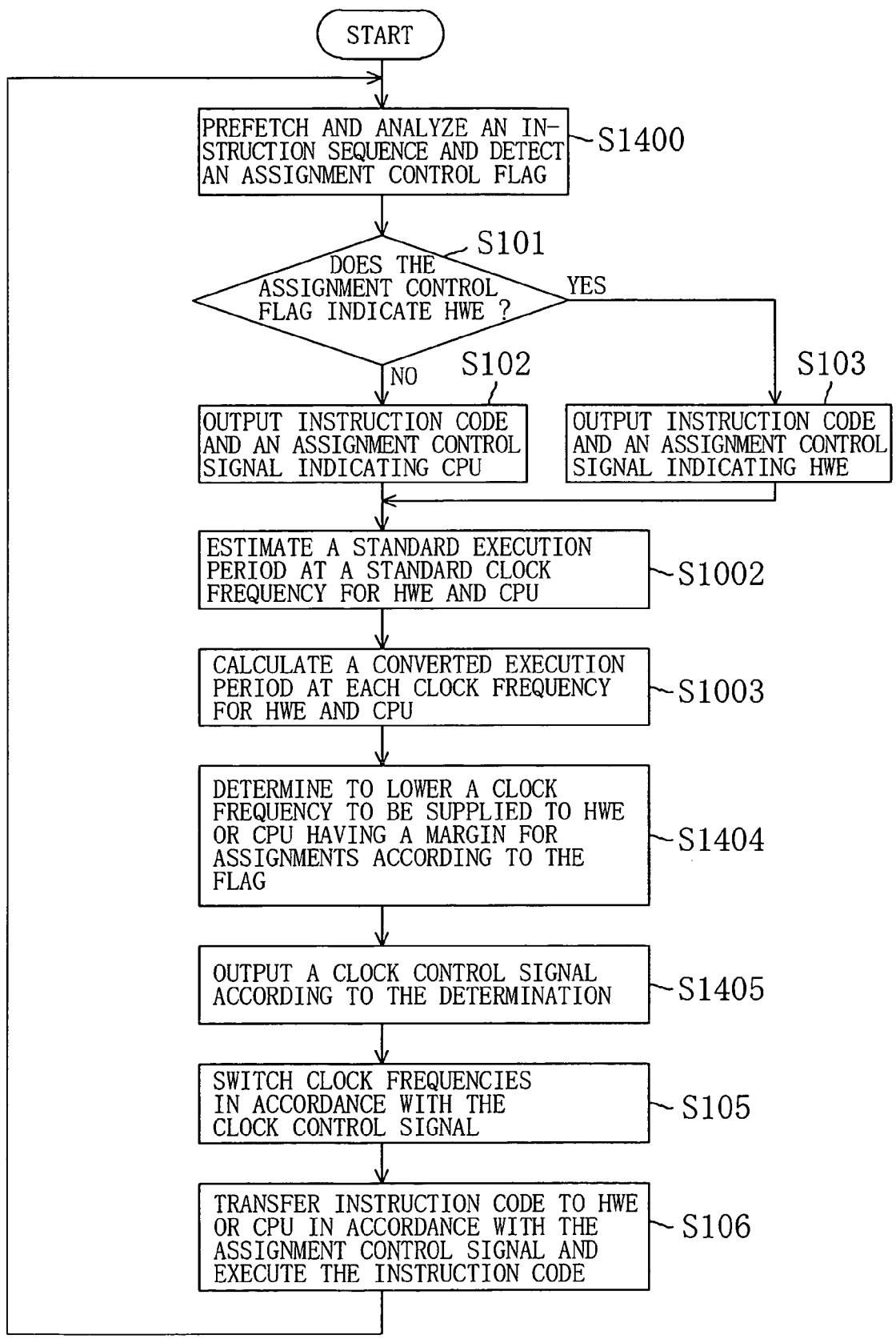
FIG. 19 is a flowchart showing operation of the processor system of embodiment 4.

Hereinafter, it will be described how the processor system thus configured operates with reference to FIG. 19.

(S1400) The flag detector 601 prefetches instruction code (or instruction code sets) stored in the storage section 100 and detects an assignment control flag contained in the instruction code. The instruction analyzer 602 analyzes constraints on execution timings in the prefetched instruction code, for example.

(S101) to (S103) Then, the flag detector 601 outputs an assignment control signal indicating the CPU 103 or the HWE 104 based on the detection result of the assignment control flag to the instruction assignment controlling section 102. The instruction code is output to the instruction assignment controlling section 102 with the flag added thereto or removed therefrom.

(S1002) A standard execution period estimating section 403 estimates standard execution periods during which instructions are executed by processors at respective standard clock frequencies.

(S1003) A converted execution period calculating section 404 calculates converted execution periods necessary for respective executions of the instructions by the processors at various clock frequencies.

(S1404) The clock frequency determining section 512 determines the frequencies of clock signals to be supplied to processors based on an assignment control signal according to the assignment control flag output from the flag detector 601. Specifically, when the instructions are executed by the processors at standard clock frequencies according to the flag, the clock frequencies are determined such that a processor in which a waiting time arises (i.e., which has a margin) before termination of processing by the other processors is supplied with a clock signal with the minimum frequency that reduces this waiting time and does not affect the total processing time. Accordingly, power consumption is reduced without degradation of the processing ability of the processor system within the range of assignments to processors as described above.

(S1405) The clock frequency determining section 512 outputs, to the clock controlling section 106, a clock control signal based on the determination of the clock frequencies.

(S105) to (S106) The clock controlling section 106 switches the frequencies of clock signals to be output to the CPU 103, the HWE 104 and an SRAM 105 in accordance with the clock control signal. The instruction assignment controlling section 102 transfers the instruction code to the CPU 103 or the HWE 104 in accordance with the assignment control signal and then the instructions are executed.

As described above, the assignments to processors and the control of clock frequencies are performed in the manner described above, thus reducing power consumption without degradation of the processing ability. In addition, assignments to processors are performed based on the assignment control flag. Therefore, the instruction analyzer 602 only needs to analyze, for example, constraints on execution timings necessary to determine clock frequencies. The clock frequency determining section 512 only needs to determine clock frequencies for a combination of assignments to a set of processors. Accordingly, as compared to the processor system of embodiment 3, the circuit scales of the instruction analyzer 602 and the clock frequency determining section 512 are reduced.

Embodiment 5

Figure 20:
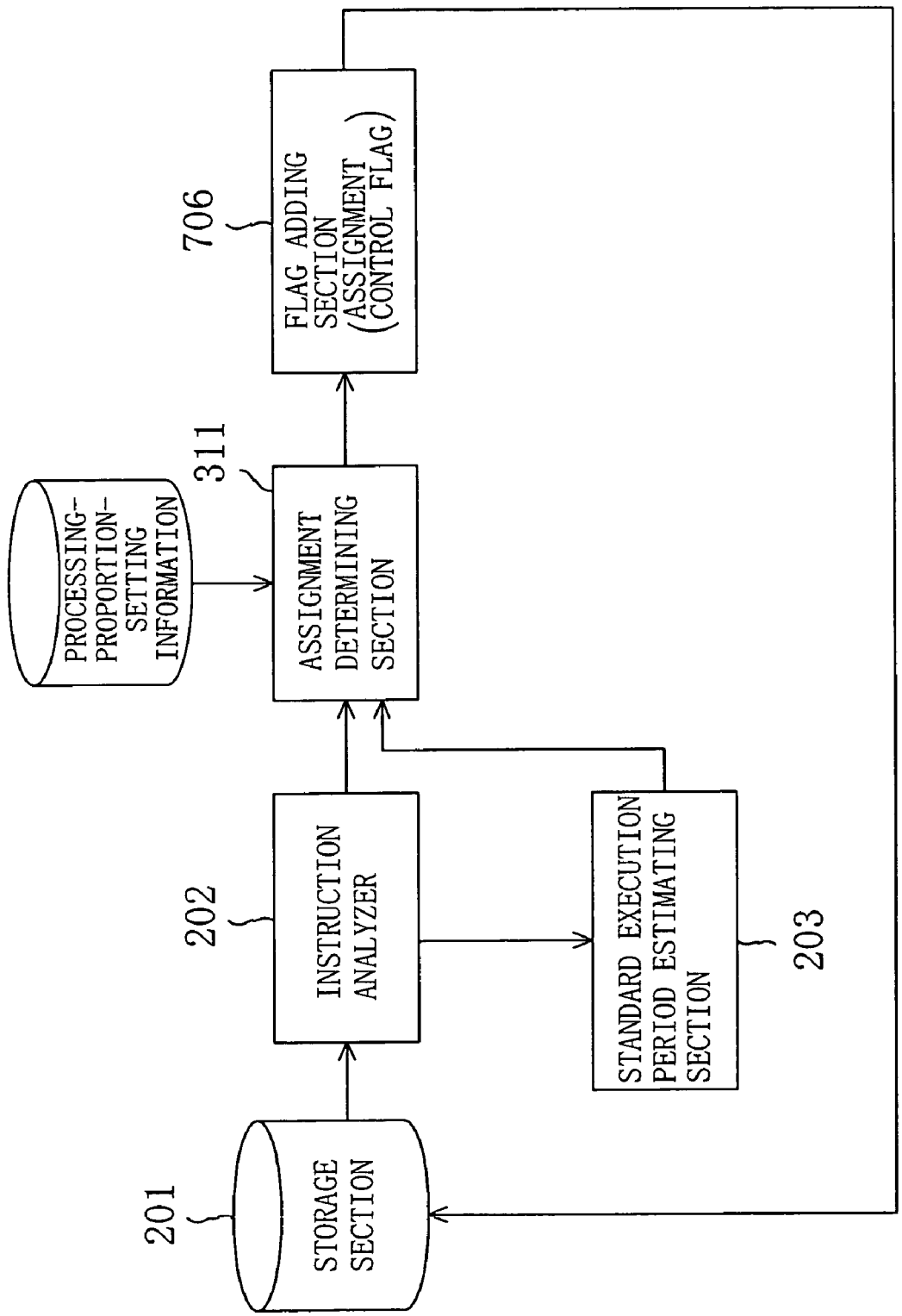
FIG. 20 is a block diagram showing a configuration of an instruction sequence optimization device according to embodiment 5.

Instruction code to which only a flag for controlling assignments to processors is added as described in embodiment 4 can be generated by an instruction sequence optimization device as shown in FIG. 20, for example.

Specifically, functions necessary to add an assignment control flag are provided to the instruction sequence optimization device of the modified example (shown in FIG. 10) of embodiment 2, and a flag adding section 706 adds only an assignment control flag to instruction code in accordance with determination by an assignment determining section 311.

Figure 21:
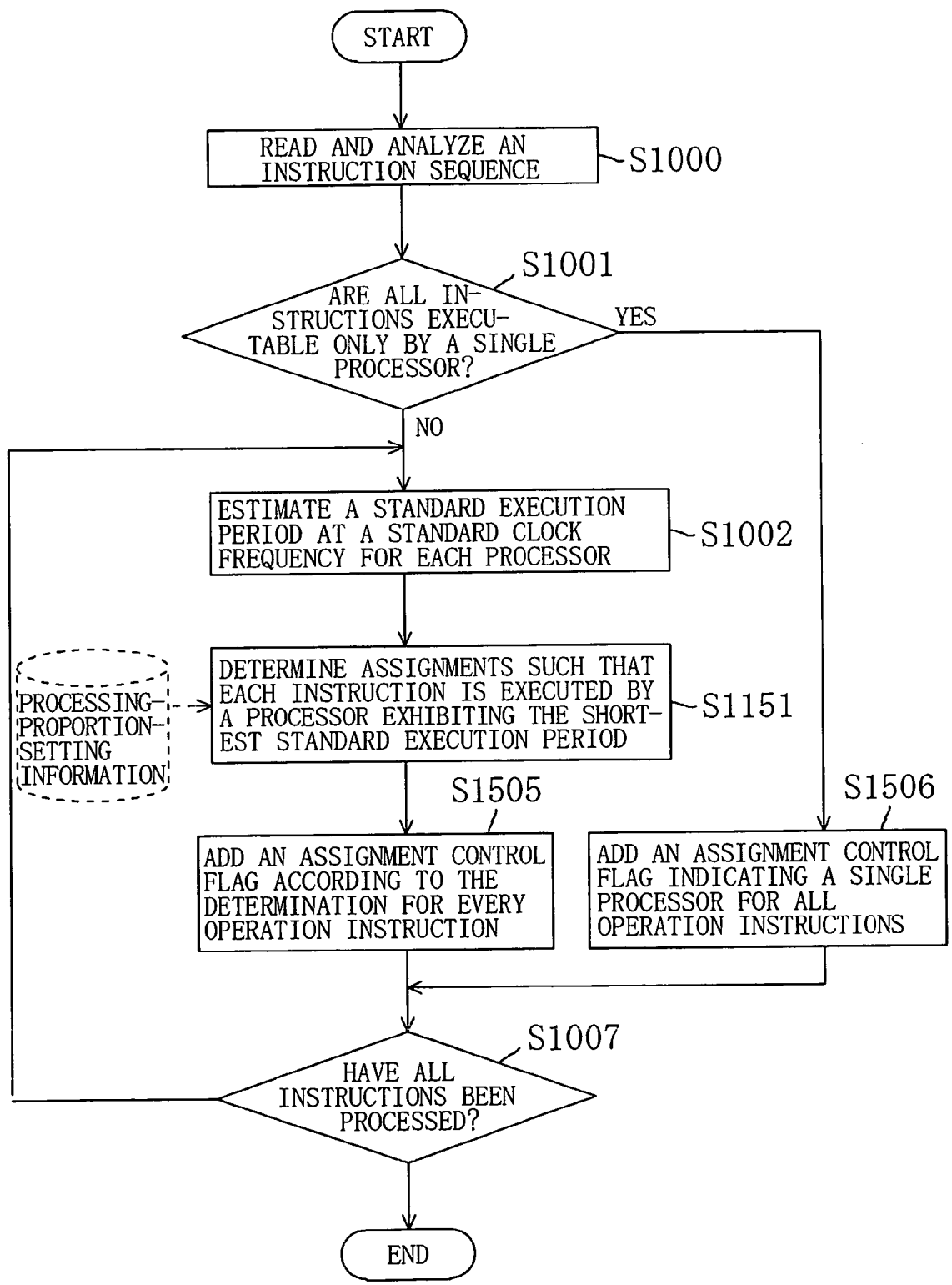
FIG. 21 is a flowchart showing operation of the instruction sequence optimization device of embodiment 5.

Operation of this instruction sequence optimization device is different from that in the modified example (shown in FIG. 11) of embodiment 2 only in that processes (S1003) and (S1104) for determining clock frequencies are omitted and only an assignment control flag is added in (S1505) and (S1506), as shown in FIG. 21.

As in the modified example of embodiment 2, in this embodiment, the proportion of the amount of processing by each processor may also be limited to a given range based on processing-proportion-setting information, for example, as indicated by the broken lines in FIGS. 20 and 21, assignments to processors may also be determined so as to minimize the total execution period, or executions of instructions may also be rearranged in a different order.

Embodiment 6

An example of a processor system in which clock frequencies are controlled as described above and power supply voltages to be supplied to a CPU 103 and other processors are controlled will be described. Reduction of a clock frequency increases a margin for a delay in a circuit and thus delay time in the circuit is allowed to be increased. This enables reduction of a power supply voltage. Since power consumption varies with the square of the power supply voltage, power consumption can be greatly reduced.

Figure 22:
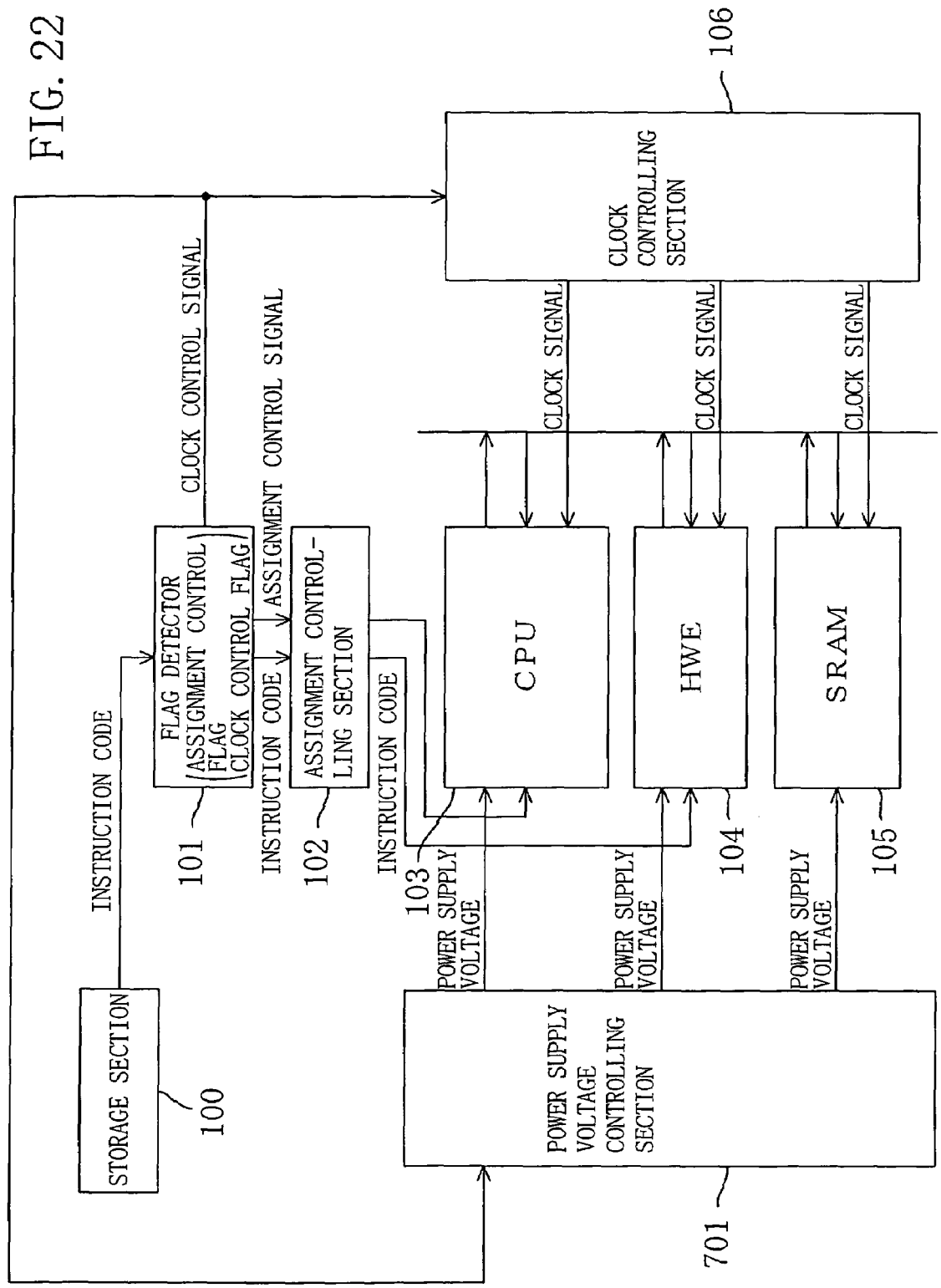
FIG. 22 is a block diagram showing a configuration of a main portion of a processor system according to embodiment 6.
Figure 23:
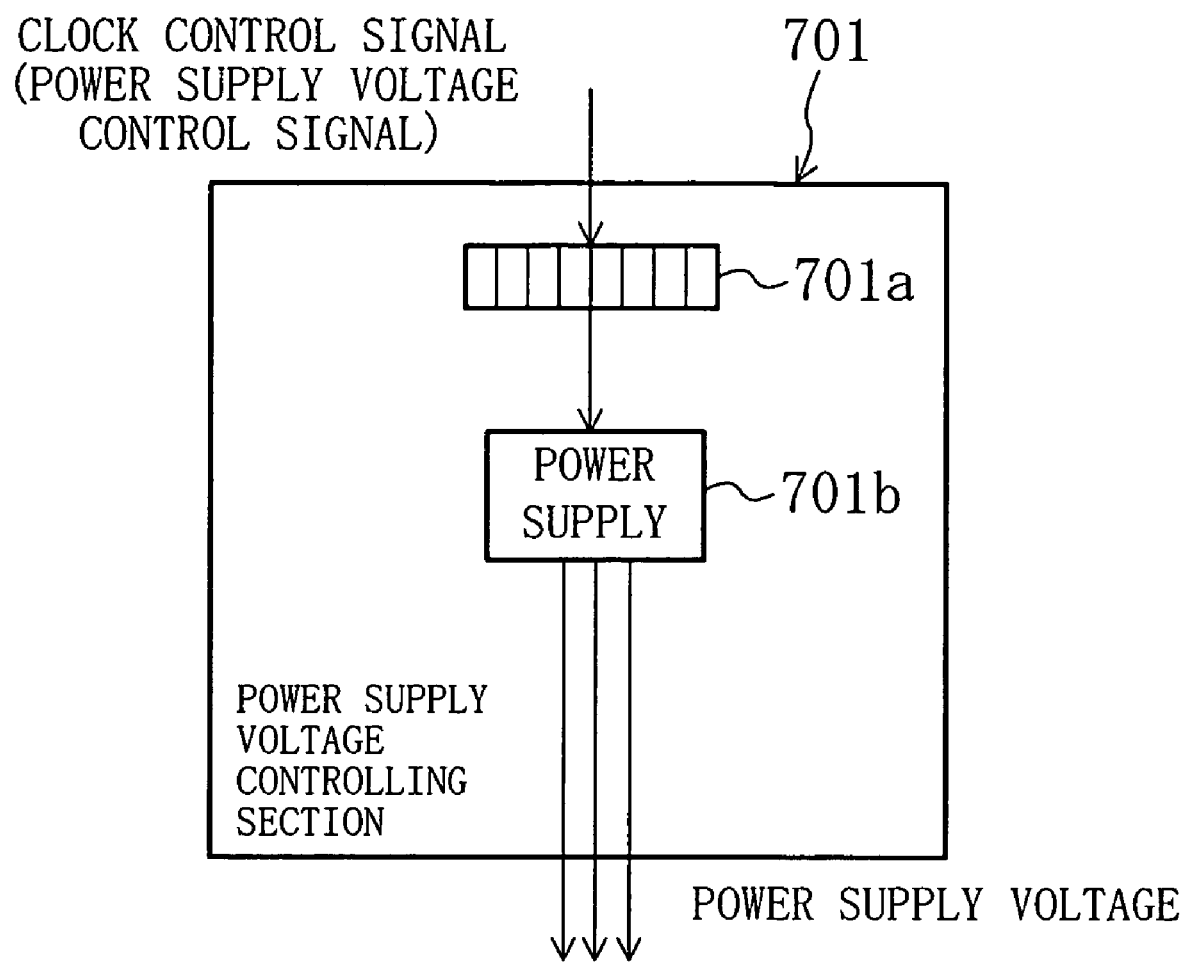
FIG. 23 is a block diagram showing a specific configuration of a power supply voltage controlling section 701 according to embodiment 6.

Specifically, as shown in FIG. 22, for example, a processor system according to this embodiment includes a power supply voltage controlling section 701 (voltage controlling means) in addition to the configuration of embodiment 1 (shown in FIG. 1). The power supply voltage controlling section 701 supplies power supply voltages previously set to be associated with clock frequencies, i.e., power supply voltages each of which decreases from a rated voltage with reduction of the associated one of the clock frequencies, to a CPU 103, an HWE 104 and an SRAM 105, respectively, in accordance with a clock control signal output from a flag detector 101. More specifically, as shown in FIG. 23, for example, the power supply voltage controlling section 701 includes: a power supply voltage controlling register 701a for holding the clock control signal output from the flag detector 101 as a power supply voltage control signal; and a power supply 701b constituted by a DC-DC converter or a power supply IC and configured to output a voltage in accordance with information held in the power supply voltage controlling register 701a to the CPU 103, the HWE 104 and the SRAM 105.

Operation of this processor system is the same as that in embodiment 1 (shown in FIG. 5) except for that the power supply voltages output from the power supply voltage controlling section 701 are switched in accordance with switching of the respective clock frequencies by the clock controlling section 106. By reducing power supply voltages with the reduction of clock frequencies reduced as described above, power consumption is further reduced without an influence on operation and the processing ability of the processor system.

The power supply voltages supplied to the CPU 103 and other processors are not necessarily equal to each other with respect to the same clock frequency and may be set according to circuit characteristics or the like.

The timing of switching a power supply voltage to a higher level may be earlier than the timing of switching a clock frequency to a higher frequency so as to ensure a sufficient margin for a circuit delay in the switching of the clock frequency.

As already described in embodiment 1, the supply of a power supply voltage may be suspended (ground voltage may be supplied) when the supply of a clock signal is cut off to stop operation of the CPU 103 or the HWE 104 so that standby power consumption caused by leakage current is completely suppressed. Alternatively, such a power supply voltage may be suspended only for the HWE 104, for example. The timing of resuming the suspended supply of the power supply voltage may be earlier than the timing of starting the supply of the clock signal. In addition, a rated voltage may be supplied during a period from when the first instruction code is prefetched to when a flag is detected for the power-on or reset of the entire processor system, thus easily ensuring operation of a processor which executes the first instruction code.

Figure 24:
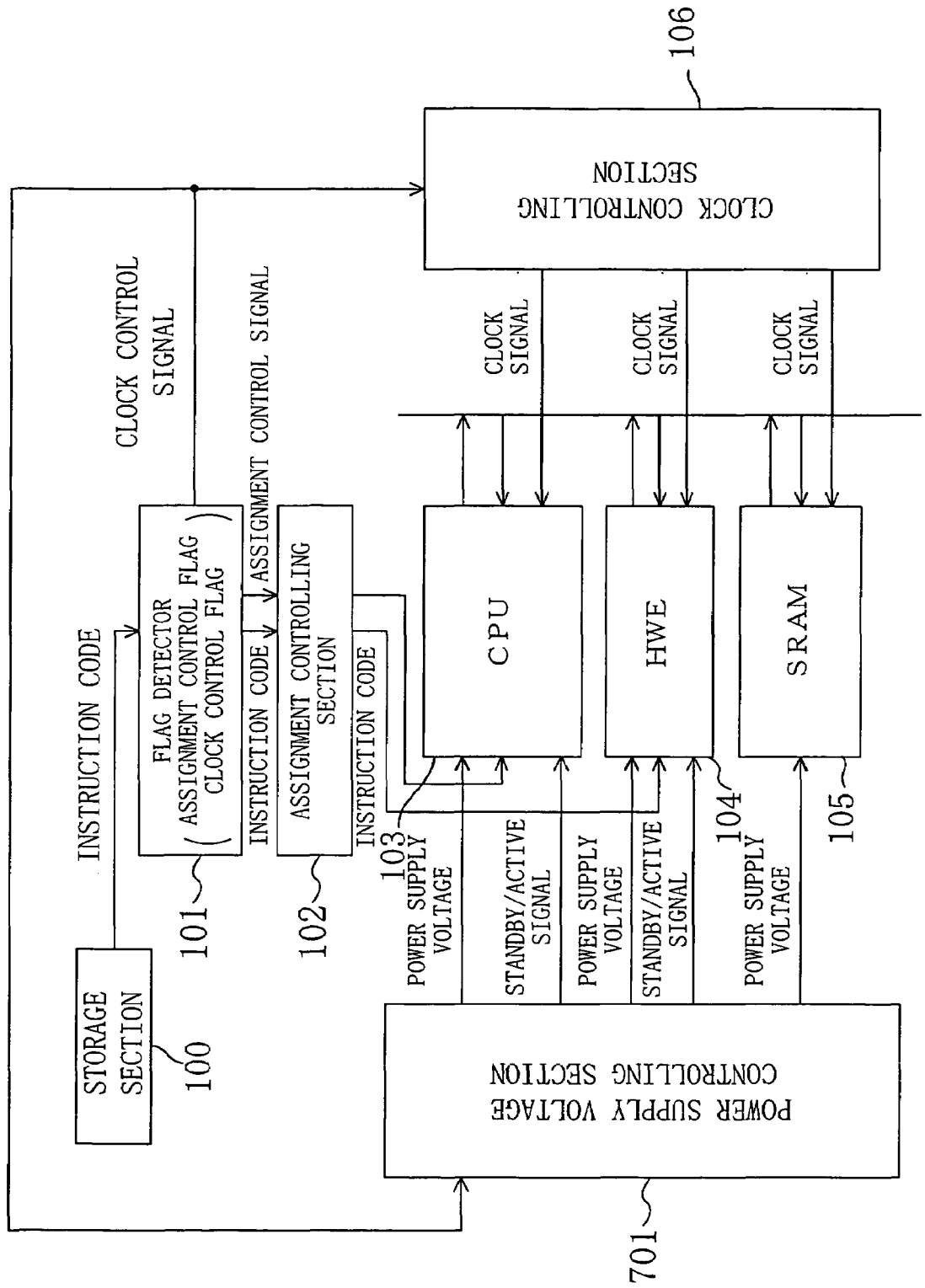
FIG. 24 is a block diagram showing a configuration of a main portion of a processor system according to a modified example of embodiment 6.
Figure 25:
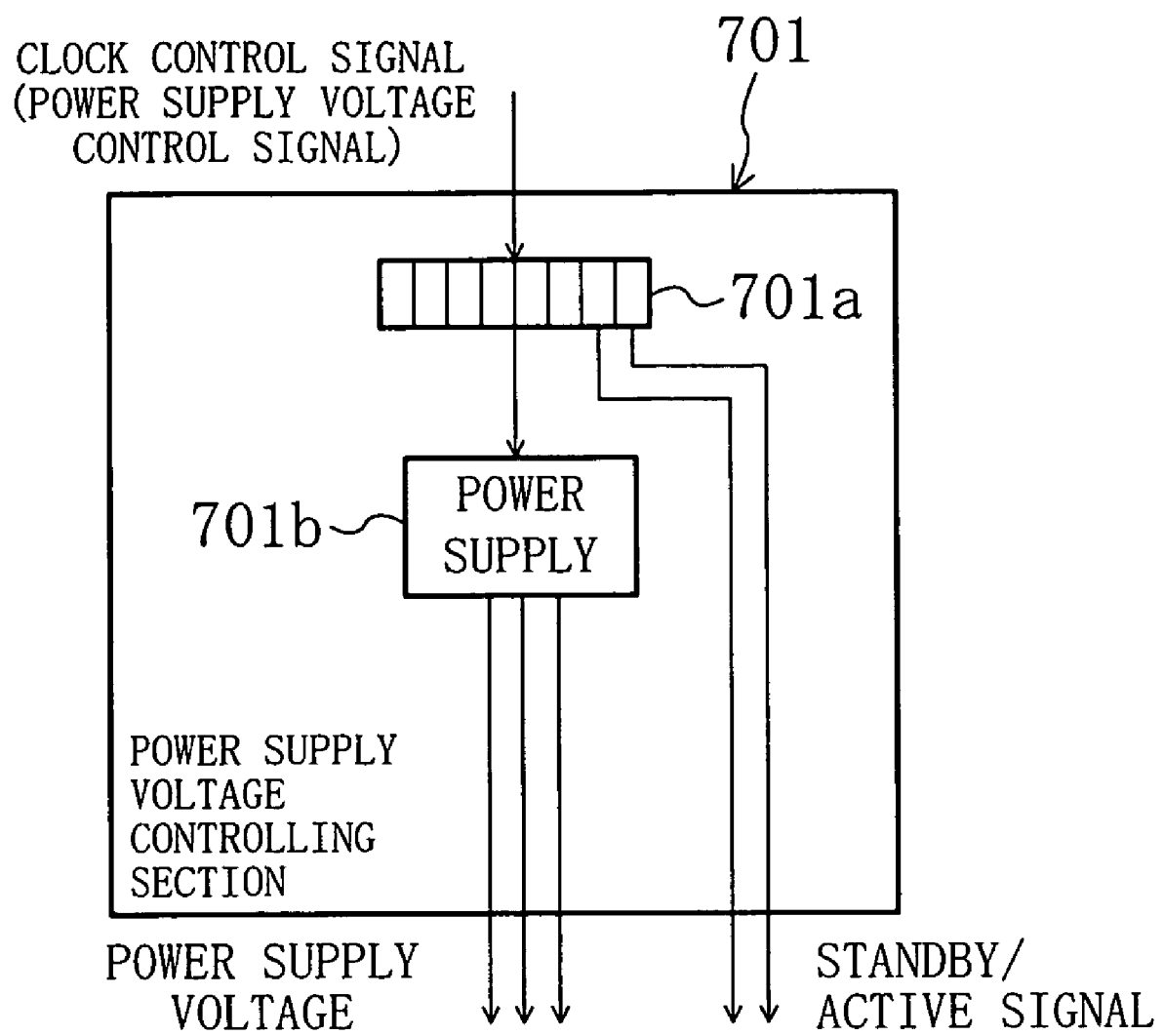
FIG. 25 is a block diagram showing a specific configuration of a power supply voltage controlling section 701 according to the modified example of embodiment 6.

In addition, as shown in FIGS. 24 and 25, for example, a signal indicating the presence/absence of the clock signal held in the power supply voltage controlling register 701a may be output to the CPU 103 or the HWE 104 as a standby/active control signal in such a manner that the CPU 103 or the HWE 104 are in standby states (i.e., are separated from the bus 107 to be in standby states and the internal states thereof are held) together with or instead of suspending the supply of a power supply voltage when the supply of the clock signal is stopped. In addition, the clock signal may be always supplied with only the supply of the power supply voltage suspended.

Embodiment 7

Instead of controlling power supply voltages as described above, the substrate voltage of a semiconductor substrate on which a CPU 103 and other components are formed may be controlled. Specifically, if the substrate voltage is controlled in such a manner as to increase the threshold voltage of a transistor formed on the semiconductor substrate, delay time of a circuit increases whereas leakage current of the transistor decreases. If a clock frequency decreases to increase a margin for a delay in the circuit, the substrate voltage is controlled accordingly to increase the threshold voltage, thus reducing power consumption.

Figure 26:
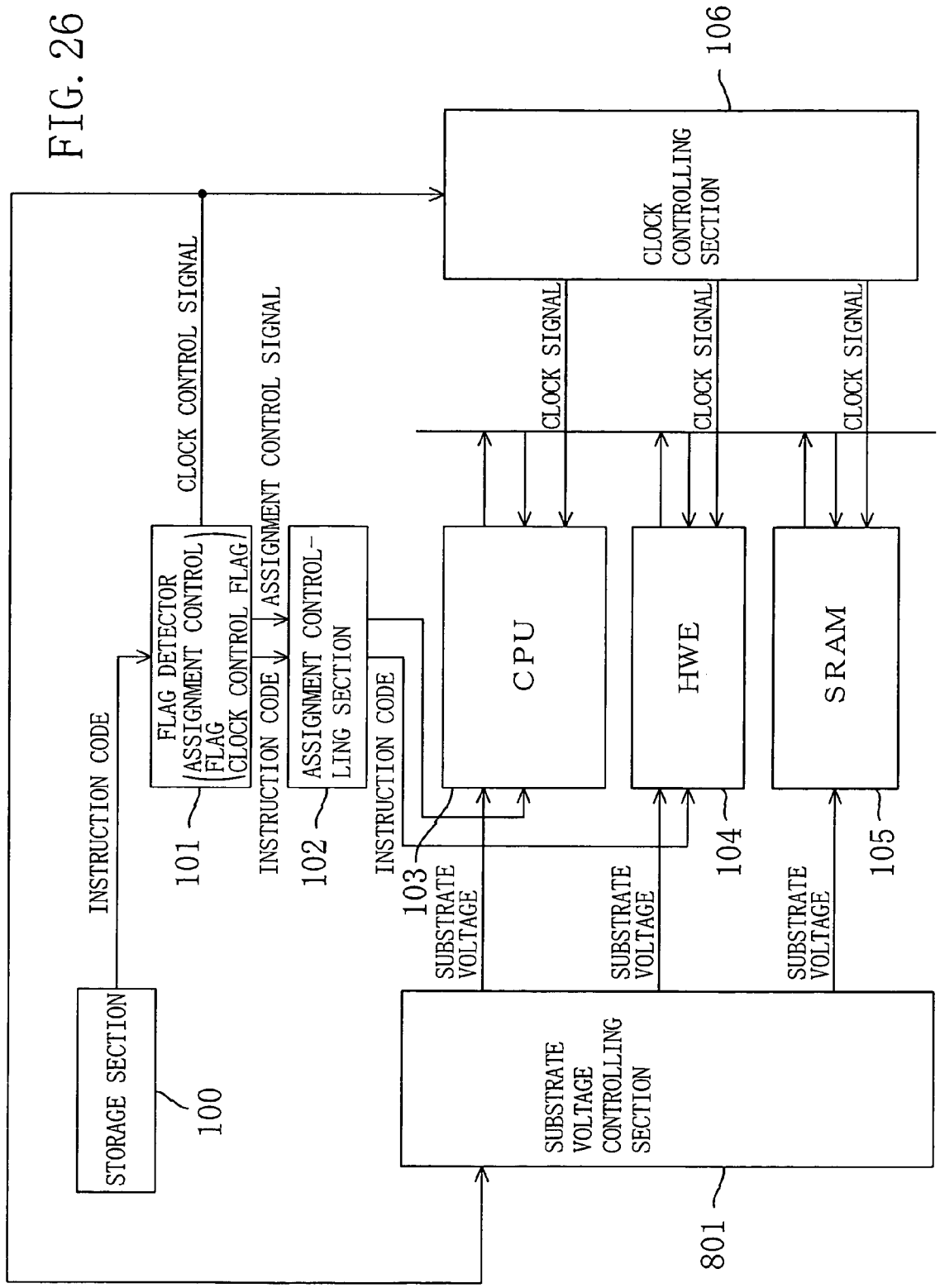
FIG. 26 is a block diagram showing a configuration of a main portion of a processor system according to embodiment 7.

More specifically, in a processor system according to this embodiment, as shown in FIG. 26, for example, a substrate voltage controlling section 801 (voltage controlling means) is provided in addition to the configuration described in embodiment 1 (shown in FIG. 1). The substrate voltage controlling section 801 supplies a substrate voltage previously set in associated with a clock frequency, i.e., such a substrate voltage (reverse bias voltage) that increases the threshold voltage as the clock frequency decreases, to a CPU 103 or another processor in accordance with a clock control signal output from a flag detector 101.

Operation of this processors system is the same as that in embodiment 1 (shown in FIG. 5) except for that the substrate voltages output from the substrate voltage controlling section 801 are switched in accordance with the switching of the clock frequencies by a clock controlling section 106.

As described above, the substrate voltages are controlled with the clock frequencies reduced, thus further reducing power consumption without affecting operation and the processing ability of the processor system.

As described about the power supply voltages in embodiment 6, substrate voltages supplied to the CPU 103 and other processors may differ from each other with respect to the same clock frequency. When the supply of a clock signal is stopped, a voltage at the same level as the associated power supply voltage may be applied as a substrate voltage.

Embodiment 8

Figure 27:
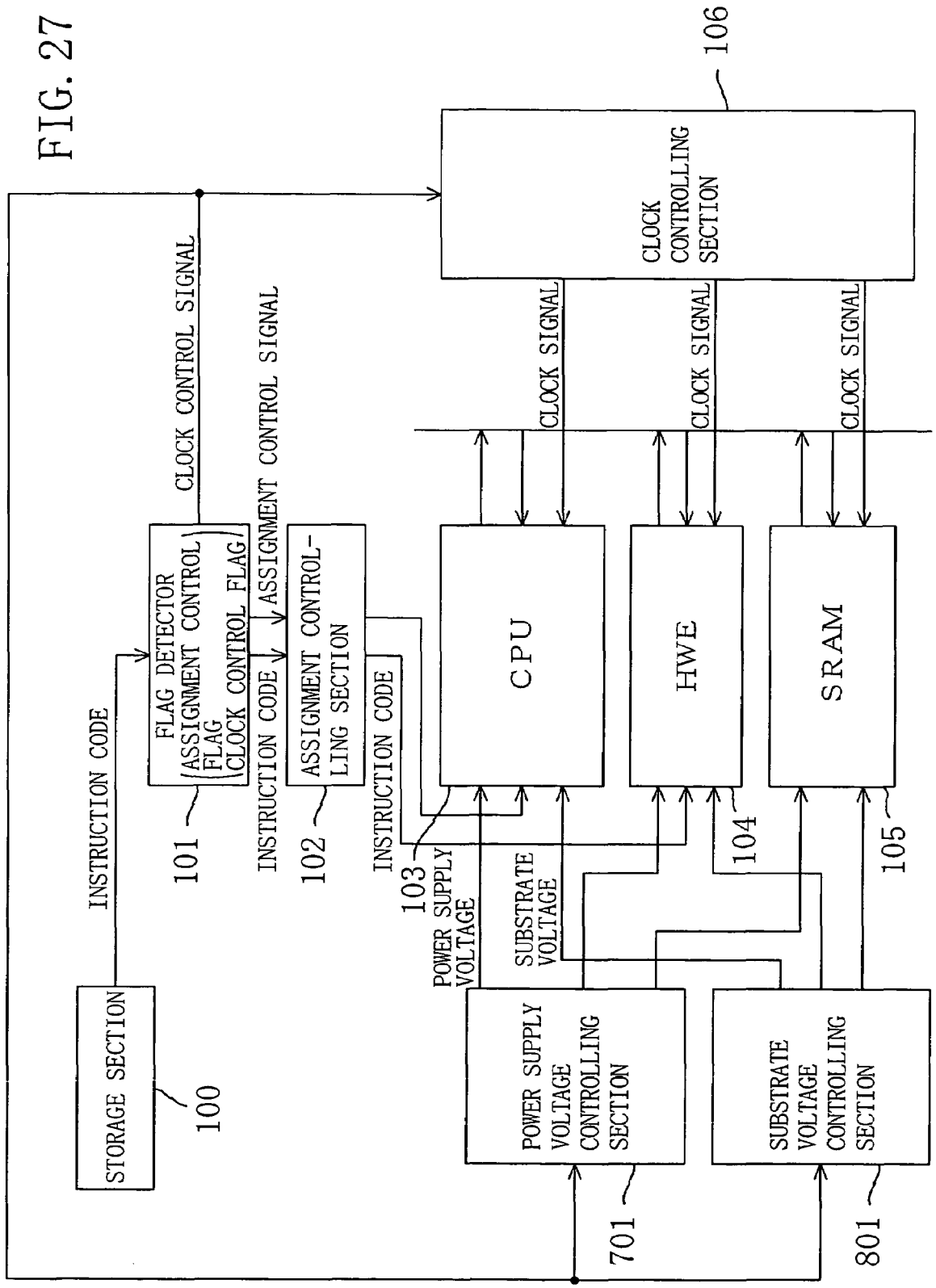
FIG. 27 is a block diagram showing a configuration of a main portion of a processor system according to embodiment 8.

As shown in FIG. 27, for example, both the power supply voltage controlling section 701 and the substrate voltage controlling section 801 may be provided so as to control power supply voltages and substrate voltages in accordance with clock frequencies. In such a case, combinations of power supply voltages and substrate voltages associated with clock frequencies determined by the power supply voltage controlling section 701 and the substrate voltage controlling section 801 are optimized according to characteristics of a semiconductor integrated circuit or the like.

Specifically, for example, if a clock frequency is lower than a standard clock frequency and leakage current is relatively large, a power supply voltage may be reduced and a reverse bias voltage may be applied to a substrate so as to increase the threshold voltage within the range of delay time permissible depending on the clock frequency (the reduction and the application both increase the delay time and reduce power consumption) such that power consumption is reduced. On the other hand, if the leakage current is relatively small, the power supply voltage may be greatly reduced (resulting in that the delay time increases and power consumption is reduced) and a forward bias voltage may be applied to the substrate so as to reduce the threshold voltage (resulting in that the delay time decreases and the leakage current increases) such that the delay time permissible depending on the clock frequency is satisfied as a result and power consumption is greatly reduced by the reduction of the power supply voltage.

As already described in embodiments 6 and 7, in this embodiment, each of the power supply voltages and substrate voltages to be supplied to the CPU 103 and other processors may be different from each other with respect to the same clock frequency. If a power supply voltage is supplied even with the supply of a clock signal suspended, a voltage at the same level as the power supply voltage may be applied as a substrate voltage, for example. In addition, if the supply of the power supply voltage is stopped with the supply of the clock signal suspended, the supply of the substrate voltage may also be stopped.

Embodiment 9

Figure 28:
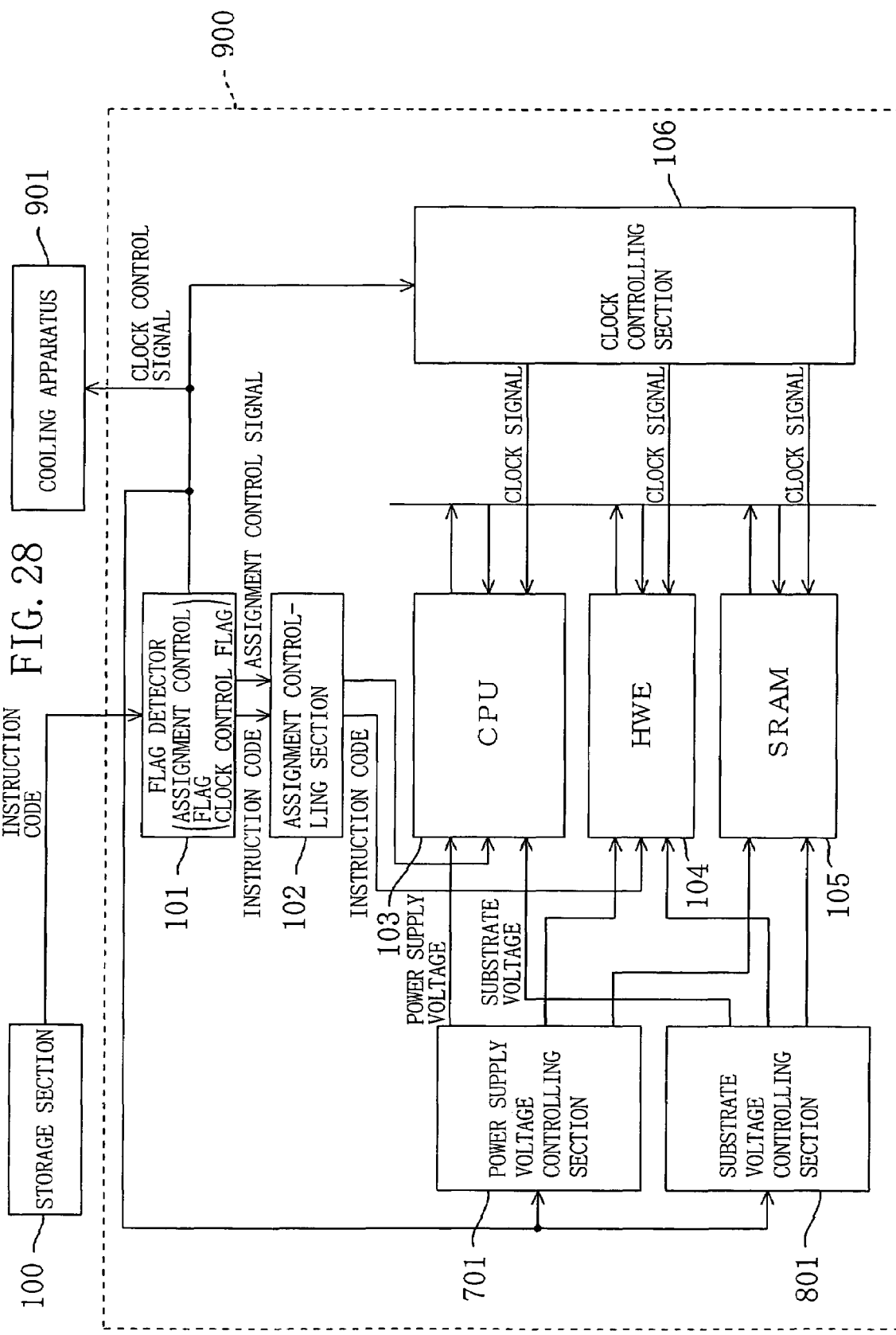
FIG. 28 is a block diagram showing a configuration of a main portion of a processor system according to embodiment 9.

Once clock frequencies are determined as described above, power consumption and heat release from a processor system are approximately determined. In view of this, as shown in FIG. 28, for example, a cooling apparatus 901 (cooling means and cooling controlling means) including a cooling fan for cooling a semiconductor integrated circuit 900 may be controlled based on a clock control signal. More specifically, the cooling apparatus 901 controls the rotational speed of the cooling fan by referring to a table in which a given control value associated with a clock frequency, for example, is recorded, cools the semiconductor integrated circuit 900 with a cooling ability depending on the clock frequency, a power supply voltage (which is determined according to the clock frequency as described above) and leakage current (which is determined by a substrate voltage determined according to the clock frequency). This ensures prevention of thermal runaway of the semiconductor integrated circuit 900 and suppresses power consumption involved in cooling.

Embodiment 10

In the foregoing embodiments, one of a plurality of processors (CPU 103 and HWE 104) operates at a maximum clock frequency, for example, and the other processor operates at a clock frequency lower than the maximum clock frequency, thereby reducing power consumption without degradation of the processing ability. If the processors operate in parallel by receiving clock signals with a frequency lower than the maximum clock frequency and power supply voltages lower than a rated voltage, power consumption is also reduced and, in addition, the relationship between the processing ability and power consumption is flexibly set.

Figure 29:
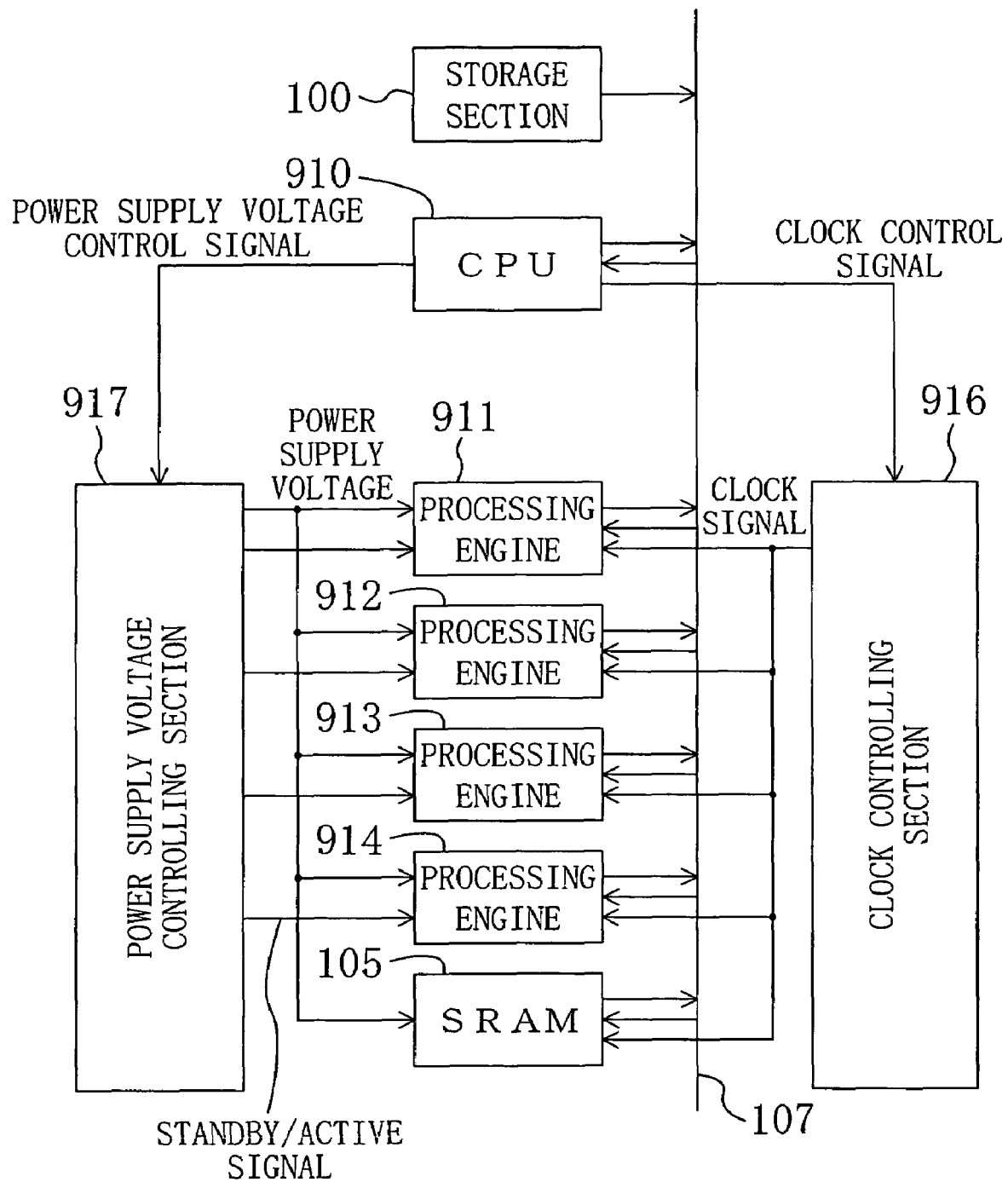
FIG. 29 is a block diagram showing a configuration of a main portion of a processor system according to embodiment 10.

FIG. 29 is a block diagram showing a configuration of a main portion of a processor system according to this embodiment. In this example, a CPU 910 is provided instead of the flag detector 101 and the instruction assignment controlling section 102 of embodiment 6 (shown in FIG. 22). Instead of (or in addition to) the CPU 103 and the HWE 104, four processors, i.e., processing engines 911 through 914, are provided. Instead of the clock controlling section 106 and the power supply voltage controlling section 701, a clock controlling section 916 and a power supply voltage controlling section 917 are provided.

The CPU 910 controls the entire system as a supervisory processor, detects mode setting information indicating operation modes (e.g., modes corresponding to combinations of assignments to processors, power supply voltages and clock frequencies as shown in FIG. 30) and outputs a power supply voltage control signal and a clock control signal. The CPU 910 does not necessarily detect the mode setting information but may detect information sets respectively indicating assignments to processors, power supply voltages and clock frequencies as described in embodiment 1. Alternatively, the CPU 910 may detect information indicating the number of parallelism instead of assignments to processors so that assignments to processors are then performed based on this information. If clock frequencies always correspond to respective power supply voltages, the CPU 910 only needs to detect information indicating either the clock frequencies or the power supply voltages.

The following description is given on the assumption that the processing engines 911 through 914 have the same function (e.g., the function of multiply-accumulate operation) for simplicity. Instruction code is transferred between the CPU 910 or a storage section 100, and the processing engines 911 through 914 via a bus 107. (The instruction code may be transferred directly from the CPU 910 or other sections as in embodiment 1.)

Figure 31:
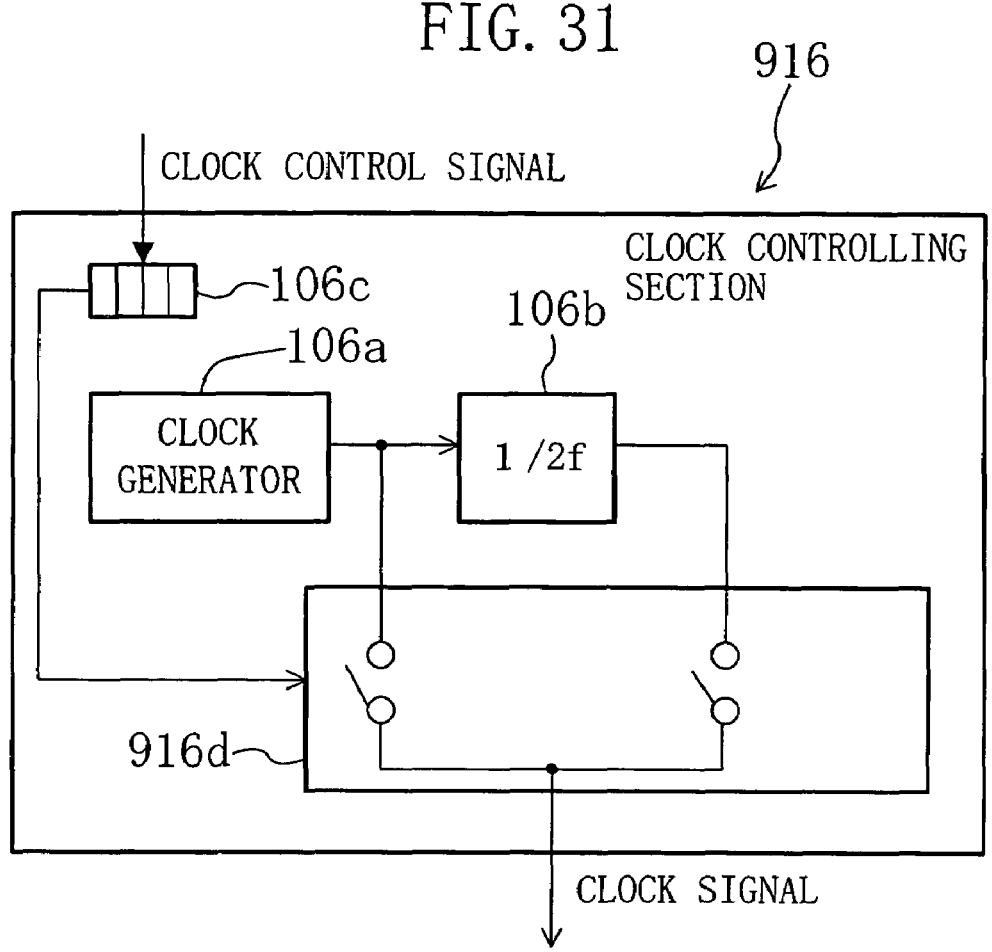
FIG. 31 is a block diagram showing a specific configuration of a clock controlling section 916 according to embodiment 10.
Figure 32:
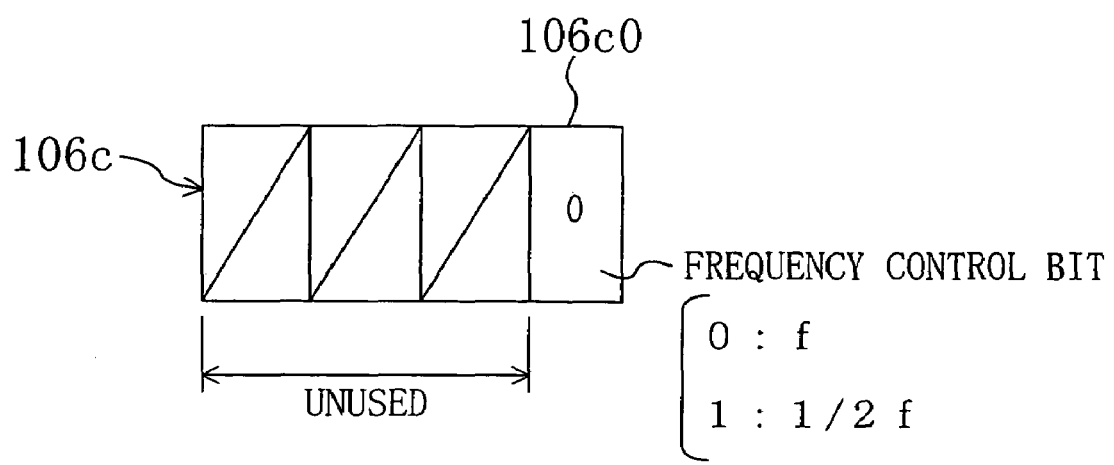
FIG. 32 shows a configuration of a frequency controlling register 106c according to embodiment 10.

As shown in FIG. 31, for example, the clock controlling section 916 is different from the clock controlling section 106 of embodiment 1 (shown in FIG. 4) in including: a frequency divider 106b; and a selector 916d for outputting a common clock signal with a frequency according to information held in a frequency controlling register 106c to the processing engines 911 through 914, instead of the selector 106d. The frequency controlling register 106c is configured to have the selector 916d select a clock signal with a frequency of f or f/2 when the value of "0" or "1" is set in a frequency control bit 106c0 as shown in FIG. 32, for example.

Figure 33:
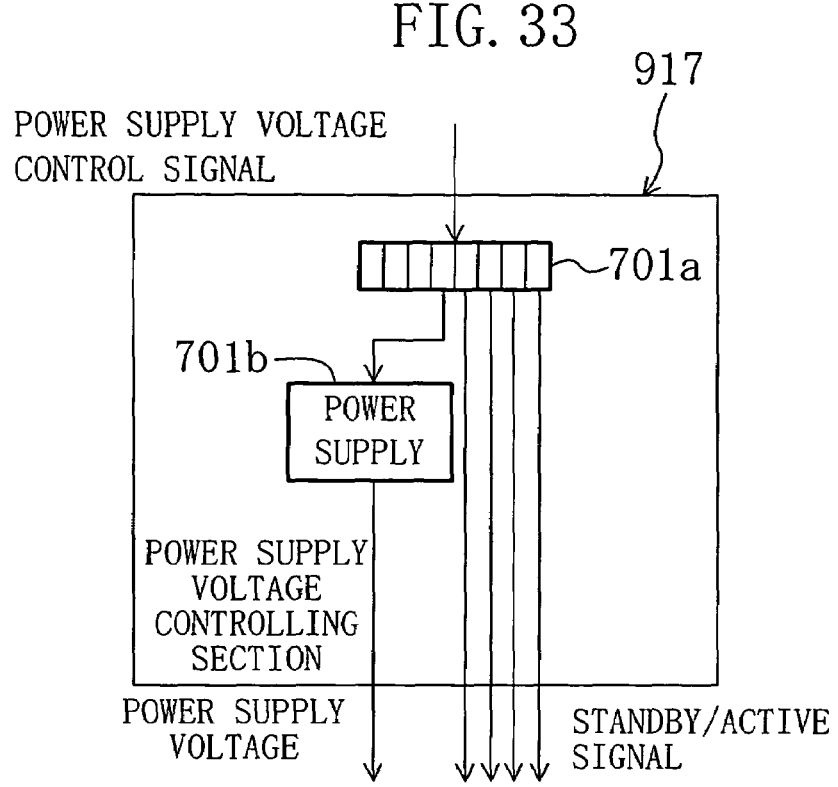
FIG. 33 is a block diagram showing a specific configuration of a power supply voltage controlling section 917 according to embodiment 10.
Figure 34:
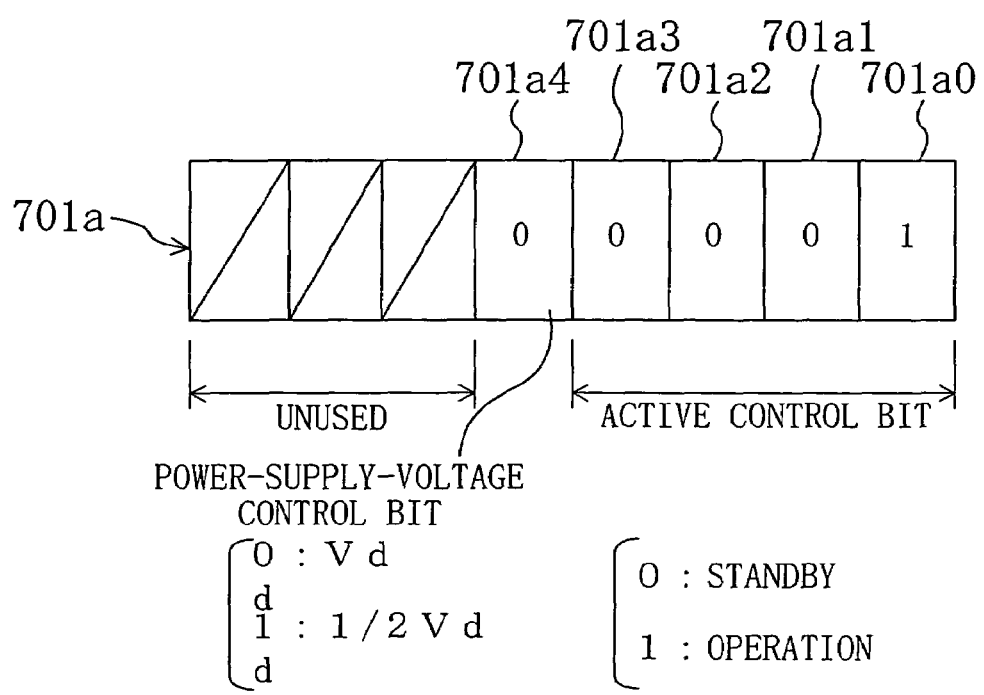
FIG. 34 shows a configuration of a power supply voltage controlling register 701a according to embodiment 10.

As shown in FIG. 33, for example, the power supply voltage controlling section 917 includes a power supply voltage controlling register 701a and a power supply 701b as the power supply voltage controlling section 701 of embodiment 6 (shown in FIG. 23). However, the power supply voltage controlling section 917 is different from the power supply voltage controlling section 701 in that the power supply 701b outputs a common voltage according to information held in the power supply voltage controlling register 701a to the processing engines 911 through 914 and outputs standby/active control signals to the respective processing engines 911 through 914 according to information held in the power supply voltage controlling register 701a. More specifically, as shown in FIG. 34, for example, the power supply voltage controlling register 701a outputs standby/active control signals for setting the respective processing engines 911 through 914 in standby or active states when the value of "0" or "1" is set in active control bits 701a0 through 701a3. On the other hand, the power supply voltage controlling register 701a makes the power supply 701b output a power supply voltage of Vdd or Vdd/2 when the value of "0" or "1" is set in a power-supply-voltage control bit 701a4. (Instead of setting the processing engines 911 through 914 in standby or active states, the supply of power supply voltage may be stopped so that leakage current is completely shut off, based on the values held in the power supply voltage controlling register 701a.)

In the processor system thus configured, the CPU 910 detects mode setting information added to instruction code and sets values as shown in FIG. 30 in the power supply voltage controlling register 701a and the frequency controlling register 106c, so that the operation mode is dynamically changed and instructions are executed under assignments to the processing engines 911 through 914, at a clock frequency and a power supply voltage according to the operation mode.

Specifically, operation is performed, being controlled by power supply voltages and clock frequencies associated with respective four operation modes described below, for example. Hereinafter, description will be given based on the assumption that the processing engines 911 through 914 are operable at a clock frequency of f when the power supply voltage is Vdd and at a clock frequency of f/2 when the power supply voltage is Vdd/2, for simplicity. To be more precise, according to Equation (2), threshold voltage Vt needs to be zero in order to have a processing engine operable at a power supply voltage of Vdd/2 and a clock frequency of f/2 (delay time td is twice as long as that at a power supply voltage of Vdd). Accordingly, the power supply voltage needs to be slightly higher than Vdd/2 to have the processing engine operable at a clock frequency of f/2 in practice. Even under consideration of this, power consumption can be greatly reduced.

(1) In a normal mode (single processing), the power supply voltage controlling register 701a and the frequency controlling register 106c are set such that only the processing engine 911 operates at a power supply voltage of Vdd and a clock frequency of f and the other processing engines 912 through 914 are in standby states in which electric power is hardly consumed. That is, execution of an instruction which is not executable by a plurality of processors in parallel is ensured in this normal mode.

(2) In a low-consumption mode (where the number of parallelism is two), the power supply voltage controlling register 701a and the frequency controlling register 106c are set such that the two processing engines 911 and 912 operate at a power supply voltage of Vdd/2 and a clock frequency of f/2. In this case, since the clock frequency is f/2, the processing ability of each of the processing engines 911 and 912 is ½ as compared to the normal mode. However, parallel operation of the two processing engines 911 and 912 exhibits the same processing ability as that in the normal mode as a whole. On the other hand, as shown by Equation (1), power consumption is proportional to the square of the power supply voltage, to the clock frequency, and to the number of operating processors. Accordingly, power consumption in this mode is reduced to $(½)^2 \times (½) \times 2 = ¼$ as compared to the normal mode. That is, if instruction code is executable by the two processing engines 911 and 912 in parallel, power consumption is greatly reduced without degradation of the processing ability.

(3) In a high-performance mode (where the number of parallelism is four), the power supply voltage controlling register 701a and the frequency controlling register 106c are set such that all the processing engines 911 through 914 operate at a power supply voltage of Vdd/2 and a clock frequency of f/2. In this case, the processing ability of each of the processing engines 911 through 914 is ½ as compared to the normal mode. However, parallel operation of the four processing engines 911 and 914 exhibits a processing ability twice as high as that in the normal mode as a whole. Power consumption in this mode is reduced to $(½)^2 \times (½) \times 4 = ½$ as compared to the normal mode. That is, as compared to the normal mode, a higher processing ability is obtained and power consumption is reduced. Accordingly, the high-performance mode is suitable for processing with a heavy load such as image processing.

(4) In an ultra-low-consumption mode (single processing), the power supply voltage controlling register 701a and the frequency controlling register 106c are set such that only the processing engine 911 operates at a power supply voltage of Vdd/2 and a clock frequency of f/2. In this case, the processing ability is ½ of that in the normal mode but power consumption is reduced to $(½)^2 \times (½) = ⅛$. That is, in a case where a high processing ability is not required, power consumption is greatly reduced.

As described above, with parallel processing at a low power supply voltage and a low clock frequency, both a processing ability equal to or higher than that in the normal mode and reduction of power consumption are achieved, or a processing ability is lower than that in the normal mode but power consumption is greatly reduced. In addition, the number of parallelism, the power supply voltage and the clock frequency are dynamically switched. Accordingly, a high processing ability and reduction of power consumption are achieved if processing with a heavy load or high-speed processing such as real-time processing is needed. On the other hand, power consumption is more greatly reduced if high-speed processing is not needed.

The mode setting information as described above is not necessarily added to every instruction code set, but may be added only to an instruction code set for changing an operation mode or instruction code sets before and after this instruction code set.

In this embodiment, the CPU 910 detects the mode setting information added to instruction code, as an example. Alternatively, the information may be detected by hardware similar to the flag detector of embodiment 1.

In addition, as the mode setting information, an instruction to store a given value in the frequency controlling register 106c and the power supply voltage controlling register 701a may be included in a program so that an operation mode is set by execution of this instruction by the CPU 910. In such a case, if the instruction to set the operation mode is executed in parallel with execution of another instruction, substantial degradation of the processing ability is avoided. Values may be set in the frequency controlling register 106c and the power supply voltage controlling register 701a via the bus 107.

In this embodiment, the common power supply voltage and the common clock signal are supplied to the processing engines 911 through 914. Alternatively, as in embodiment 1, for example, power supply voltages and clock signals are supplied to the respective processing engines so that power supply voltages and clock frequencies are individually controlled.

The number of processing engines 911 through 914 is not limited to four as long as the number is two or more. The processing engines 911 through 914 do not necessarily have the same function.

As described in embodiments 7 and 8, instead of or in addition to the control of power supply voltages, threshold voltages may be controlled. Specifically, power consumption is minimized by combining the effect of power-consumption reduction obtained by reducing a power supply voltage in accordance with the increase of a delay margin due to reduction of a clock frequency and the effect of power-consumption reduction obtained by reducing leakage current in accordance with the increase of a threshold voltage.

Embodiment 11

The method for generating instruction code to which mode setting information as described in embodiment 10 is added is not specifically limited. For example, a program designer may write, in a source program, information indicating an operation mode together with an assembler instruction such as a parallel processing instruction or a single-processor-processing instruction so that a compiler and the like generate instruction code based on the information. Alternatively, the program designer may specify which one of enhancement of a high processing ability and low power consumption is to be assigned priority in the entire program or in every program module in a given unit so that instruction code may be generated based on the specification. Hereinafter, an instruction sequence optimization device for generating such instruction code will be described.

Figure 35:
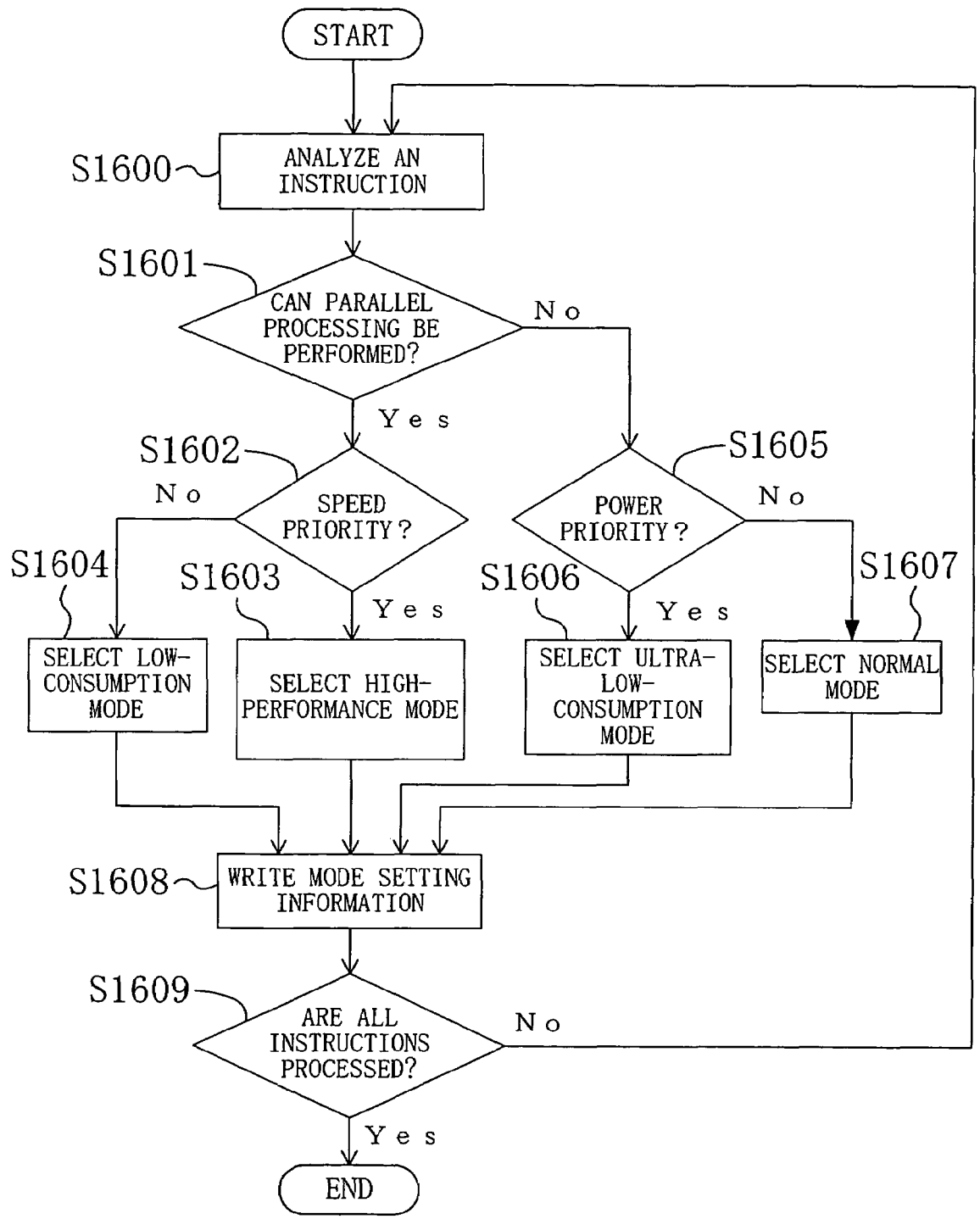
FIG. 35 is a flowchart showing operation of an instruction sequence optimization device according to embodiment 11.

As described in embodiment 2, the instruction sequence optimization device is constituted by a computer for executing programs such as a compiler and an optimizer. When a source program is compiled, for example, the device performs the following operation as shown in FIG. 35, and generates instruction code to which mode setting information is added.

(S1600) First, programs such as a source program or an object program obtained by compiling the source program are analyzed. Then, it is determined whether one or a combination of instruction sequences (where each instruction sequence is made of about ten instructions, for example) to be executed by processing engines 911 through 914 can be processed in parallel or not. That is, it is determined whether it is possible to execute instructions assigned to the processing engines 911 through 914 at the same time or not, or whether only single processing is allowed or not. Specifically, it is determined that processing such as a repetition of multiply-accumulate operation can be processed in parallel.

(S1601) As a result of the analysis described above, if parallel processing can be performed, the process proceeds to (S1602) where one of a high-performance mode or a low-consumption mode is selected for operation. If parallel processing cannot be performed, the process proceeds to (S1605) where one of an ultra-low-consumption mode or a normal mode is selected for operation.

(S1602 through S1604) If parallel processing can be performed, it is determined whether or not a direction for assigning priority to the enhancement of the processing speed is issued as an optional specification during compilation, for example. If this instruction to enhance the processing speed is issued, the high-performance mode is selected for operation (S1603). On the other hand, if the instruction to enhance the processing speed is not issued, the low-consumption mode is selected for operation (S1604). (In addition, it may be determined whether or not processing in which the number of parallelism is four can be performed and, if this processing cannot be performed, the low-consumption mode is selected.)

(S1605 through S1607) If the determination at (S1601) shows that parallel processing cannot be performed, it is determined whether or not an instruction to assign priority to reduction of power consumption is issued as an optional specification during compilation, for example. If the instruction to reduce power consumption is issued, the ultra-low-consumption mode is selected for operation (S1606). On the other hand, if the instruction to reduce power consumption is not issued, the normal mode is selected for operation (S1607). It should be noted that the instruction to enhance the processing speed and the instruction to reduce power consumption are not issued at the same time. Accordingly, it may be determined that no instruction to reduce power consumption is issued by detecting the presence of the instruction to enhance the processing speed or that an instruction to reduce power consumption is issued by detecting the absence of the instruction to enhance the processing speed, in practice. In addition, it is sufficient to conduct the foregoing determination in accordance with an instruction substantially associated with the processing speed and power consumption, e.g., information indicating heavy-load processing (and therefore indicating assignment of priority to the enhancement of the processing speed). In general cases (without any specific instruction), the low-consumption mode may be specified in accordance with specifications of a processor system and the like.

(S1608) Mode setting information according to the foregoing selection is added to instruction code. One or a series of instruction code sets are replaced with a parallel processing instruction, if necessary. Such a replacement may be performed at any time after it has been determined that parallel processing can be performed at (S1601). Specifically, for example, a mode setting information table which shows operation modes of respective processes may be created when the modes are determined at (S1603) and the other processes so that the addition of mode setting information or the replacement with the parallel processing instruction is performed based on the table, after the completion of the analysis. As described in the modified example of embodiment 10, to store a given value in the frequency controlling register 106c and the power supply voltage controlling register 701a by execution of an instruction by the CPU 910, such an instruction only needs to be added to a program.

(S1609) The processes from (S1600) through (S1608) are repeated until processing on all the instructions in the source program is completed.

Instruction code to which the mode setting information is added in the manner described above is generated, so that a person such as a program designer only needs to specify which one of the increase of the processing speed and the reduction of power consumption is to be assigned priority without consideration of operation modes in order to obtain a program for enabling high-speed operation and large reduction of power consumption with ease.

Embodiment 12

An example of a processor system in which power consumption is reduced even by using usual instruction code to which no mode setting information is added as in the processor system of embodiment 3 will be described.

Figure 36:
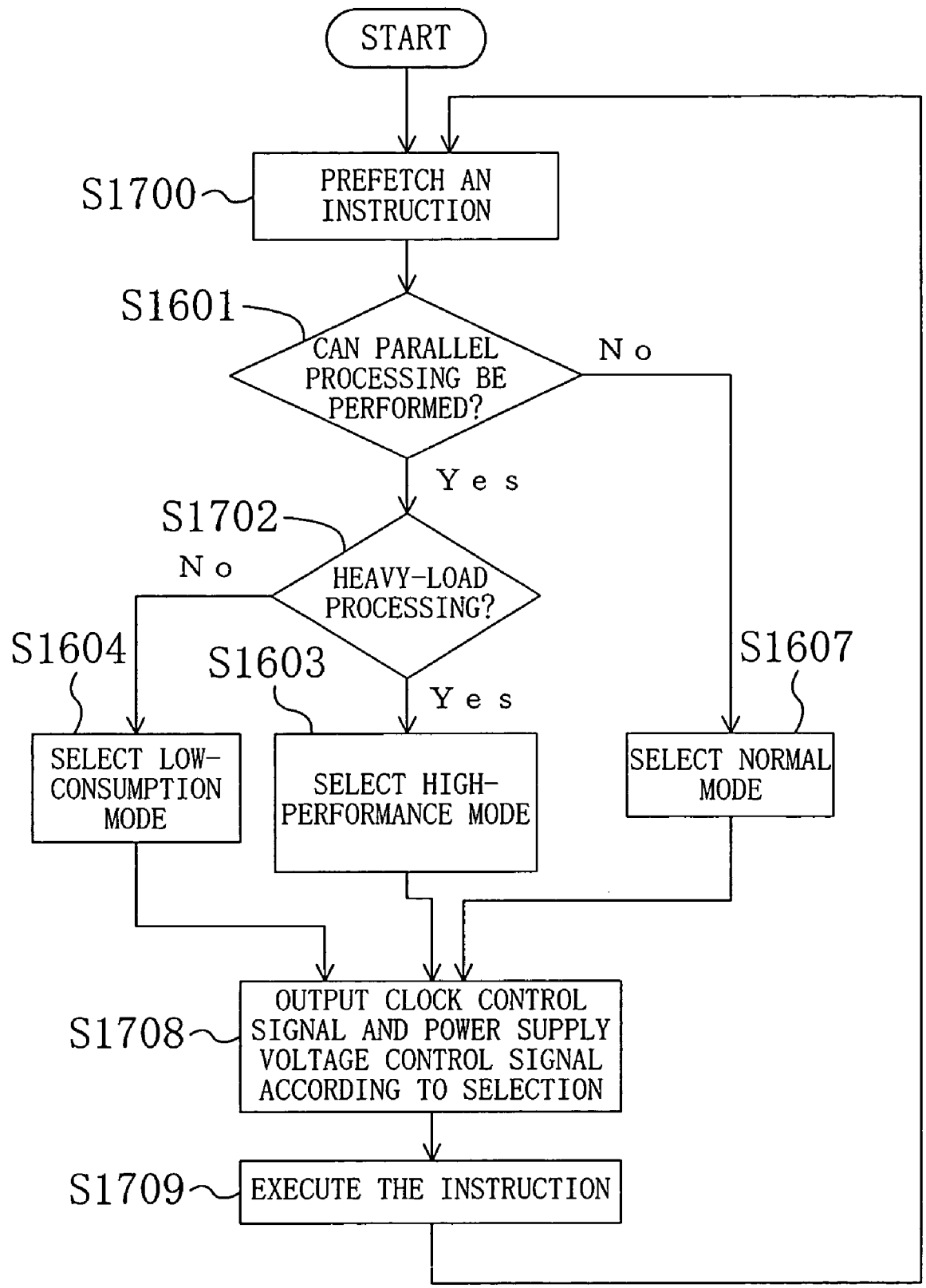
FIG. 36 is a flowchart showing operation of a processor system according to embodiment 12.

The hardware configuration of this processor system is the same as that of embodiment 10 (shown in FIG. 29) except for a program executed by a CPU 910 (operation for controlling an operation mode by the CPU 910). Specifically, the CPU 910 operates in a similar manner to that of the instruction sequence optimization device of embodiment 11 with respect to operation-mode control, as shown in FIG. 36.

(S1700) First, as a normal CPU that prefetches instruction code for high-speed operation, the CPU 910 prefetches instructions (e.g., about ten instructions) stored in a storage section 100 to determine whether each of the instructions or a combination of instruction sequences can be processed in parallel or not. A basic analysis is the same as that in (S1600) of embodiment 11 (shown in FIG. 35). The number of instructions to be prefetched is not specifically limited. If the number of such instructions is large, even somewhat complicated repetitive processing can be processed in parallel whereas a longer period of time is needed for analysis and, if the analysis is done by hardware, a large circuit scale is required. Therefore, the number of instructions to be prefetched needs to be set with these requirements balanced.

(S1601 and S1607) As a result of the analysis described above, it is determined whether parallel processing can be performed or not. If the parallel processing cannot be performed, the process proceeds to (S1607) where a normal mode is selected for operation. If the parallel processing can be performed, the process proceeds to (S1702) where one of a high-performance mode or a low-consumption mode is selected for operation.

(S1702) If parallel processing can be performed, it is determined whether the process indicated by instruction code is a heavy-load process or not. Specifically, it is determined whether or not a loop process (especially, a multiple-loop process), for example, is included or whether or not the number of loops is equal to or greater than a given value.

(S1603 and S1604) In accordance with a result of the determination in (S1702), if the process is a heavy-load process, the high-performance mode is selected for operation (S1603). If the process is not a heavy-load process, the low-performance mode is selected for operation (S1604).

(S1708) A clock control signal and a power supply voltage control signal is according to the selection are output to a clock controlling section 916 and a power supply voltage controlling section 917 and are held in a frequency controlling register 106c and a power supply voltage controlling register 701a. In this manner, the operation mode is set and one or a series of instruction code sets are replaced with a parallel processing instruction, if necessary.

(S1709) Instructions are executed in the selected operation mode, and then operations from (S1700) are repeated.

In the foregoing manner, even for a program to which no mode setting information is added, an operation mode is automatically selected in accordance with a processing load during execution, the clock frequency and the power supply voltage are set and replacement with a parallel processing instruction is performed. Accordingly, even in the case of executing instruction code generated by a general compiler, the instruction code is easily executed in an optimum operation mode, e.g., with high-speed operation and large reduction of power consumption.

An operation mode is not necessarily selected only by a processor system as described above. Alternatively, if mode setting information (based on the direction of a program developer, for example) or specification about which one of a high-processing ability and low power consumption is to be assigned priority is detected, an operation mode may be selected in accordance with the information or the specification and in such a case, only the determination whether parallel processing can be performed or not may be made by the processor system.

Embodiment 13

Figure 37:
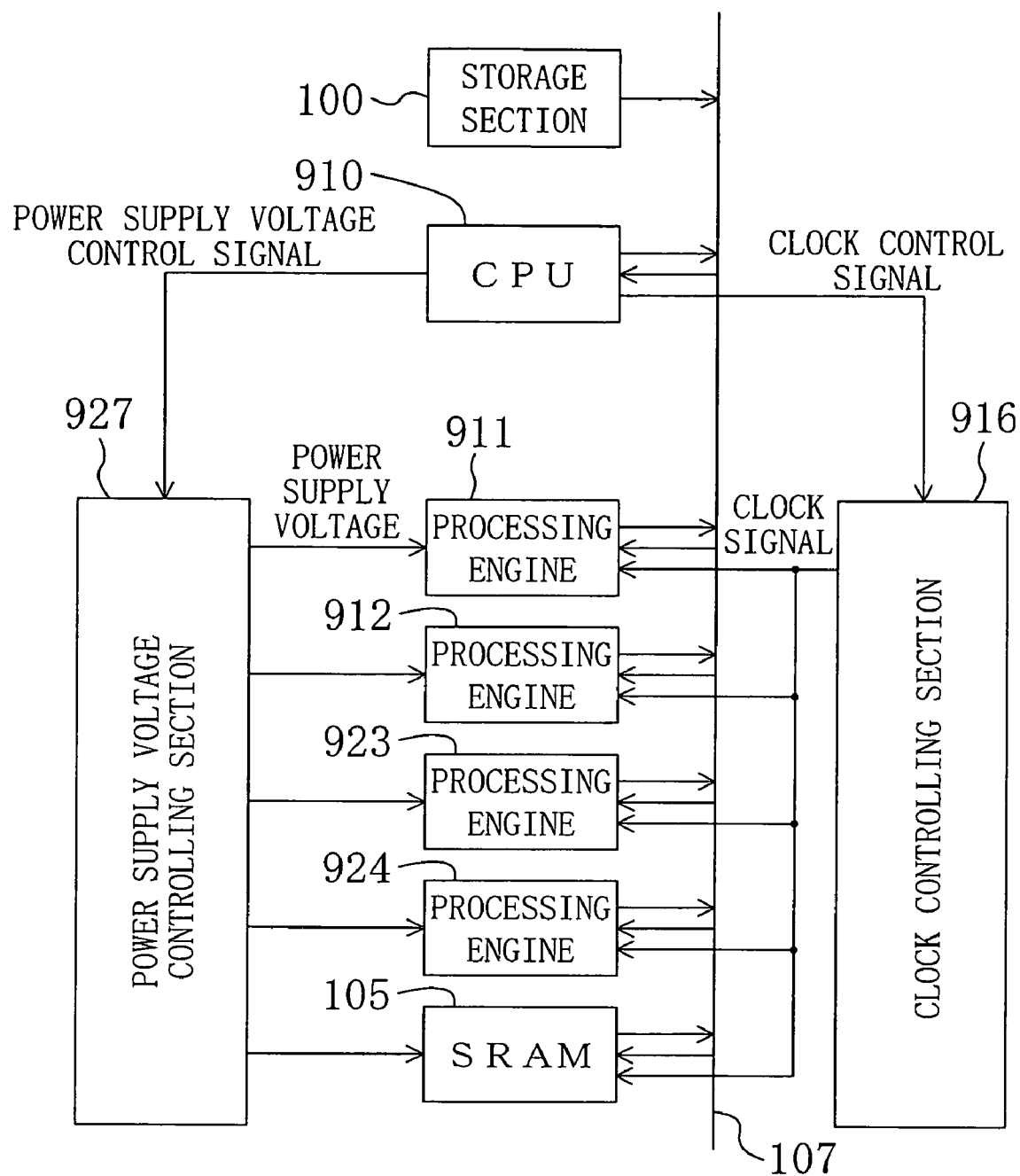
FIG. 37 is a block diagram showing a configuration of a main portion of a processor system according to embodiment 13.

An example of a processor system in which transistors constituting respective processors have different threshold voltages will be hereinafter described. As shown in FIG. 37, this processor system includes processing engines 923 and 924 instead of the processing engines 913 and 914 of embodiment 10 (shown in FIG. 29). The processor system also includes a power supply voltage controlling section 927 instead of the power supply voltage controlling section 917.

The processing engines 923 and 924 have the same function as that of the processing engines 911 and 912. However, the threshold voltage (e.g. 0.6V) of transistors constituting the processing engines 923 and 924 is set higher than the threshold voltage (e.g., 0.3V) of transistors constituting the processing engines 911 and 912. This embodiment is based on the assumption that these threshold voltages are statically set by setting impurity concentrations and the like, but the threshold voltages may be dynamically set by controlling semiconductor substrate voltages as described in embodiment 7, for example. Each of the processing engines 911, 912, 923 and 924 may be constituted only by a high-threshold-voltage transistor or a low-threshold-voltage transistor as described above. However, the present invention is not limited to this example.

Figure 38:
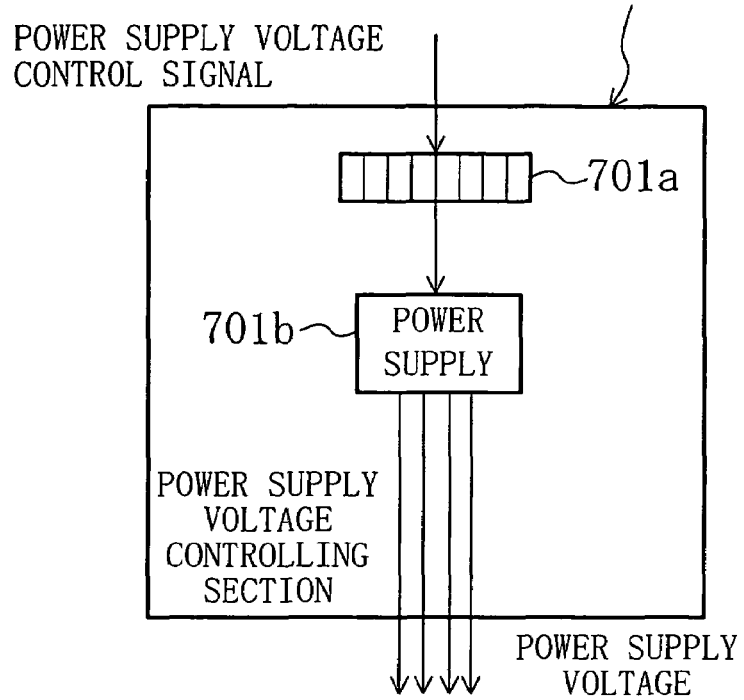
FIG. 38 is a block diagram showing a specific configuration of a power supply voltage controlling section 927 according to embodiment 13.
Figure 39:
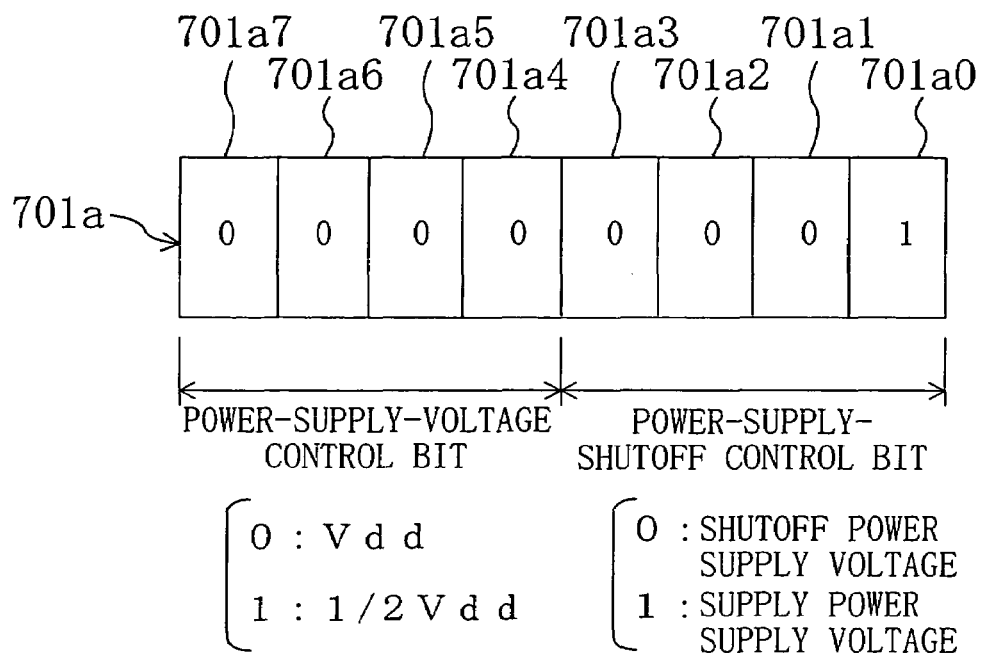
FIG. 39 shows a configuration of a power supply voltage controlling register 701a according to embodiment 13.

The power supply voltage controlling section 927 is configured to control the supply/shutoff of power supply voltages to the respective processing engines 911, 912, 923 and 924 and these supply voltages independently of each other. Specifically, as shown in FIGS. 38 and 39, for example, the supply or shutoff of power supply voltages from a power supply 701b is controlled in accordance with values held in power-supply-shutoff control bits 701a0 through 701a3 in a power supply voltage controlling register 701a. These supply voltages are controlled in accordance with values held in power-supply-voltage control bits 701a4 through 701a7.

Setting of values in the power supply voltage controlling register 701a and a frequency controlling register 106c in a clock controlling section 916 according to each operation mode is performed based on mode setting information added to instruction code or by operation of a CPU 910 based on an analysis result of the instruction code. This setting is performed in the same manner as in embodiments 10 and 12. If values as shown in FIG. 40, for example, are set in these registers, the operation mode is dynamically changed and instructions are executed under assignments to the processing engines 911, 912, 923 and 924 at clock frequencies and power supply voltages according to the selected operation mode.

Specifically, operation is performed, being controlled by power supply voltages and clock frequencies associated with respective three operation modes in the manner as described below, for example. Operation in an ultra-low-consumption mode similar to that in embodiment 10 may be performed. (That is, selection of an operation mode only needs to depend on power consumption, the processing ability and others required of a processor system.) Hereinafter, description will be given on the assumption that the processing engines 923 and 924 constituted by the high-threshold-voltage transistors described above are operable at a clock frequency of f/2 when the power supply voltage is Vdd, for example.

(1) In a normal mode (single processing), the power supply voltage controlling register 701a and the frequency controlling register 106c are set such that only the processing engine 911 using a low-threshold-voltage transistor operates at a power supply voltage of Vdd and a clock frequency of f and the supply of power supply voltages to the other processing engines 912, 923 and 924 are shut off. Accordingly, no standby power consumption caused by leakage current occurs in the processing engines 912, 923 and 924.

(2) In a low-leakage mode (where the number of parallelism is two), the power supply voltage controlling register 701a and the frequency controlling register 106c are set such that the two processing engines 923 and 924 using high-threshold-voltage transistors operate at a power supply voltage of Vdd and a clock frequency of f/2. In this case, the two processing engines 923 and 924 operate at a clock frequency of f/2, so that the same processing ability as that in the normal mode is obtained as a whole. On the other hand, without any consideration of leakage current, power consumption is the same as that in the normal mode as a whole because the two processing engines 923 and 924 operate at a clock frequency of f/2. However, use of the high-threshold-voltage transistors reduces leakage current (active leakage current) of each of the processing engines 923 and 924 during operation to about 27%, for example, of that in the case of using low-threshold-voltage transistors. Then, total power consumption is reduced accordingly.

(3) In a high-performance mode (where the number of parallelism is four), the power supply voltage controlling register 701a and the frequency controlling register 106c are set such that the power supply voltages of the processing engines 911 and 912 are Vdd/2, the power supply voltages of the processing engines 923 and 924 are Vdd and the clock frequency of all the processing engines is f/2. In this case, the number of parallelism is four and the clock frequency is f/2, so that the total processing ability is twice as high as that in the normal mode. On the other hand, the processing engines 911 and 912 operate in parallel at a power supply voltage of Vdd/2 and a clock frequency of f/2, so that power consumption thereof is $(1/2)^2 \times (1/2) \times 2 = 1/4$ as compared to the normal mode. The processing engines 923 and 924 use high-threshold-voltage transistors as in the low-leakage mode and operate in parallel at a power supply voltage of Vdd and a clock frequency of f/2, so that active leakage current is greatly reduced. As a result, total power consumption is reduced.

As described above, the processing engines 923 and 924 constituted by high-threshold-voltage transistors are provided. These processing engines 923 and 924 operate in parallel at a low clock frequency, so that active leakage current is reduced. Accordingly, especially in a case where the influence of active leakage current is large, power consumption is greatly reduced with ease. For heavy-load processing, the processing engines 911 and 912 constituted by low-threshold-voltage transistors are additionally used so that performance is enhanced with power consumption suppressed by reducing the power supply voltages and the frequencies. In addition, even in a case where parallel processing is not allowed, if the processing engine 911 is constituted by a low-threshold-voltage transistor and operates at a power supply voltage of Vdd and a clock frequency of f, the maintenance of the processing performance is ensured.

Embodiment 14

An example of a processor system in which the processing ability is maintained and power consumption is reduced even in a case where a failure occurs in one of a plurality of processing engines will be described.

Figure 41:
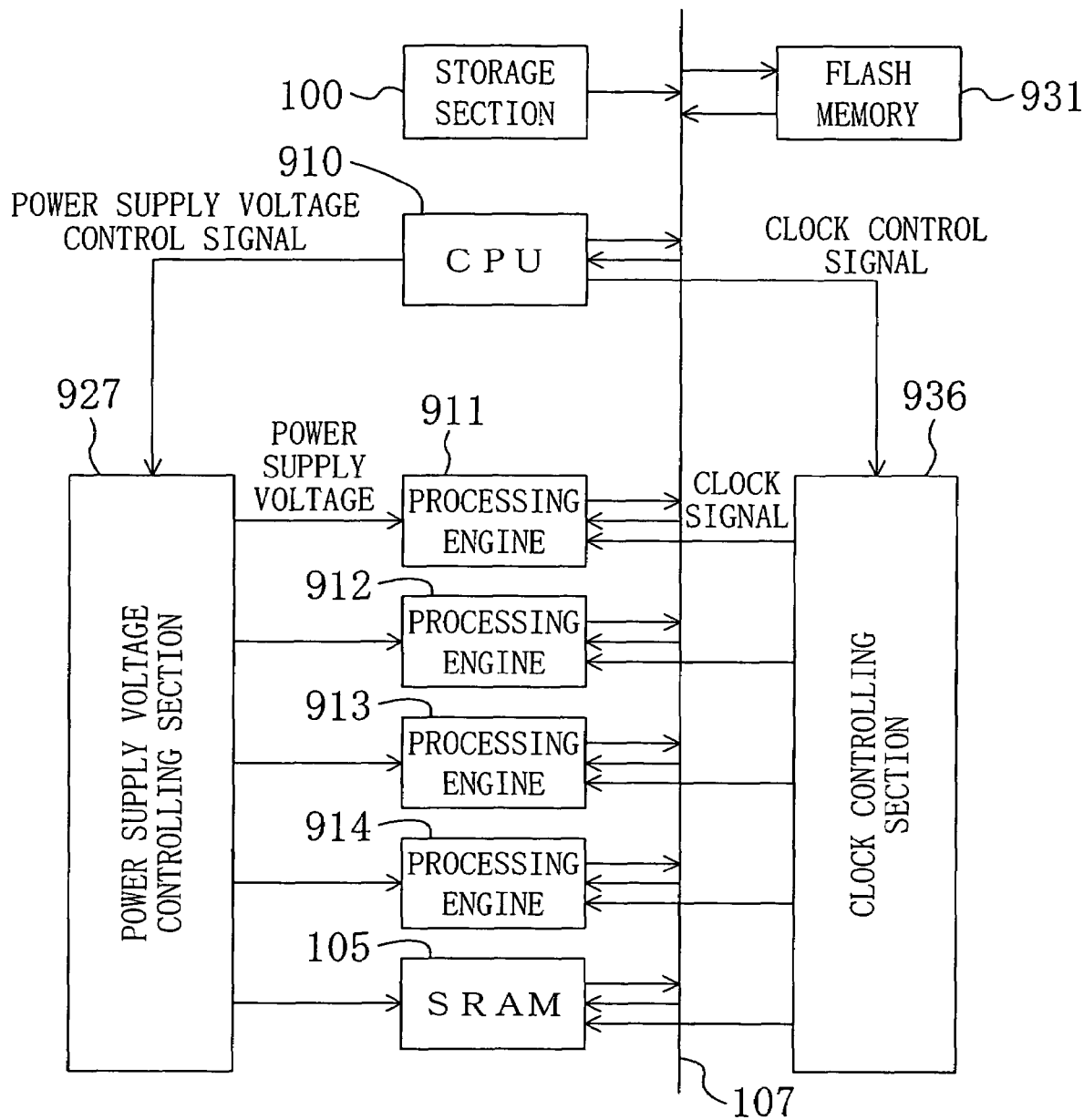
FIG. 41 is a block diagram showing a configuration of a main portion of a processor system according to embodiment 14.

As shown in FIG. 41, this processor system includes a power supply voltage controlling section 927 also described in embodiment 13 (shown in FIG. 38) instead of the power supply voltage controlling section 917 of embodiment 10 (shown in FIG. 29) so that the supply/shutoff of power supply voltages to processing engines 911 through 914 and these supply voltages are independently controlled. The processor system further includes: a clock controlling section 936 instead of the clock controlling section 916; and a flash memory 931 (failure-information holding means), which is a rewritable nonvolatile memory.

Figure 42:
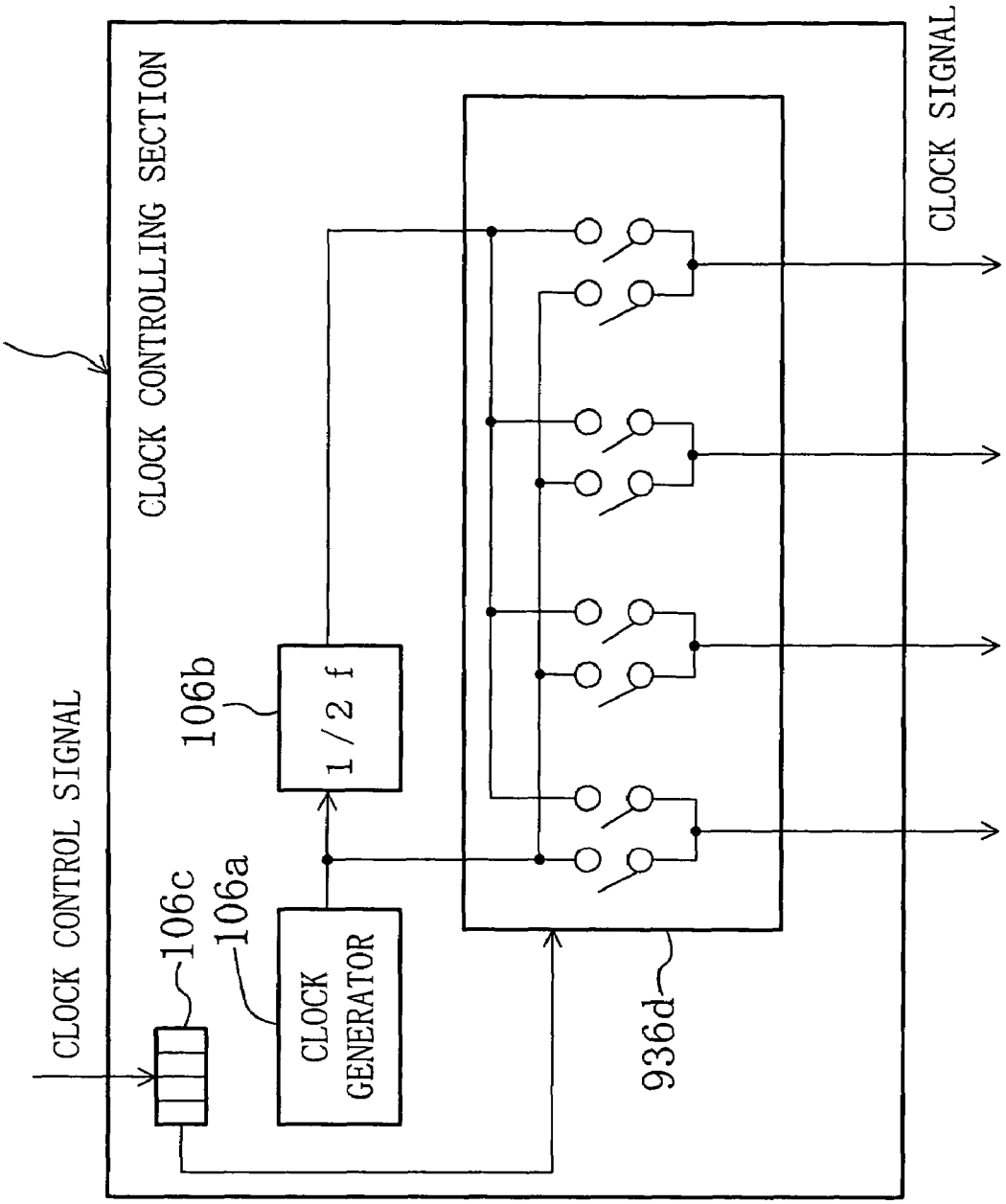
FIG. 42 is a block diagram showing a specific configuration of a clock controlling section 936 according to embodiment 14.
Figure 43:
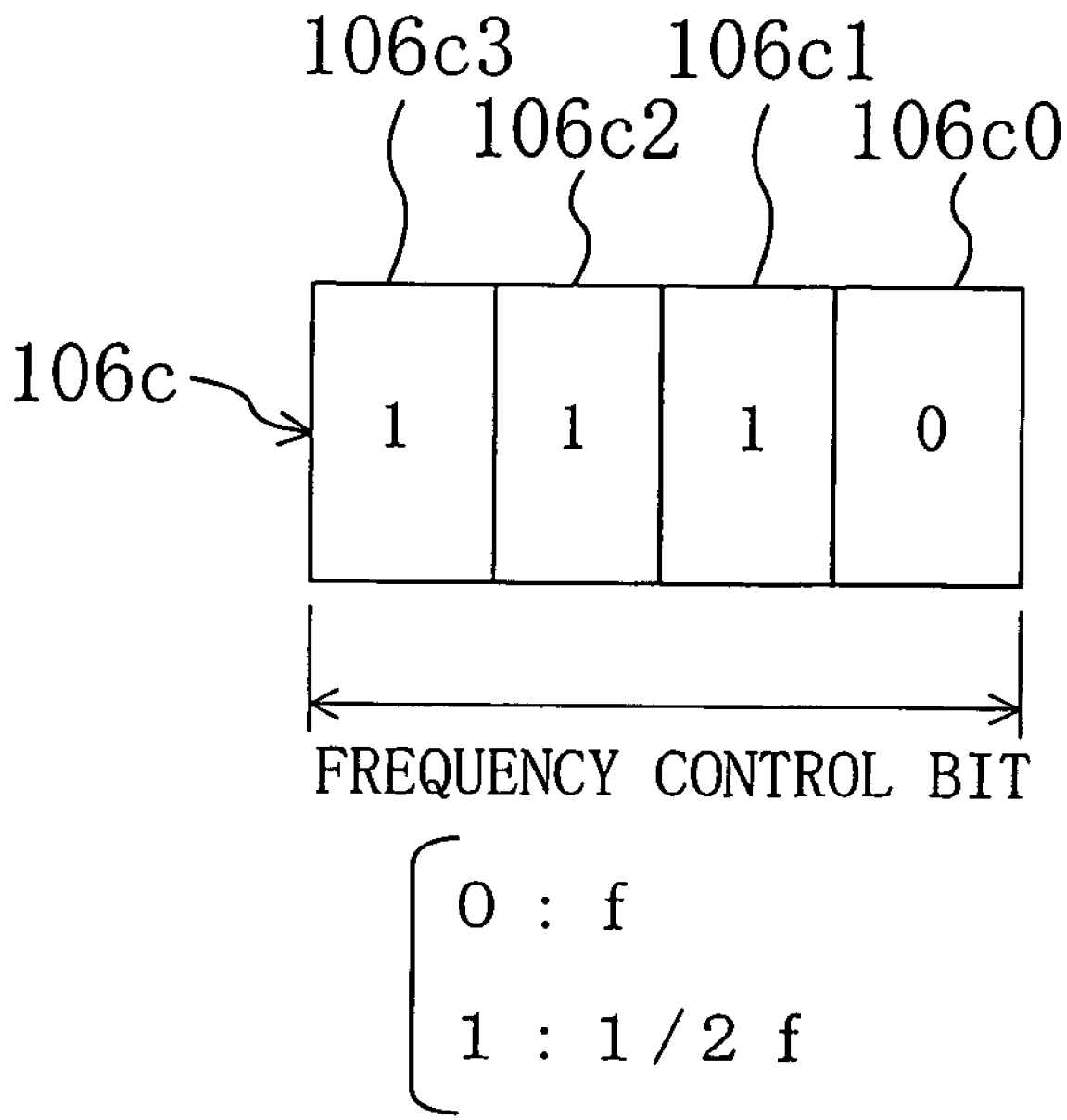
FIG. 43 shows a configuration of a frequency controlling register 106c according to embodiment 14.

The clock controlling section 936 is configured to independently control the frequencies of clock signals to be supplied to the processing engines 911 through 914, as the power supply voltage controlling section 927. Specifically, as shown in FIGS. 42 and 43, for example, a selector 936d supplies clock signals having frequencies according to values held in frequency control bits 106c0 through 106c3 in a frequency controlling register 106c, to the respective processing engines 911 through 914.

The flash memory 931 stores failure information indicating whether each of the processing engines 911 through 914 normally operates (fully operates) or has a failure. Specifically, during manufacturing, for example, operation of each of the processing engines 911 through 914 is tested during an initial evaluation using an LSI tester and a result of the test is held. Instead of the flash memory, various other nonvolatile memories such as an FeRAM may be used.

In this processor system, as in embodiments 10 and 12, predetermined values are set in a power supply voltage controlling register 701a in the power supply voltage controlling section 927 and the frequency controlling register 106c in the clock controlling section 936 based on mode setting information added to instruction code or by operation of a CPU 910 based on an analysis result of the instruction code, so that the operation mode is dynamically changed and instructions are executed under assignments to the processing engines 911 through 914 at power supply voltages and clock frequencies according to the selected operation mode. To assign instructions to the processing engines 911 through 914, failure information held in the flash memory 931 is referred to so that no instruction is assigned to a failed processing engine.

Specifically, in the case of operation in four operation modes as described in embodiment 10, for example, suppose a failure has occurred in the processing engine 911. Then, to switch to a normal mode or an ultra-low-consumption mode, a power supply voltage of Vdd and a clock signal with a frequency of f, or a power supply voltage of Vdd/2 and a clock signal with a frequency of f/2 are supplied to one of the processing engines 912 through 914 and the supply of power supply voltages to the other processing engines (including at least the processing engine 911) is shut off (i.e., the failed processing engine is separated). Likewise, to switch to a low-consumption mode, a power supply voltage of Vdd/2 and a clock signal with a frequency of f/2 are supplied to two of the processing engines 912 through 914 and the supply of a power supply voltage to at least the processing engine 911 is also shut off.

To switch to a high-performance mode, the processing engine 912 is operated at a power supply voltage of Vdd and a clock frequency of f, the processing engines 913 and 914 are operated at a power supply voltage of Vdd/2 and a clock frequency of f/2 and the supply of a power supply voltage to the processing engine 911 is shut off, for example. Specifically, b'11001110 or b'1100 (where b' indicates that the subsequent value is represented in the binary system) is set in each of the power supply voltage controlling register 701a in the power supply voltage controlling section 927 or the frequency controlling register 106c in the clock controlling section 936. Accordingly, though power consumption is 1.25 times as high as that in the normal mode, the processing ability is twice as high as that in the normal mode. Alternatively, the three processing engines 912 through 914 may be operated at a power supply voltage of Vdd/2 and a clock frequency of f/2 so that the processing ability is 1.5 times as high as that in the normal mode but power consumption is reduced to 0.75 (i.e., priority is assigned to reduction of power consumption.) In such a case, power supply voltages and the clock signal frequencies are not necessarily individually controlled among the processing engines 911 through 914.

As described above, even in the presence of a failed processing engine, if parallel operation for compensating for the engine is performed, the performance of the processor system is maintained and power consumption is reduced to some extent, thus enhancing the manufacturing throughput.

In the foregoing example, a failure occurs in one processing engine. In a case where failures occur in two processing engines, the same processing ability and the same reduction of power consumption are also ensured in the normal mode, the ultra-low-consumption mode and the low-consumption mode. In the high-performance mode, two normally-operating processing engines may be operated at a power supply voltage of Vdd and a clock frequency f or one of these normally-operating processing engines may be operated at Vdd/2 and f/2. Alternatively, the processor system may not have the high-performance mode.

In the foregoing example, the supply of a power supply voltage to a failed processing engine is shut off. Alternatively, the failed processing engine may be set in a standby state as described in embodiment 10. However, under consideration of a failure such as a short in a power line, a power supply voltage is preferably shut off in terms of system stability and the like. In addition, the supply of a clock signal may be stopped in consideration of occurrence of a short in a clock signal line.

Embodiment 15

Figure 44:
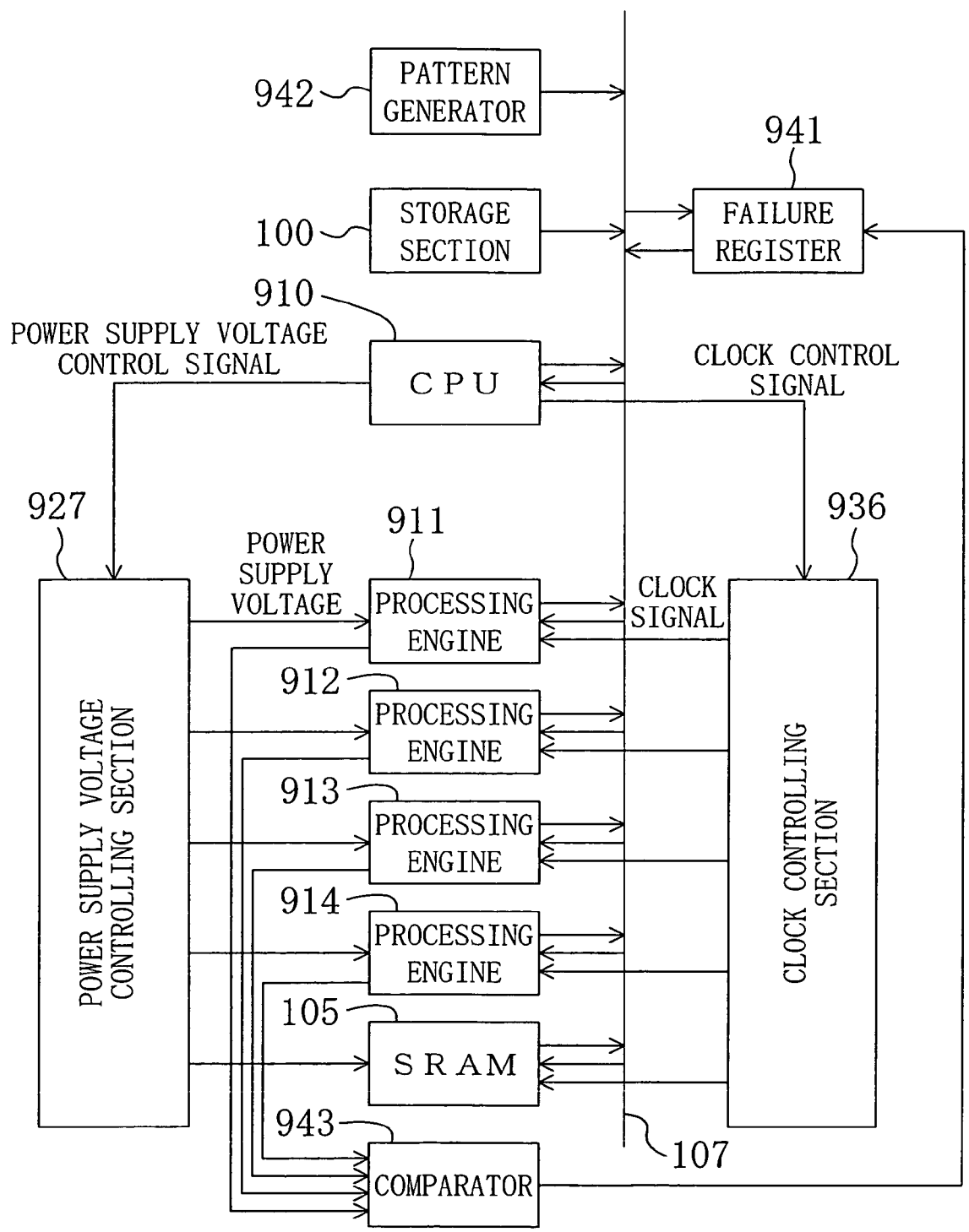
FIG. 44 is a block diagram showing a configuration of a main portion of a processor system according to embodiment 15.

A failure of a processing engine may be detected not only by a test during manufacturing as described above but also by a processor system itself every time power is turned on, for example, such that no processing is assigned to the failed processing engine. As shown in FIG. 44, for example, this processor system includes: a failure register 941 (failure-information holding means) instead of the flash memory 931 of embodiment 14; a pattern generator 942; and a comparator 943 (failure detecting means).

As the flash memory 931 of embodiment 14, the failure register 941 stores failure information indicating whether each of processing engines 911 through 914 normally operates (fully operate) or has a failure. However, the failure register 941 does not need to be a nonvolatile memory. The failure register 941 is not necessarily connected to a bus 107 but may be provided inside a power supply voltage controlling section 927 or a clock controlling section 936 as long as information can be read out therefrom by a CPU 910. Specifically, as shown in FIG. 45, for example, the failure register 941 includes failure bits associated with the respective processing engines 911 through 914 and each of the failure bits holds a value according to the presence/absence of a failure in an associated one of the processing engines 911 through 914.

The pattern generator 942 outputs a random test pattern, i.e., a signal having a random bit pattern which shows a random change in terms of time, to the bus 107 during test operation of the processing engines 911 through 914.

When the random test pattern is input to the processing engines 911 through 914, the comparator 943 compares signals output from the processing engines 911 through 914, e.g., signals at given test points inside the processing engines 911 through 914 or signals to be output to the bus 107, an I/O bus or others. Then, the comparator 943 determines whether or not these signals coincides with each other to detect a failed processing engine from the processing engines 911 through 914, and the obtained failure information is held in the failure register 941.

Specifically, the processing engines 911 through 914 are tested during initialization immediately after the system has been turned on or during system processing by an OS in a standby period between processings by the processing engines 911 through 914, for example, in the following manner. That is, the pattern generator 942 outputs a random test pattern to the bus 107 with a power supply voltage of Vdd and a clock signal having a clock frequency of f supplied to each of the processing engines 911 through 914. The comparator 943 compares output signals from each pair of the processing engines, i.e., a pair of processing engines 911 and 912, a pair of the processing engines 913 and 914, a pair of the processing engines 911 and 913 and a pair of the processing engines 912 and 914. Then, the comparator 943 detects a failed processing engine out of the processing engines 911 through 914 based on a combination of pairs showing coincidence in the comparison and pairs not showing coincidence in the comparison. Then, the comparator 943 has its detection result held in the failure register 941. At this time, signals from the processing engines 911 and 914, for example, may also be compared. In such a case, two or more failures are detected, so that a processor system not having a high-performance mode when failures occur in two or more processing engines is implemented as described in embodiment 14. Alternatively, the test described above may be performed to determine whether a processing engine which is inoperable at a clock frequency of f is operable at f/2 or not. (For example, if a processing engine is operable only at f/2, operation in the high-performance mode is performed in the same manner as in embodiment 10 as long as this processing engine is not assigned to a normal mode.)

The test pattern is not necessarily generated at random. Alternatively, a predetermined test pattern and an output pattern (estimated value) to be output when the test pattern is input to the processing engines 911 through 914 may be stored in a nonvolatile memory such as a flash memory so that the estimated value is compared with an actual output pattern so as to detect a failed processing engine out of the processing engines 911 through 914. A random test pattern as described above or the like may be supplied from the outside of the processor system. In addition, a given test program may be executed so as to detect a failure based on a result of the execution.

Assignment to the processing engines 911 through 914 and controls of power supply voltages and clock frequencies based on failure information thus obtained are performed in the same manner as described in embodiment 14. Thus, a failure in a processing engine is detected by the processor system itself. As a result, system stability and reliability are enhanced and the performance is maintained not only in a case where infant mortality failures occur but also in a case where failures are caused with time.

In embodiments 1 through 9, one CPU 103 and one HWE 104 are provided. In embodiments 10 through 15, processing engines 911 through 914 having the same function are provided. However, the present invention is not limited to these embodiments. Processors of various types may be provided, e.g., a plurality of processors having the same function or different functions may be provided. In such a case, the same advantages are still obtained.

In embodiment 1, for example, flags added to instruction code or mode setting information are used as information indicating assignments to processors and clock frequencies in the instruction code. The present invention is not limited to this, and it is sufficient that information indicating, for example, assignments to processors is substantially included in a program. For example, it is sufficient to determine which one of the CPU 103 and the HWE 104 executes an instruction or to determine an operation mode by instruction code itself.

In embodiments 6 through 9, the power supply voltage controlling section 701 and others are directly controlled based on the clock control signal. However, the present invention is not limited to this, and the control only needs to be performed based on a control signal allowing power supply voltages, for example, to be appropriately set in accordance with clock frequencies.

The number of levels of power supply voltages and clock frequencies are not limited to two or three (three or four under consideration of the case of stopping the supply thereof) as described above, but may be set at various values. If the number of levels is increased, a larger number of combinations of operation modes are used so that operation conditions are set in greater detail.

The components described in the foregoing embodiments may be variously combined as long as these combinations are logically practicable. Specifically, for example, the configuration for controlling power supply voltages and substrate voltages as described in embodiments 6 through 15 or the configuration for controlling a cooling means may be applied to processor systems of the other embodiments. In addition, the flag detector 101 of embodiment 1 (shown in FIG. 1) and the instruction analyzer 402 of embodiment 3 (shown in FIG. 14) may be provided to implement the functions described in these embodiments so that assignments to processors and clock frequencies are controlled irrespective of the presence of, for example, flags in instructions to be executed.

As described above, according to the present invention, a clock frequency is controlled in accordance with an instruction to be executed for each processor, thus reducing power consumption without degradation of the processing ability. In addition, power supply voltages and substrate voltages to be supplied to processors are controlled in accordance with the control of the clock frequencies, thus further reducing power consumption.

What is claimed is:

1. A processor system including a plurality of processors, comprising:

assignment controlling means for reading instructions to be executed by the respective processors having different functions and different performances and for controlling assignments of the instructions to the processors based on the total execution period of the instructions executed by the processor system, said different performances and an assignment information included in the instructions;

clock controlling means for controlling the frequencies of clock signals to be supplied to the respective processors, in accordance with the instructions to be executed by the processors according to the assignments and the clock controlling means for reducing the frequencies of clock signals supplied to the respective processors so as to reduce power consumption with predetermined execution period for the processors;

voltage controlling means for controlling, in accordance with the control of the frequencies of the clock signals by the clock controlling means, at least either power supply voltages to be supplied to the respective processors or substrate voltages to be supplied to substrate nodes of transistors constituting the respective processors; and instruction analyzing means for analyzing whether the instructions are executable by a plurality of processors in parallel or not, wherein the assignment controlling means makes a second executable number of processors which are more than a first executable number of processors execute instructions in parallel, the clock controlling means and the voltage controlling means respectively supply to each processor clock signals each having a frequency lower than a predetermined frequency and either power supply voltages lower than a predetermined voltage or substrate voltages for providing threshold voltages higher than a predetermined threshold voltage, and the assignment controlling means, the clock controlling means and the voltage controlling means control the assignments to the processors, the frequencies of the clock signals, and either the power supply voltages or the substrate voltages, respectively, based on a result of the analysis by the instruction analyzing means.

2. The processor system of claim 1, wherein the assignment controlling means, the clock controlling means and the voltage controlling means control the assignments to the processors, the frequencies of the clock signals, and either the power supply voltages or the substrate voltages, respectively, based on control information included in the instructions.

3. The processor system of claim 2, wherein the control information indicates one of a plurality of combinations of assignments to the processors, frequencies of clock signals, and either power supply voltages or substrate voltages.

4. The processor system of claim 2, wherein the plurality of processors contain a processor including a transistor having a first threshold voltage with respect to a substrate voltage and a processor including a transistor having a second threshold voltage with respect to the substrate voltage, the second threshold voltage being higher than the first threshold voltage, and the assignment controlling means, the clock controlling means and the voltage controlling means control the assignments to the processors, the frequencies of the clock signals, and either the power supply voltages or the substrate voltages, respectively, based on control information included in the instructions and the threshold voltages of the transistors included in the processors.

5. The processor system of claim 1, wherein the instruction analyzing means analyzes whether a process performed in accordance with the instructions is a process with a heavy load or not.

6. The processor system of claim 5, wherein the process with a heavy load includes a loop process performed a predetermined number of times or more.

7. The processor system of claim 1, wherein the plurality of processors contain a processor including a transistor having a first threshold voltage with respect to a substrate voltage and a processor including a transistor having a second threshold voltage with respect to the substrate voltage, the second threshold voltage being higher than the first threshold voltage, and the assignment controlling means, the clock controlling means and the voltage controlling means control the assignments to the processors, the frequencies of the clock signals, and either the power supply voltages or the substrate voltages, respectively, based on a result of the analysis by the instruction analyzing means and the threshold voltages of the transistors included in the processors.

8. The processor system of claim 1, wherein the voltage control means stops the supply of a power supply voltage to a processor to which the assignment controlling means does not assign execution of an instruction.

9. The processor system of claim 1, further comprising failure-information holding means for holding information indicating whether each of the processors operates normally or not, wherein the assignment controlling means assigns execution of an instruction only to a processor which operates normally.

10. The processor system of claim 9, further comprising failure detecting means for making each of the processors perform test operation to determine whether the processor operates normally or not.

11. The processor system of claim 10, wherein the failure detecting means makes each of the processors execute a test program to determine whether the processor operates normally or not, based on a result of the execution.

* * * * *